(12) United States Patent
Niimi et al.

(10) Patent No.: US 12,501,867 B2
(45) Date of Patent: Dec. 23, 2025

(54) CONTROL DEVICE AND NON-TRANSITORY COMPUTER READABLE MEDIUM

(71) Applicant: DENSO CORPORATION, Kariya (JP)

(72) Inventors: Naohisa Niimi, Kariya (JP); Michitake Kuroda, Kariya (JP); Hiroshi Uchigashima, Kariya (JP); Tomohiro Yokochi, Kariya (JP); Hiroshi Tanioku, Kariya (JP); Naoki Hasegawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 384 days.

(21) Appl. No.: 18/188,703

(22) Filed: Mar. 23, 2023

(65) Prior Publication Data

US 2023/0225266 A1 Jul. 20, 2023

Related U.S. Application Data

(63) Continuation of application No. PCT/JP2021/031149, filed on Aug. 25, 2021.

(30) Foreign Application Priority Data

Sep. 25, 2020 (JP) ................................. 2020-161287

(51) Int. Cl.
*A01G 25/16* (2006.01)
*G05B 13/02* (2006.01)

(52) U.S. Cl.
CPC ........... *A01G 25/16* (2013.01); *G05B 13/026* (2013.01)

(58) Field of Classification Search
CPC ...... A01G 25/16; A01G 25/167; A01G 25/02; A01G 7/00; A01G 27/00; G05B 13/026; Y02A 40/22
See application file for complete search history.

(56) References Cited

U.S. PATENT DOCUMENTS 9,829,871 B1 * 11/2017 Goodman ............ A01G 25/167
10,537,074 B2 1/2020 Chitnis et al.
(Continued)

FOREIGN PATENT DOCUMENTS

JP 3444192 B2 9/2003
JP 2015-231326 A 12/2015
(Continued)

OTHER PUBLICATIONS

U.S. Appl. No. 18/188,576, filed Mar. 23, 2023, Niimi et al.

*Primary Examiner* — Chad G Erdman
(74) *Attorney, Agent, or Firm* — Posz Law Group, PLC

(57) ABSTRACT

A control device controls a water supply device that supplies irrigation water to an open farm field in which a plant grows. The control device includes a storage unit, a calculation unit, and an output unit. The storage unit stores an environment value of each of a plurality of divided areas obtained by dividing the farm field and weather forecast of the farm field. The calculation unit calculates, based on an environment value and the weather forecast, an irrigation schedule in which supply time and amount of the irrigation water individually supplied to each of the plurality of divided areas during the irrigation period are determined. The output unit outputs to the water supply device, a control signal to control supply and no supply of the irrigation water to each of the plurality of divided areas based on the irrigation schedule.

20 Claims, 34 Drawing Sheets

(56) References Cited

U.S. PATENT DOCUMENTS

| | | | |
|---|---|---|---|
| 10,602,682 B1 | 3/2020 | Wardle et al. | |
| 2016/0342392 A1 | 11/2016 | Tasaki | |
| 2017/0038749 A1 | 2/2017 | Mewes et al. | |
| 2019/0171990 A1* | 6/2019 | Hutchison | G06Q 50/02 |
| 2020/0296906 A1 | 9/2020 | Sun et al. | |
| 2021/0114559 A1 | 4/2021 | Okura | |
| 2022/0025263 A1* | 1/2022 | Bucevschi | C09K 17/18 |

FOREIGN PATENT DOCUMENTS

| | | |
|---|---|---|
| JP | 5830411 B2 | 12/2015 |
| JP | 2017-009305 A | 1/2017 |
| JP | 2017-023021 A | 2/2017 |
| JP | 6218075 B2 | 10/2017 |
| JP | 2019-012050 A | 1/2019 |

\* cited by examiner

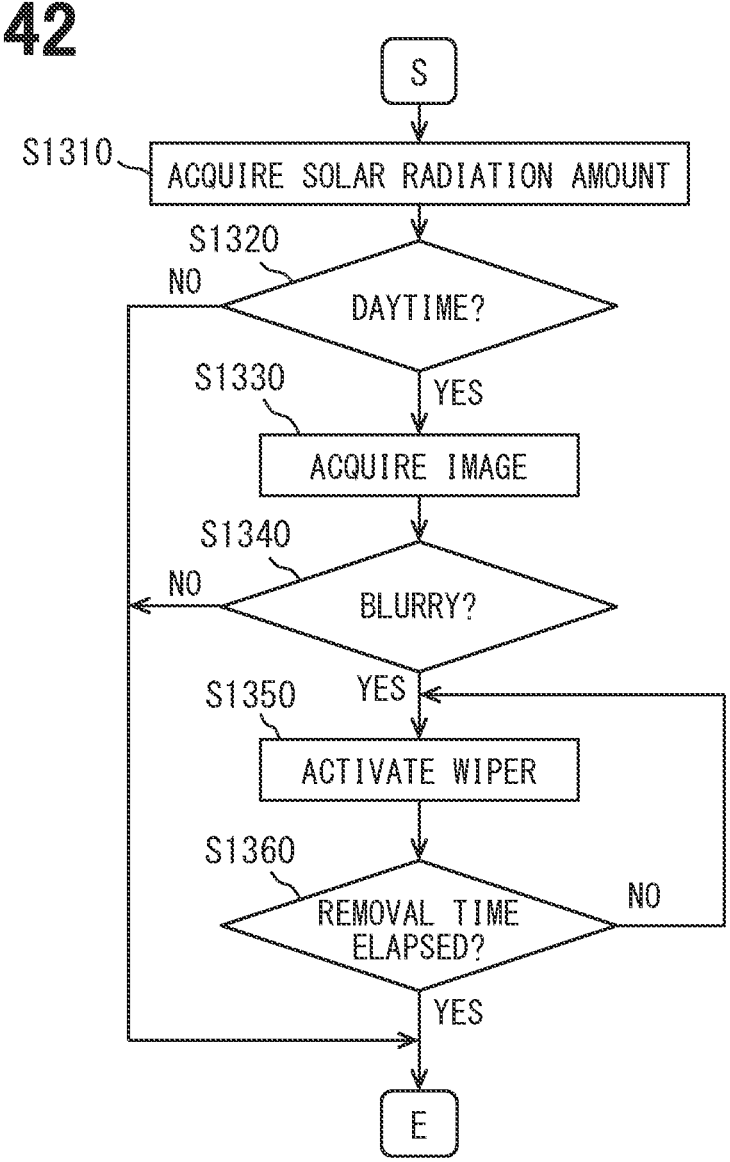

CONTROL DEVICE AND NON-TRANSITORY COMPUTER READABLE MEDIUM

CROSS REFERENCE TO RELATED APPLICATION

The present application is a continuation application of International Patent Application No. PCT/JP2021/031149 filed on Aug. 25, 2021, which designated the U.S. and claims the benefit of priority from Japanese Patent Application No. 2020-161287 filed on Sep. 25, 2020. The entire disclosures of all of the above applications are incorporated herein by reference.

TECHNICAL FIELD

The present disclosure relates to a control device that controls supply of irrigation water to a farm field, and a non-transitory computer readable medium.

BACKGROUND

An automatic irrigation system has been known.

SUMMARY

According to an aspect of the present disclosure, a control device is configured to control a water supply for a farm field.

BRIEF DESCRIPTION OF THE DRAWINGS

The above and other objects, features and advantages of the present disclosure will become more apparent from the following detailed description made with reference to the accompanying drawings. In the drawings:

FIG. 42 is a flowchart illustrating fog detection processing.

DETAILED DESCRIPTION

Figure 1:
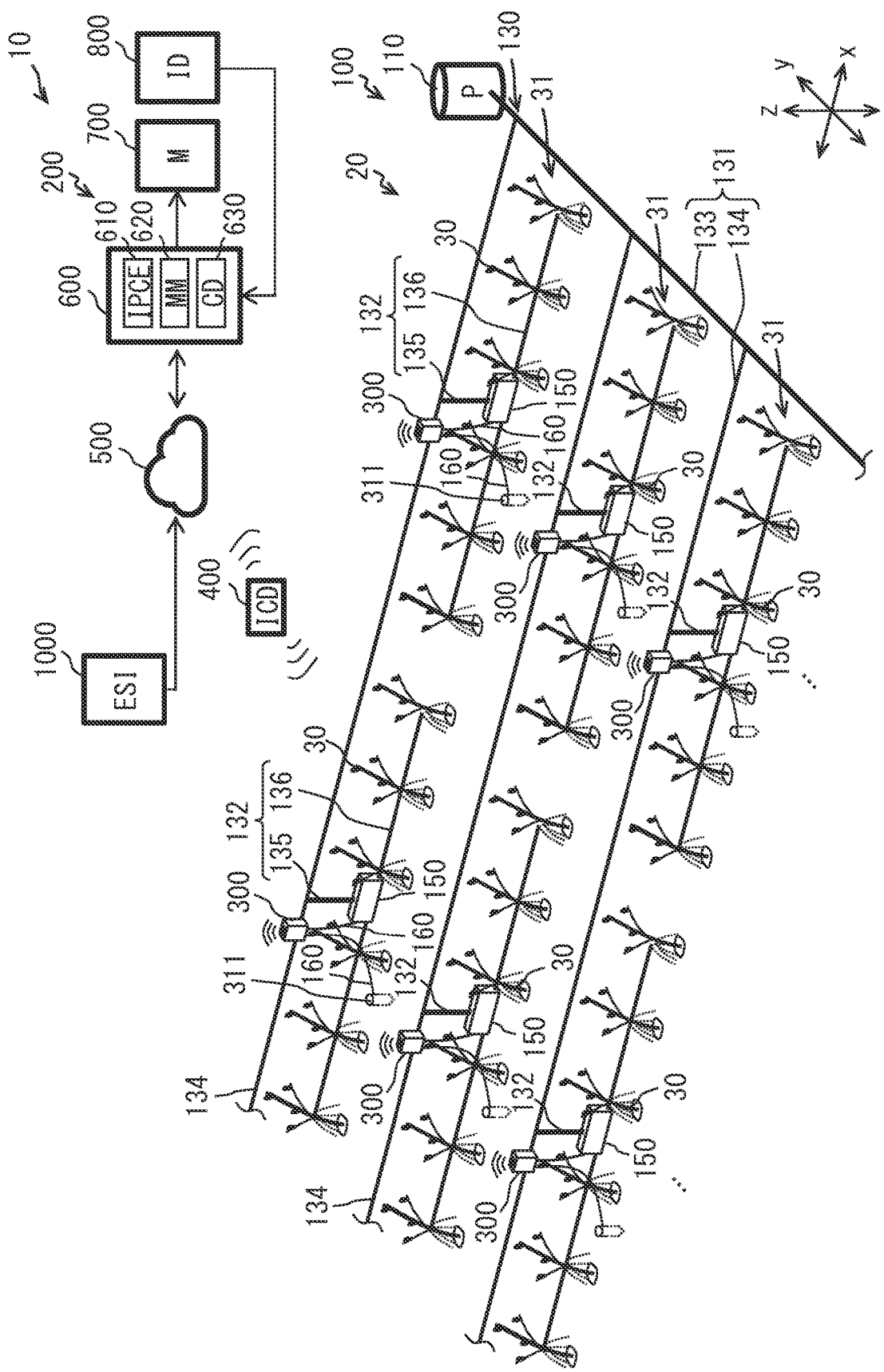
FIG. 1 is a perspective view schematically illustrating an irrigation system provided to a farm field.

Hereinafter, examples of the present disclosure will be described.

According to an example of the present disclosure, an automatic irrigation system includes a water supply device and a control device. The control device controls the timing and amount of water supplied from the water supply device to a farm field.

Application of the automatic irrigation system to a location other than a greenhouse may involve a risk of a soil moisture content being unsuitable for plants growing in the farm field due to a weather change or the like.

A control device according to an example of the present disclosure is configured to control a water supply device, which is configured to supply irrigation water to an open farm field in which a plant grows, to control a supply time and an amount of the irrigation water supplied to the farm field. The control device comprises:

a storage unit configured to store an environment value, which is input from an environment sensor provided to each of a plurality of divided areas obtained by dividing the farm field, and a weather forecast for the farm field, which is input from an external information source;

a calculation unit configured to calculate, based on the environment value and the weather forecast, an irrigation schedule in which the supply time and the amount of the irrigation water individually supplied to each of the plurality of divided areas during an irrigation period are determined; and an output unit configured to output to the water supply device, a control signal to control supply and no supply of the irrigation water to each of the plurality of divided areas based on the irrigation schedule.

An irrigation program according to an example of the present disclosure is to be executed by a processor to cause the processor to acquire an environment value, which is input from an environment sensor provided to each of a plurality of divided areas obtained by dividing an open farm field in which a plant grows, and a weather forecast, which is input from an external information source, calculate, based on the environment value and the weather forecast, an irrigation schedule in which a supply time and an amount of irrigation water individually supplied to each of the plurality of divided areas during an irrigation period are determined, and output a control signal to control supply and no supply of the irrigation water to the divided areas based on the irrigation schedule.

As described above, the irrigation schedule is determined based on the environment value and the weather forecast. Thus, the soil moisture content of an outdoor divided area is prevented from being a value unsuitable for the plants due to weather changes such as rainfall and drying.

Hereinafter, a plurality of embodiments of the present disclosure will be described with reference to the drawings. In each embodiment, the same reference numerals are given to portions corresponding to the matters described in the preceding embodiments, and redundant description may be omitted. In a case where only a part of the configuration is described in each embodiment, other embodiments previously described are applicable to the remaining part of the configuration.

Parts of embodiment that are clearly described to be specifically combinable can be combined with each other. Partial combination between embodiments, between an embodiment and a modification, and between modifications is possible even if they are not clearly described to be combinable, as long as the combination leads to no problem.

First Embodiment

An irrigation system according to the present embodiment will be described based on FIGS. 1 to 20.

Hereinafter, three directions orthogonal to each other are referred to as an x direction, a y direction, and a z direction. In the present embodiment, a plane defined by the x direction and the y direction is along the horizontal plane. The z direction is along the vertical direction. In the drawings, the word "direction" is omitted, and x, y, and z are simply described.

<Farm Field>

An irrigation system 10 is applied to an open farm field 20 cultivated in hills and plains. To simplify the following description, as illustrated in FIG. 1, an embodiment in which the irrigation system 10 is applied to the farm field 20 cultivated in a plain will be described. The size of the farm field 20 is several tens of square meters to several thousands of square kilometers.

The farm field 20 is provided with a plurality of growth sites such as ridges extending in the x direction. These plurality of growth sites extending in the x direction are arranged apart from each other in the y direction. The seeds and seedlings of plants 30 are planted in each of the plurality of growth sites. Examples of the plants 30 include grape, corn, almond, raspberry, leaf vegetables, cotton, and the like.

A plurality of the plants 30 are grown in one growth site. As illustrated in FIG. 1, the plurality of plants 30 are arranged in the x direction to form a column. Hereinafter, the plurality of plants 30 arranged in a column in the x direction is referred to as a plant group 31. In the farm field 20, a plurality of the plant groups 31 are arranged apart from each other in the y direction.

The minimum separation distance between of the plurality of plant groups 31 in the y direction is longer than the minimum separation distance between the plurality of plants 30 included in one plant group 31 in the x direction. The separation interval of the plurality of plant groups 31 in the y direction is variously changed according to the type of the plants 30 grown as well as the undulations and climate of the farm field 20.

The separation interval of the plurality of plant groups 31 in the y direction is about 1 m to 10 m. This guarantees a space sufficient for at least a person to move in the x direction between two plant groups 31 even if branches and leaves of the plants 30 vigorously grow in the y direction.

<Irrigation System>

The irrigation system 10 includes a water supply device 100 and a control device 200. The water supply device 100 supplies irrigation water to the plants 30 in the farm field 20. The control device 200 determines the supply time and amount of the irrigation water from the water supply device 100 to the plants 30 during an irrigation period. The control device 200 determines an irrigation schedule for the water supply device 100.

<Water Supply Device>

The water supply device 100 includes a pump 110, a water supply pipe 130, and a piping module 150. The pump 110 supplies the irrigation water to the water supply pipe 130. The piping module 150 controls discharge of the irrigation water supplied to the water supply pipe 130.

<Pump>

The pump 110 is in a constantly driven state. Alternatively, the pump 110 is in a daytime driving state. The pump 110 pumps out the irrigation water stored in a tank or a reservoir and supplies the irrigation water to the water supply pipe 130. Examples of the irrigation water include well water, river water, rainwater, city water, and the like.

As described below, the water supply pipe 130 is provided with a plurality of water supply valves 152. When each of the plurality of water supply valves 152 is in a closed state and the irrigation water is not leaking from the water supply pipe 130, the water supply pipe 130 is filled with the irrigation water. In this state, the water pressure in the water supply pipe 130 is of a value (pump pressure) depending on the discharge capacity of the pump 110.

When the water supply valve 152 transitions to an open state from the closed state, the irrigation water is discharged from the water supply pipe 130 to the farm field 20. Once the discharge amount of the irrigation water is stabilized on a time-average basis, the water pressure in the water supply pipe 130 is flow pressure lower than the pump pressure.

<Water Supply Pipe>

Water supply pipe 130 includes a main pipe 131 and drip pipe 132. The main pipe 131 is connected to the pump 110. The drip pipe 132 is connected to the main pipe 131. The pump 110 supplies the irrigation water from the main pipe 131 to the drip pipe 132. This irrigation water is supplied from the drip pipe 132 to the farm field 20.

<Main Pipe>

The main pipe 131 includes a longitudinal pipe 133 and a lateral pipe 134. The longitudinal pipe 133 extends in the y direction. The lateral pipe 134 extends in the x direction. The longitudinal pipe 133 and the lateral pipe 134 are connected to each other. With such a configuration, the irrigation water flows in the y direction and the x direction in the main pipe 131.

In the example illustrated in FIG. 1, one longitudinal pipe 133 is connected to one pump 110. A plurality of the lateral pipes 134 extend in the x direction from the longitudinal pipe 133 extending in they direction. The position of the lateral pipe 134 in the z direction is set to be more separated from the ground than the apices of the plants 30 fully grow are.

Needless to say, the configuration illustrated in FIG. 1 is merely an example. The number of pumps 110 and longitudinal pipes 133 provided in the farm field 20, the number of longitudinal pipes 133 connected to one pump 110, the number of longitudinal pipes 133 connected to one lateral pipe 134, and the positions of the lateral pipes 134 and the longitudinal pipes 133 in the z direction are not particularly limited.

The plurality of lateral pipes 134 are arranged apart from each other in the y direction. The minimum separation distance between the plurality of lateral pipes 134 in the y direction is equivalent to the minimum separation distance between the plurality of plant groups 31 in the y direction. One of the plurality of lateral pipes 134 is provided to one of the plurality of plant groups 31. The lateral pipe 134 extends along a direction (x direction) in which the plurality of plants 30 included in the plant group 31 are arranged. The drip pipe 132 is connected to the lateral pipe 134.

<Drip Pipe>

A plurality of the drip pipes 132 are connected to one lateral pipe 134. The plurality of drip pipes 132 connected to one lateral pipe 134 are arranged apart from each other in the x direction.

Figure 2:
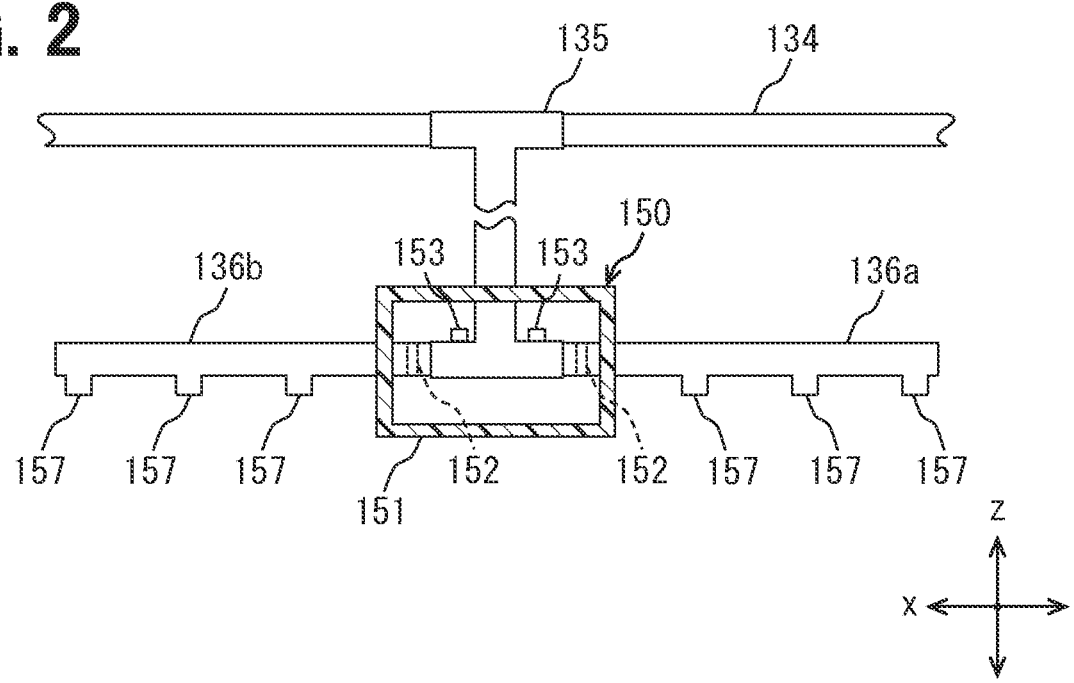
FIG. 2 is a side view illustrating a water supply pipe and a piping module.

As illustrated in FIG. 2, the drip pipe 132 includes an extension pipe 135 and branch pipes 136. The extension pipe 135 extends downward in the z direction from the lateral pipe 134. Two connection ports open in the x direction are formed on the distal end sides of the extension pipe 135. The branch pipes 136 are connected to these two connection ports.

The branch pipes 136 include a first branch pipe 136a connected to one of the two connection ports and a second branch pipe 136b connected to the other of the two connection ports. The first branch pipe 136a and the second branch pipe 136b extend in directions opposite to each other in the x direction from positions connected with the extension pipe 135.

In each of the first branch pipe 136a and the second branch pipe 136b, a drip hole 137 through which an internal space where the irrigation water flows communicates with an external space outside the internal space is formed. The drip hole 137 is opened on the lower surface on the ground side of each of the first branch pipe 136a and the second branch pipe 136b.

The drip hole 137 may be opened on the upper surface on the sky side of each of the first branch pipe 136a and the second branch pipe 136b. The drip hole 137 may be opened on the side surface, connecting the upper surface and the lower surface, of each of the first branch pipe 136a and the second branch pipe 136b.

A plurality of the drip holes 137 are formed in each of the first branch pipe 136a and the second branch pipe 136b. The plurality of drip holes 137 are arranged apart from each other in the x direction. The separation interval between the plurality of drip holes 137 in the x direction is equivalent to the separation interval between the plurality of plants 30 in the x direction. Three drip holes 137 are formed in each of the first branch pipe 136a and the second branch pipe 136b in the example illustrated in FIG. 2.

The separation interval between the plurality of drip holes 137 may be different from the separation interval between the plurality of plants 30. The number of drip holes 137 formed in the first branch pipe 136a and the second branch pipe 136b is not limited to three.

<Flow of Irrigation Water>

The irrigation water supplied to the longitudinal pipe 133 by the pump 110 flows in the y direction in the longitudinal pipe 133. This irrigation water is supplied to each of the plurality of lateral pipes 134 connected to the longitudinal pipe 133. The irrigation water flows in the x direction in each of the plurality of lateral pipes 134.

The irrigation water flowing in the lateral pipe 134 flows into the branch pipe 136 through the extension pipe 135. This irrigation water is discharged from the drip holes 137 of each of the first branch pipe 136a and the second branch pipe 136b. Thus, the irrigation water is supplied to the plant 30.

In the example illustrated in FIG. 1, each of the first branch pipe 136a and the second branch pipe 136b is located more on the ground side of the farm field 20 than the apex side of the plant 30 in the z direction. The irrigation water dripping from the drip holes 137 of the first branch pipe 136a and the second branch pipe 136b is mainly supplied to the trunk and the root of the plants 30.

<Water Spray Nozzle>

A configuration may be employed in which a water spray nozzle is attached to the drip holes 137. An injection direction of the irrigation water injected from the water spray nozzle may be directed toward the ground side or the sky side in the z direction. When the irrigation water is injected toward the sky, the injection direction of the irrigation water is more likely to spread in the horizontal direction as compared with the configuration in which the irrigation water is injected toward the ground. Therefore, the irrigation water injected from the water spray nozzle is sprayed over a wide range of the farm field 20.

Whether the irrigation water is injected toward the ground side or the sky side can be determined based on the type of the plant 30 to which the irrigation water is supplied, the depth of the soil layer of the farm field 20, the climate of the farm field 20, and the like. For example, in cases of the plant 30 having roots growing widely, a shallow soil layer, or a climate under which the drying is less likely to occur, the irrigation water is injected toward the sky side. In cases of the plant 30 having roots growing deeply, a deep soil layer, or a climate under which the drying is likely to occur, the irrigation water is injected toward the ground side.

<Piping Module>

As simply illustrated in FIG. 2, the drip pipe 132 is provided with the piping module 150. The piping module 150 includes a storage box 151, the water supply valve 152, and a water pressure sensor 153. The water supply valve 152 and water pressure sensor 153 are stored in the storage box 151. The storage box 151 is illustrated in a cross-sectional view in the drawing.

<Water Supply Valve>

The water supply valve 152 is provided on the side of the position, of each of the first branch pipe 136a and the second branch pipe 136b, connected with the extension pipe 135. All the drip holes 137 are located between the respective distal end sides of the first branch pipe 136a and the second branch pipe 136b, away from the extension pipe 135, and the water supply valves 152.

When the water supply valves 152 is in the open state, the extension pipe 135 and the drip holes 137 communicate with each other. Thus, the irrigation water is discharged from the drip holes 137. On the other hand, once the water supply valves 152 is in the closed state, the extension pipe 135 and the drip holes 137 are no longer in communication with each other. Thus, the discharging of the irrigation water from the drip holes 137 stops.

The water supply valve 152 provided to the first branch pipe 136a and the water supply valve 152 provided to the second branch pipe 136b are controlled by the control device 200 to be opened and closed independently from one another. With this opening/closing control, the discharge of the irrigation water from the drip holes 137 of the first branch pipe 136a and the discharge of the irrigation water from the drip holes 137 of the second branch pipe 136b are controlled independently from each other. As the water supply valve 152, an electromagnetic valve is employed that can be switched between the open state and the closed state in response to a discharge signal input and not input.

<Water Pressure Sensor>

The water pressure sensor 153 is provided on each of the side of the two connection ports of the extension pipe 135 connected to the first branch pipe 136a and the second branch pipe 136b. The two water pressure sensors 153 each detect the water pressure in the extension pipe 135. The water pressure detected by the water pressure sensor 153 is output to the control device 200.

The locations where the water pressure sensors 153 are disposed are not limited to the example described above. For example, the water pressure sensor 153 may be provided at each of a location between the position of the first branch pipe 136a connected to the extension pipe 135 and the position where the water supply valve 152 is located, and a location between the position of the second branch pipe 136b connect to the extension pipe 135 and the position where the water supply valve 152 is located. The water pressure sensor 153 may be provided at a portion of extension of the extension pipe 135 in the z direction. The water pressure sensor 153 may be provided at a portion of the extension pipe 135 connected to the lateral pipe 134. The water pressure sensor 153 may be at any location more on the lateral pipe 134 side than the water supply valve 152, in a flow path of the irrigation water in the drip pipe 132.

When the water supply valves 152 are in the closed state and the extension pipe 135 is filled with the irrigation water, the water pressure sensor 153 detects the pump pressure.

When the water supply valve 152 transitions to the open state from the closed state, the irrigation water is discharged from the branch pipes 136. When the discharge amount of the irrigation water is stabilized on a time-average basis, the water pressure sensor 153 detects the flow pressure.

When the water supply valve 152 transitions to the closed state from the open state, the irrigation water is no longer discharged from the water supply pipe 130. The water pressure in the water supply pipe 130 gradually recovers from the flow pressure to the pump pressure. The water pressure sensor 153 detects a water pressure in a transition period in which the flow pressure gradually recovers to the pump pressure.

When damage has occurred in the water supply pipe 130 or the water supply valve 152 and the irrigation water is leaking from the damaged portion, the water pressure detected by the water pressure sensor 153 drops. Thus, whether there is a damage can be detected. This damage detection processing is executed by the control device 200.

<Control Device>

Figure 3:
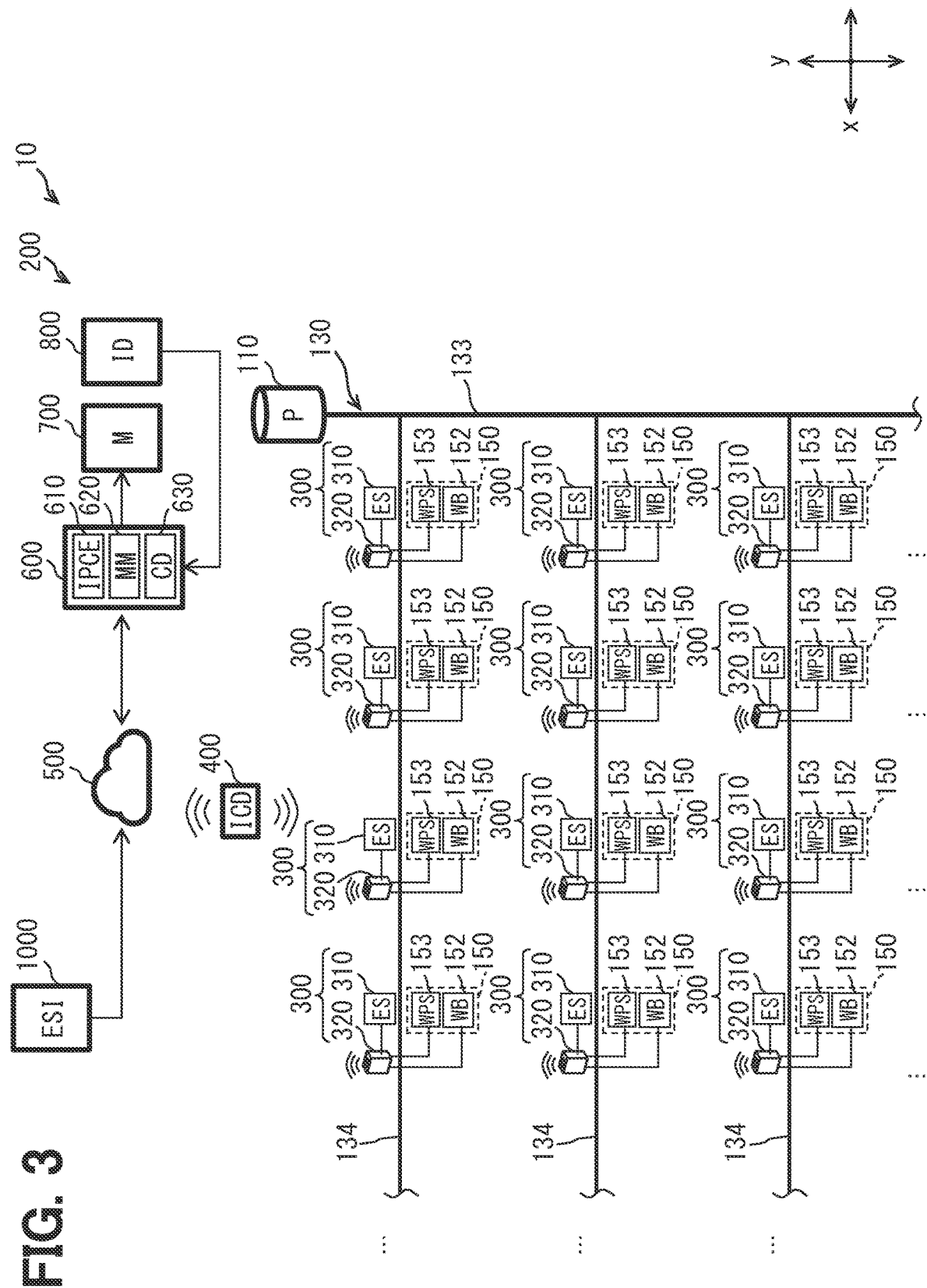
FIG. 3 is a schematic diagram illustrating the irrigation system.

As illustrated in FIGS. 1 and 3, the control device 200 includes a monitoring unit 300, an integrated communication unit 400, an information storage unit 500, and an integrated calculation unit 600. In the drawings, the integrated communication unit 400 is denoted as ICD.

The control device 200 includes a plurality of the monitoring units 300. The plurality of monitoring units 300 are provided in the farm field 20 together with the plurality of piping modules 150. The monitoring unit 300 and the piping module 150 are electrically connected.

The water pressure detected by the water pressure sensor 153 is input to the monitoring unit 300. The monitoring unit 300 detects a physical quantity related to the environment of the farm field 20 as an environment value. Each of the plurality of monitoring units 300 outputs the water pressure and the environment value to the integrated communication unit 400 through wireless communications.

The integrated communication unit 400 outputs the water pressure and the environment value, input from each of the plurality of monitoring units 300, to the information storage unit 500 through wireless communications. The water pressure and the environment value are stored in the information storage unit 500. The information storage unit 500 is what is known as cloud.

The integrated calculation unit 600 reads various types of information such as the water pressure and the environment value stored in the information storage unit 500. Then, the integrated calculation unit 600 appropriately processes the various types of information thus read, and displays the information on a monitor 700 of a smartphone or a personal computer of the user. In the drawings, the monitor 700 is denoted as M.

The integrated calculation unit 600 is included in the smartphone, the personal computer, and the like of the user. The integrated calculation unit 600 includes an information processing calculation device 610, a memory 620, and a communication device 630. In the drawings, the information processing calculation device 610 is denoted as IPCE, the memory 620 is denoted as MM, and the communication device 630 is denoted as CD.

The information processing calculation device 610 includes a processor. The information processing calculation device 610 performs calculation processing related to irrigation. Such a function is realized with an irrigation application program downloaded into the information processing calculation device 610.

The memory 620 is a non-transitory tangible storage medium that non-transiently stores various programs and various types of information readable by a computer or a processor. The memory 620 includes a volatile memory and a nonvolatile memory. The memory 620 stores various types of information input to the communication device 630 and a result of processing by the information processing calculation device 610. The information processing calculation device 610 executes various types of calculation processing based on the information stored in the memory 620.

The communication device 630 has a wireless communication function. The communication device 630 converts a received radio signal into an electrical signal and outputs the electrical signal to the information processing calculation device 610. The communication device 630 outputs the result of processing by the information processing calculation device 610 as a radio signal.

Hereinafter, in order to avoid complication of notation, the technical content of the present embodiment will be described using the integrated calculation unit 600 without particularly distinction among the information processing calculation device 610, the memory 620, and the communication device 630. The information processing calculation device 610 corresponds to the processing calculation unit.

The user inputs a user instruction related to an irrigation schedule to the integrated calculation unit 600 using an input device 800 such as a touch panel or a keyboard. The integrated calculation unit 600 determines the irrigation schedule based on the user instruction and various types of information read from the information storage unit 500. When there is no instruction from the user, the integrated calculation unit 600 automatically determines the irrigation schedule based on the various types of information. In the drawings, the input device 800 is denoted as ID.

Upon determining that an irrigation water supply start time point in the determined irrigation schedule has arrived, the integrated calculation unit 600 outputs an instruction signal for controlling opening/closing of the water supply valve 152 to the information storage unit 500. This instruction signal is input from the information storage unit 500 to the monitoring unit 300 through the integrated communication unit 400. The monitoring unit 300 controls whether to or not to output the discharge signal to the water supply valves 152, based on the instruction signal. Thus, the open/close state of water supply valve 152 is controlled. As a result, the supply of the irrigation water to the farm field 20 is controlled. At least one of the instruction signal and the discharge signal corresponds to the control signal.

<Divided Area>

As illustrated in FIG. 1, one monitoring unit 300 is provided for one drip pipe 132 together with the piping module 150. Therefore, as schematically illustrated in FIG. 3, the plurality of monitoring units 300, together with the water supply valves 152 and the water pressure sensors 153 of the plurality of piping modules 150, are arranged in a matrix in the farm field 20, with the x direction defined as a row direction and with the y direction defined as the column direction.

With this configuration, the environment of each of a plurality of divided areas defined by the row direction and the column direction is individually monitored by a corresponding one of the plurality of monitoring units 300 provided to the respective divided areas. Furthermore, the supply of the irrigation water in each of the plurality of divided areas is individually controlled by a corresponding one of the plurality of monitoring units 300 and a corresponding one of the plurality of piping modules 150.

<Monitoring Unit>

As illustrated in FIG. 3, the monitoring unit 300 includes an environment sensor 310 and a control unit 320. The water supply valves 152 and the water pressure sensor 153 of the piping module 150 are electrically connected to the control unit 320. In the drawings, the environment sensor 310 is denoted as ES, the water supply valve 152 is denoted as WB, and the water pressure sensor 153 is denoted as WPS.

The plurality of environment sensors 310 are arranged in matrix the farm field 20 together with the piping modules 150. The plurality of environment sensors 310 detect the environment values of the plurality of respective divided areas. The plurality of water pressure sensors 153 detect the water pressure of the plurality of respective divided areas. The environment value and the water pressure of each of the plurality of divided areas are stored in the information storage unit 500.

Figure 4:
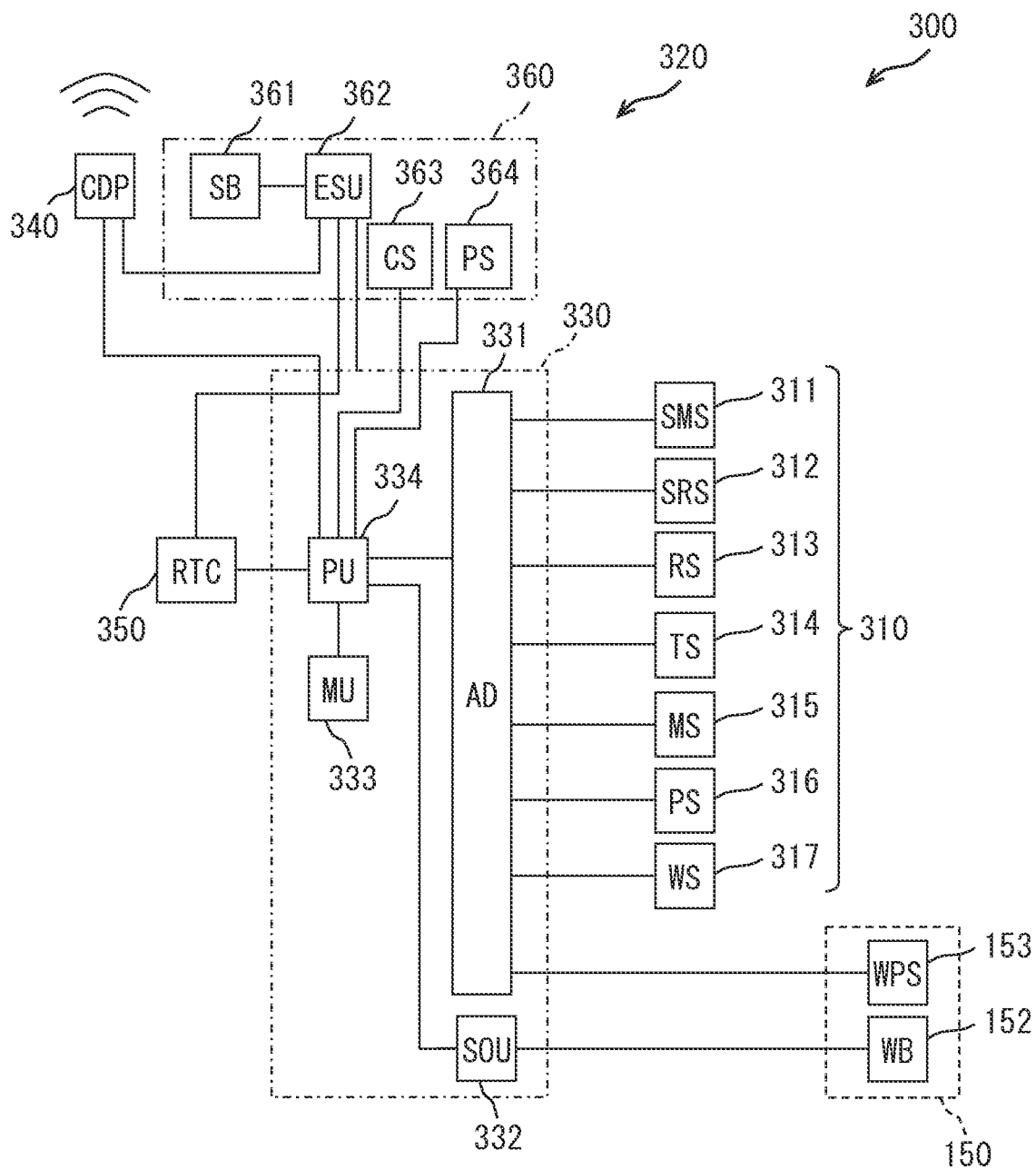
FIG. 4 is a block diagram illustrating a monitoring unit.

As illustrated in FIG. 4, the control unit 320 includes a microcomputer 330, a communication unit 340, an RTC 350, and a power generation unit 360. The microcomputer is an abbreviation for microcomputer. RTC stands for Real Time Clock. In the drawings, the communication unit 340 is denoted as CDP.

The environment value and the water pressure are input to the microcomputer 330. The microcomputer 330 outputs the environment value and the water pressure to the integrated communication unit 400 via the communication unit 340. The integrated communication unit 400 inputs an instruction signal to the microcomputer 330. The microcomputer 330 outputs the discharge signal to the water supply valve 152 based on the instruction signal. The microcomputer 330 corresponds to the calculation processing unit.

The microcomputer 330 has a sleep mode and a normal mode as operation modes. The sleep mode is a state under which the calculation processing by the microcomputer 330 is stopped. The normal mode is a state under which the calculation processing is executed by the microcomputer 330. The normal mode consumes more power than the sleep mode.

The communication unit 340 performs wireless communications with the integrated communication unit 400. The communication unit 340 outputs the electrical signal, output from the microcomputer 330, to the integrated communication unit 400 as a radio signal. Furthermore, the communication unit 340 receives the radio signal, output from the integrated communication unit 400, and converts the radio signal into an electrical signal. The communication unit 340 outputs the electrical signal to the microcomputer 330. When the electrical signal includes the instruction signal, microcomputer 330 switches from the sleep mode to the normal mode.

The RTC 350 has a clock function for keeping time and a timer function for measuring time. The RTC 350 outputs a wake-up signal to the microcomputer 330 when a preset time point arrives or when a preset time period elapses. When the wake-up signal is input to the microcomputer 330 under the sleep mode, microcomputer 330 switches from the sleep mode to the normal mode. The RTC 350 corresponds to the wake-up unit.

The power generation unit 360 converts light energy into electric energy. The power generation unit 360 serves as a power supply source for the monitoring units 300. Electric power is continuously supplied from the power generation unit 360 to the RTC 350. Thus, the clock function and the timer function of the RTC 350 are prevented from being impaired.

As described above, the position of the lateral pipe 134 in the z direction is more separated from the ground than the apices of the plants 30 fully grown are. The control unit 320 is mechanically connected to the lateral pipe 134. With such a configuration, incidence of sunlight onto the power generation unit 360 is less likely to be hindered by the plants 30 fully grown. Thus, the conversion of the light energy into the electric energy by the power generation unit 360 is less likely to be hindered.

<Environment Sensor>

The environment value anticipated to vary among the divided areas of the farm field 20 includes a soil moisture content. Each of the plurality of environment sensors 310 includes a soil moisture sensor 311 that detects a soil moisture content. The plurality of soil moisture sensors 311 detect the soil moisture contents of the plurality of respective divided areas. In the drawings, the soil moisture sensor 311 is denoted as SMS.

The environment value anticipated to vary among the divided areas of the farm field 20 depending the undulations of the farm field 20 and the growth status of the plants 30 includes a solar radiation amount. In the present embodiment, each of the plurality of environment sensors 310 includes a solar radiation sensor 312 that detects the solar radiation amount. The plurality of solar radiation sensors 312 detect the solar radiation amounts of the plurality of respective divided areas. In the drawings, the solar radiation sensor 312 is denoted as SRS.

A soil moisture content distribution and a solar radiation amount distribution of the farm field 20 can be mapped and displayed on the monitor 700, by mapping the soil moisture contents and the solar radiation amounts detected in the plurality of respective divided areas in a form of a matrix. Similarly, the water pressure distribution of the water supply pipe 130 routed all over the farm field 20 can be mapped and displayed on the monitor 700, by mapping the water pressure detected by the plurality of water pressure sensors 153 provided to the plurality of respective divided areas in a form of a matrix. The integrated calculation unit 600 executed processing for such mapping display.

The environment values of the farm field 20 as a whole includes the rainfall amount, temperature, humidity, atmospheric pressure, and air volume. As sensors for detecting these, a rain sensor 313, a temperature sensor 314, a humidity sensor 315, an atmospheric pressure sensor 316, and a wind sensor 317 are provided. These are included in at least one environment sensor 310 of the plurality of monitoring units 300.

The environment sensor 310 of the monitoring unit 300 representatively illustrated in FIG. 4 includes various sensors that detect environment values of the farm field 20 as a whole. In the drawings, the rain sensor 313 is denoted as RS, the temperature sensor 314 is denoted as TS, the humidity sensor 315 is denoted as MS, the atmospheric pressure sensor 316 is denoted as PS, and the wind sensor 317 is denoted as WS. The wind sensor 317 may also detect the wind direction in addition to the air volume.

A configuration may be employed in which at least one of the rain sensors 313, the temperature sensors 314, the humidity sensors 315, the atmospheric pressure sensors 316, and/or the wind sensors 317 are arranged in matrix in the farm field 20.

Such a configuration is effective, for example, in a case where the rainfall amount, the temperature, the humidity, the atmospheric pressure, and the air volume are likely to greatly vary among the divided areas due to the farm field 20 being wide, having severe undulations, or being under a severe climate. By arranging the rainfall amount, the temperature, the humidity, the atmospheric pressure, and the air volume detected by these sensors in a matrix, these environment values can be mapped and displayed on the monitor 700.

A configuration may be employed in which the integrated communication unit 400 is provided with sensors detecting the environment values of the farm field 20 as a whole. With such a configuration, the outputs of these sensors are output to the communication unit 340 via the integrated communication unit 400. The outputs of these sensors are also stored in the information storage unit 500 via the integrated communication unit 400.

Such a configuration is effective, for example, in a case where the rainfall amount, the temperature, the humidity, the atmospheric pressure, and the air volume are less likely to greatly vary among the divided areas due to the farm field 20 being small, having moderate undulations, or being under a mild climate.

<Soil Moisture Content>

Of the various environment values described above, the soil moisture content is an environment value controlled by the irrigation system 10. The irrigation system 10 controls the supply time and amount of the irrigation water supplied to each divided area. Thus, the soil moisture content is individually controlled for each divided area.

The plants 30 are rooted in the soil layer of the farm field 20. The growth of the plants 30 depends on the amount of moisture contained in the soil of this soil layer (soil moisture content). When the soil moisture content exceeds the growth inhibition moisture point, the plants 30 are diseased. When the soil moisture content falls below the permanent wilting point, the plant 30 would never recover from the wilting.

Despite the fact that the growth inhibition moisture point and the permanent wilting point vary among the type of the plant 30, the values of these points have been known. The values are stored in the information storage unit 500.

The current value of the soil moisture content is detected by the soil moisture sensor 311. Examples of the physical quantity related to the soil moisture content include a soil moisture content tension (pF value) and a soil dielectric constant M. The soil moisture sensor 311 of the present embodiment detects the pF value.

The soil moisture content of the soil layer increases/decreases in response to a change in environment of the farm field 20. When it rains in the farm field 20, the soil moisture content increases. When water evaporates from the soil layer, the soil moisture content decreases. When the plant 30 absorbs moisture or water penetrates into a layer lower than the soil layer, the soil moisture content decreases.

The amount of rain (rainfall amount) falling on the soil layer is detected by the rain sensor 313.

The amount of moisture (evaporation amount) evaporated from the soil layer depends on the solar radiation amount, temperature, humidity, and air volume, which are detected by the solar radiation sensor 312, the temperature sensor 314, the humidity sensor 315, and the wind sensor 317.

The water absorption amount which is an amount of water absorbed by the plants 30 per unit time can be estimated in advance based on the type of the plants 30. The amount of water penetrating into a layer lower than the soil layer per unit time can be estimated in advance based on the water retention capacity of the soil. The estimation values are stored in the information storage unit 500.

As described above, each of the current value of the soil moisture content of the soil layer, predicted values related to prediction of an increase and decrease in the soil moisture content of the soil layer from the current value due to a change in environment are each detected by the environment sensor 310. These are stored in the information storage unit 500 as the environment values. The information storage unit 500 stores the growth inhibition moisture point and the permanent wilting point of the plants 30, the water absorption amount which is an amount of water absorbed by the plants 30 per unit time, and the water retention capacity of the soil. The instruction from the user described above (user instruction) is stored in the information storage unit 500. Thus, the information storage unit 500 stores various types of information for determining the irrigation schedule.

<Microcomputer>

As illustrated in FIG. 4, the microcomputer 330 includes an acquisition unit 331, a signal output unit 332, a storage unit 333, and a processing unit 334. In the drawings, the acquisition unit 331 is denoted as AD, the signal output unit 332 is denoted as SOU, the storage unit 333 is denoted as MU, and the processing unit 334 is denoted as PU.

The environment value detected by the environment sensor 310 is input to the acquisition unit 331. The water pressure detected by the water pressure sensor 153 is input to the acquisition unit 331. The acquisition unit 331 is electrically connected to each of the environment sensor 310 and the water pressure sensor 153. FIG. 1 representatively illustrates a wire 160 connecting the acquisition unit 331 and the soil moisture sensor 311, and connecting the acquisition unit 331 and the water pressure sensor 153.

The signal output unit 332 is electrically connected to the water supply valve 152. The signal output unit 332 outputs the discharge signal for controlling opening/closing of the water supply valve 152, to the water supply valve 152. The water supply valves 152 is in the closed state when the discharge signal is not input. The water supply valves 152 is in the open state when the discharge signal is input.

The storage unit 333 is a non-transitory tangible storage medium that non-transiently stores a program and data readable by a computer or a processor. The storage unit 333 includes a volatile memory and a nonvolatile memory. The storage unit 333 stores a program for the processing unit 334 to execute calculation processing. This program includes at least part of the above-described irrigation application program. In addition, the storage unit 333 temporarily stores data for the processing unit 334 to execute the calculation processing. The storage unit 333 stores various types of data input to each of the acquisition unit 331 and the communication unit 340, and acquisition time of the various types of data.

Upon receiving the wake-up signal from the RTC 350, the processing unit 334 transitions from the sleep mode to the normal mode. In the normal mode, the processing unit 334 reads the program and various types of data stored in the storage unit 333 and executes the calculation processing. The processing unit 334 corresponds to the calculation unit.

The processing unit 334 reads various sensor signals input to the acquisition unit 331 and the acquisition time of the instruction signal input to the communication unit 340, from the RTC 350. The processing unit 334 stores the instruction signal and the acquisition time thereof in the storage unit 333.

The processing unit 334 stores the environment value and the water pressure input from the environment sensor 310 and the water pressure sensor 153, as well as the acquisition time thereof in the information storage unit 500 via the communication unit 340 and the integrated communication unit 400. The processing unit 334 outputs the discharge signal to the water supply valve 152 via the signal output unit 332 based on the instruction signal input from the integrated calculation unit 600 via the information storage unit 500, the integrated communication unit 400, and the communication unit 340.

<Communication Unit>

The communication unit 340 converts the electrical signal input from the processing unit 334 into a radio signal. The communication unit 340 outputs the radio signal to the integrated communication unit 400. The communication unit 340 converts the radio signal output from the integrated communication unit 400 into an electrical signal. The communication unit 340 outputs the electrical signal to the processing unit 334.

Figure 5:
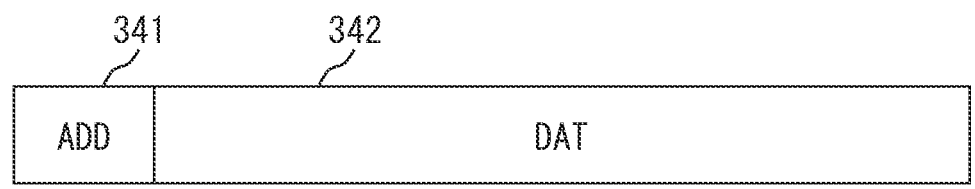
FIG. 5 is a schematic diagram illustrating a radio signal.

The radio signal output from the communication unit 340 includes an address 341 and data 342 as simply illustrated in FIG. 5. In the drawing, the address 341 is denoted as ADD, and the data 342 is denoted as DAT.

As illustrated in FIG. 3, the radio signals are transmitted and received between the plurality of communication units 340 and the integrated communication unit 400. The address 341 included in the radio signal is an identification code indicating from which of the plurality of communication units 340 the radio signal is output. In other words, the address included in the radio signal is an identification code indicating from which of the plurality of processing unit 334 the radio signal is output. The unique address 341 is stored in each of the plurality of storage units 333.

The radio signal output from the integrated communication unit 400 also includes the address 341. The data 342 of the radio signal includes an instruction signal. Each of the plurality of communication units 340 receives this radio signal.

This radio signal is converted into an electrical signal by each of the plurality of communication units 340. Then, the electrical signal is input to each of the plurality of processing units 334. Among the plurality of processing units 334, only the processing unit 334 having the same address 341 as the address 341 included in the electrical signal executes calculation processing based on the electrical signal.

As described below, the microcomputer 330 is intermittently driven with the sleep mode and the normal mode alternately repeated. Therefore, wireless communications between the communication unit 340 and the integrated communication unit 400 are infrequently performed. A time interval during which wireless communications are performed between the communication unit 340 and the integrated communication unit 400 is long. Thus, a large amount of data can be included in the data 342 for a single wireless communication.

<Power Generation Unit>

The power generation unit 360 includes a solar cell 361, a power storage unit 362, a current sensor 363, and a power sensor 364. In the drawings, the solar cell 361 is denoted by SB, the power storage unit 362 is denoted by ESU, the current sensor 363 is denoted by CS, and the power sensor 364 is denoted by PS.

The solar cell 361 converts light energy into electric energy. The power storage unit 362 stores the electric energy (electric power). The electric power stored in the power storage unit 362 is utilized as the driving power for the monitoring units 300.

The current sensor 363 detects current output from the solar cell 361 to the power storage unit 362. The power sensor 364 detects electric power output from the power storage unit 362. The processing unit 334 also stores the current and the electric power in the information storage unit 500 via the communication unit 340 and the integrated communication unit 400.

The driving power for the monitoring units 300 depends on the electric power generated by the power generation unit 360. Therefore, when the amount of light incident on the power generation unit 360 is small, the driving power of monitoring unit 300 might be depleted. In order to avoid this, the microcomputer 330 of the monitoring unit 300 is intermittently driven.

<RTC>

The RTC 350 outputs the wake-up signal to the microcomputer 330 every time the above-described time interval of the intermittent driving (wake-up interval) elapses. Thus, the microcomputer 330 repeatedly transitions between the sleep mode and the normal mode.

The integrated calculation unit 600 determines the wake-up interval described above based on the amount of electric power (power storage amount) stored in the power storage unit 362. In other words, the integrated calculation unit 600 determines the intermittent driving interval based on the power storage amount.

The integrated calculation unit 600 calculates the power storage amount based on the electric power stored in the information storage unit 500. The integrated calculation unit 600 sets a longer intermittent driving interval for a smaller power storage amount. Conversely, the integrated calculation unit 600 sets a shorter intermittent driving interval for a larger power storage amount.

The integrated calculation unit 600 provides the intermittent driving interval in the instruction signal. The processing unit 334 of the microcomputer 330 adjusts the intermittent driving interval upon acquiring the instruction signal. Thus, the processing unit 334 adjusts the wake-up interval of the RTC 350.

A massive change in the environment of the farm field 20 rarely occurs in units of several seconds. Thus, the intermittent driving interval is set to be several tens of seconds to several tens of hours. Accordingly, a time period during which the wireless communications are performed is set to be several tens of seconds to several tens of hours.

<Driving of Irrigation System>

As described above, in the irrigation system 10, signals are transmitted and received between the plurality of monitoring units 300 and the integrated calculation unit 600, and various pieces of data are stored in the information storage unit 500. Each of the plurality of monitoring units 300 and the integrated calculation unit 600 executes a cycle task to be processed in each wake-up interval and an event task to be processed irregularly.

Priorities are given to these cycle and event tasks. When the tasks are to be processed at the same timing, the processing for the event task is prioritized over the processing for the cycle task.

Figure 6:
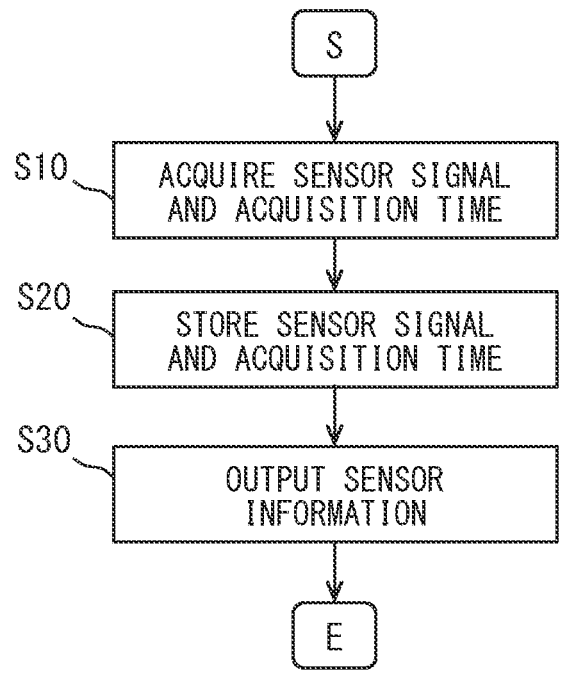
FIG. 6 is a flowchart illustrating sensor processing.

As the cycle task, each of the plurality of monitoring units 300 executes sensor processing illustrated in FIG. 6. The integrated calculation unit 600 executes update processing illustrated in FIG. 7.

Figure 8:
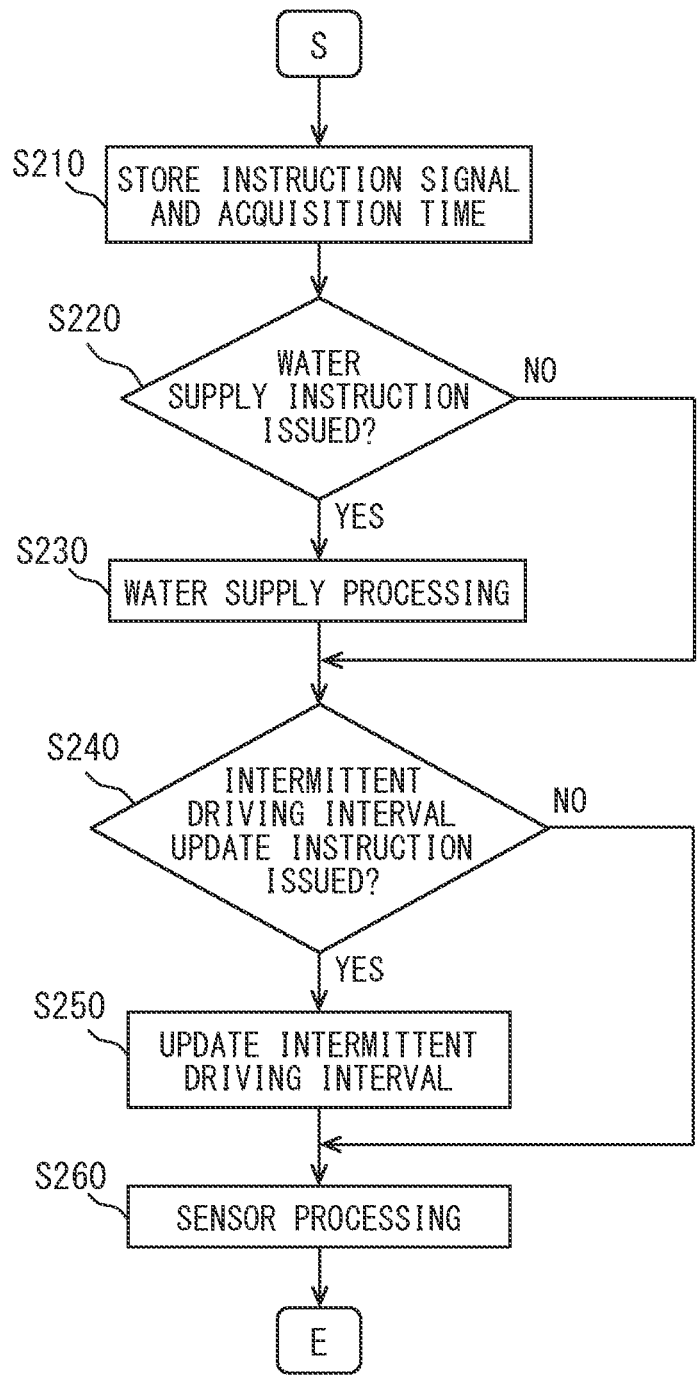
FIG. 8 is a flowchart illustrating monitoring processing.
Figure 9:
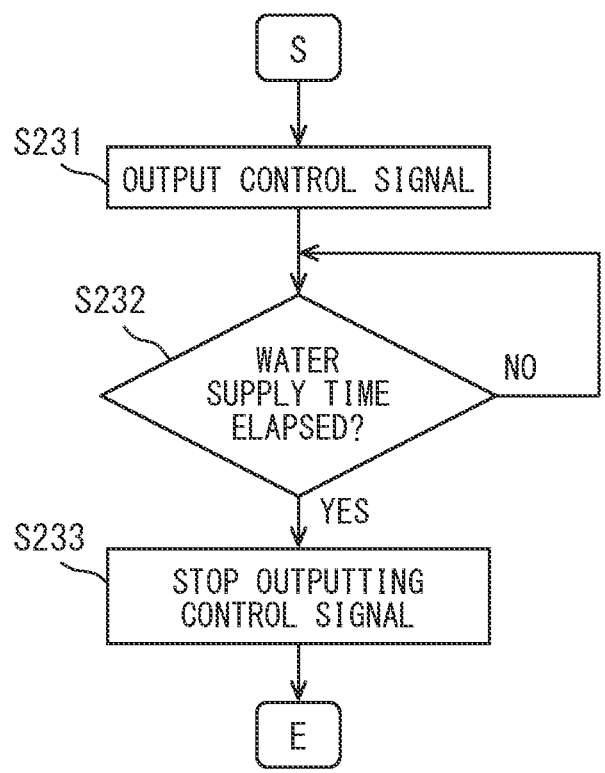
FIG. 9 is a flowchart illustrating water supply processing.

As the event task, each of the plurality of monitoring units 300 executes monitoring processing illustrated in FIG. 8 and water supply processing illustrated in FIG. 9. The integrated calculation unit 600 executes irrigation processing illustrated in FIG. 10, user update processing illustrated in FIG. 11, and forced update processing illustrated in FIG. 12.

The sensor processing and the update processing as the cycle task are described below based on FIGS. 6 and 7. In each of the drawings which are flowcharts, the start is denoted as S and the end is denoted as E.

<Sensor Processing>

Before the start in FIG. 6, the microcomputer 330 of the monitoring unit 300 is in the sleep mode. This microcomputer 330 receives the wake-up signal from the RTC 350. Thus, the microcomputer 330 is switched from the sleep mode to the normal mode. Then, the microcomputer 330 starts executing the sensor processing illustrated in FIG. 6. This sensor processing is executed at the intermittent driving interval of the microcomputer 330.

In step S10, the microcomputer 330 acquires sensor signals input from various sensors. Then, the microcomputer 330 acquires the acquisition time of the sensor signal based on the output of the RTC 350. Thereafter, the microcomputer 330 proceeds to step S20.

Upon proceeding to step S20, the microcomputer 330 stores each of the acquired sensor signal and the acquisition time. Thereafter, the microcomputer 330 proceeds to step S30.

Upon proceeding to step S30, the microcomputer 330 outputs the sensor signal and the acquisition time as the sensor information from the communication unit 340 to the integrated communication unit 400 through wireless communications. The integrated communication unit 400 stores this sensor information in the information storage unit 500. The microcomputer 330 transitions to the sleep mode and ends the sensor processing.

<Update Processing>

Figure 7:
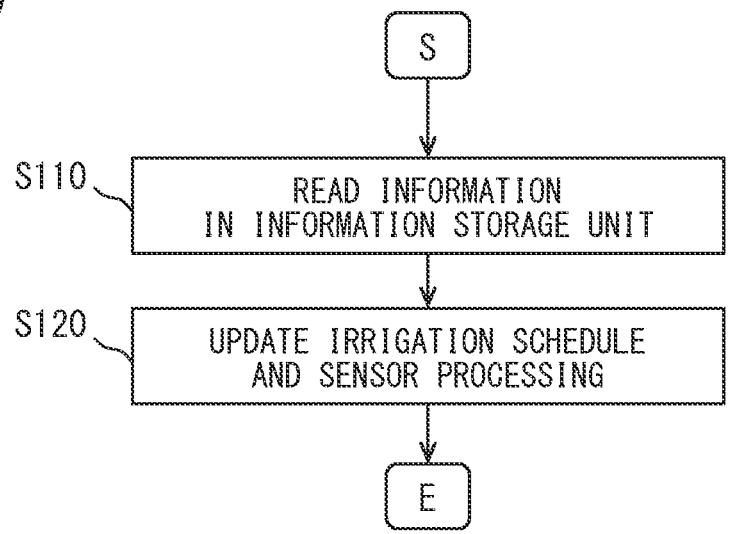
FIG. 7 is a flowchart illustrating update processing.

The integrated calculation unit 600 executes the update processing illustrated in FIG. 7 each time an update cycle elapses. This update cycle is substantially the same as the intermittent driving interval of the microcomputer 330.

In step S110, the integrated calculation unit 600 reads various types of information stored in the information storage unit 500. Then, the integrated calculation unit 600 proceeds to step S120.

Upon proceeding to step S120, the integrated calculation unit 600 updates the irrigation schedule of each of the plurality of monitoring units 300 based on the various types of information read. The integrated calculation unit 600 updates the sensor processing by each of the plurality of monitoring units 300. Specifically, the integrated calculation unit 600 updates the intermittent driving interval corresponding to the execution timing of the sensor processing. The integrated calculation unit 600 holds the updated irrigation schedule and intermittent driving interval and also stores the same in the information storage unit 500. Then, the information storage unit 500 ends the update processing.

In the manner described above, the sensor information, the irrigation schedule, and the intermittent driving interval are updated by the cycle task.

Next, the monitoring processing, the water supply processing, the irrigation processing, the user update processing, and the forced update processing that are the event task will be described based on FIGS. 8 to 12. Each of the monitoring processing, the water supply processing, and the irrigation processing is executed in daytime in order to avoid depletion of the driving power for the monitoring unit 300. Whether it is currently daytime can be determined based on the current time, the solar radiation amount detected by the solar radiation sensor 312, and the like.

<Monitoring Processing>

Before the start in FIG. 8, the microcomputer 330 of the monitoring unit 300 is in the sleep mode. The integrated calculation unit 600 inputs the instruction signal to this microcomputer 330 through wireless communications. As a result, the microcomputer 330 is switched from the sleep mode to the normal mode. Then, the microcomputer 330 starts executing the monitoring processing illustrated in FIG. 8.

In step S210, the microcomputer 330 stores the instruction signal input and the acquisition time of the same. Thereafter, the microcomputer 330 proceeds to step S220.

Upon proceeding to step S220, the microcomputer 330 determines whether the instruction signal includes a water supply instruction for making the water supply valves 152 transition from the closed state to the open state. When the instruction signal includes the water supply instruction, the microcomputer 330 proceeds to step S230. When the instruction signal includes no water supply instruction, the microcomputer 330 proceeds to step S240.

Upon proceeding to step S230, the microcomputer 330 executes the water supply processing illustrated in FIG. 9. Specifically, in step S231, the microcomputer 330 outputs the discharge signal to the water supply valve 152 according to the water supply instruction. Thereafter, the microcomputer 330 proceeds to step S232.

Upon proceeding to step S232, the microcomputer 330 determines whether water supply time included in the instruction signal has elapsed. When the water supply time has not elapsed yet, the microcomputer 330 continues outputting the discharge signal to the water supply valve 152. When the water supply time has elapsed, the microcomputer 330 proceeds to step S233.

Upon proceeding to step S233, the microcomputer 330 stops outputting the discharge signal. Thereafter, the microcomputer 330 proceeds to step S240 illustrated in FIG. 8.

Upon proceeding to step S240, the microcomputer 330 determines whether the instruction signal includes an update instruction for the intermittent driving interval. When the instruction signal includes the update instruction for the intermittent driving interval, the microcomputer 330 proceeds to step S250. When the instruction signal includes no update instruction for the intermittent driving interval, the microcomputer 330 proceeds to step S260.

The update instruction for the intermittent driving interval described above is periodically or randomly output to each of the plurality of monitoring units 300 from the integrated calculation unit 600 or the information storage unit 500 as the instruction signal.

Upon proceeding to step S250, the processing unit 334 of the microcomputer 330 adjusts the time interval during which the wake-up signal from the RTC 350 is output. Thereafter, the microcomputer 330 proceeds to step S260.

Upon proceeding to step S260, the microcomputer 330 executes the sensor processing described based on FIG. 6. When the microcomputer 330 executes the water supply processing in step S230, the environment value after the irrigation water supply is detected in step S260. When the microcomputer 330 does not execute the water supply processing in step S260, the environment value without the irrigation water supply is detected in step S260. The environment value is stored in the information storage unit 500. Upon finishing the sensor processing, the microcomputer 330 transitions to the sleep mode, and ends the monitoring processing.

<Irrigation Processing>

Figure 10:
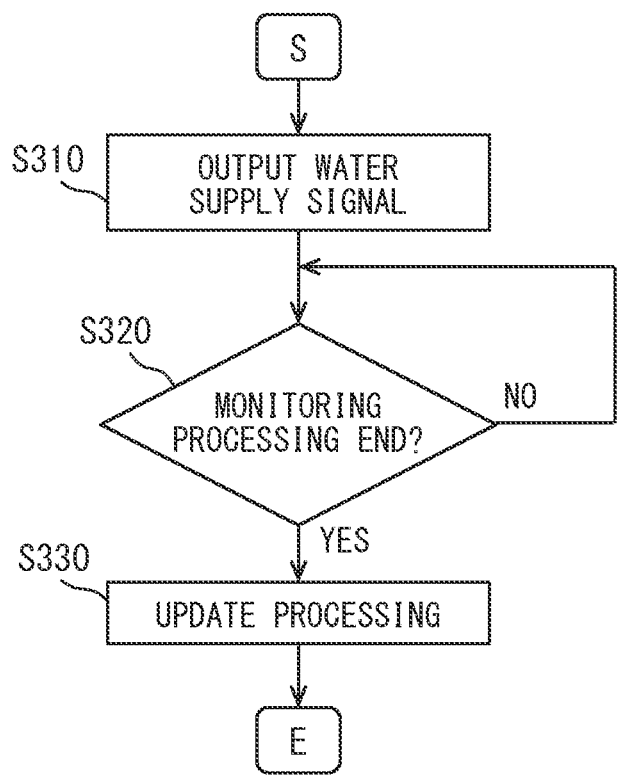
FIG. 10 is a flowchart illustrating irrigation processing.

The integrated calculation unit 600 executes the irrigation processing illustrated in FIG. 10, each time the irrigation water supply timing arrives in the irrigation schedule of each of the plurality of monitoring units 300.

In step S310, the integrated calculation unit 600 outputs an instruction signal (water supply signal) including a water supply instruction to the monitoring unit 300 for the divided area to which the irrigation water is scheduled to be supplied among the plurality of monitoring units 300. Then, the integrated calculation unit 600 proceeds to step S320.

The water supply instruction includes discharge signal output start and discharge signal output time (water supply time). Upon receiving the water supply instruction, the monitoring unit 300 executes the monitoring processing described based on FIG. 8.

Upon proceeding to step S320, the integrated calculation unit 600 stays in a standby state until the monitoring processing by the monitoring unit 300 ends. When the monitoring processing ends, the integrated calculation unit 600 proceeds to step S330.

Whether the monitoring processing has ended can be determined based on whether the expected time until the end of the monitoring processing has elapsed for example. Furthermore, the determination can be made by inquiring the monitoring unit 300 of whether the monitoring processing has ended. A method of determining whether the monitoring processing has ended is not particularly limited.

Upon proceeding to step S330, the integrated calculation unit 600 executes the update processing described based on FIG. 7. Thus, the irrigation schedule is updated based on the environment value after the irrigation water supply.

Note that the irrigation water supply start time points in at least some of the irrigation schedules of the plurality of monitoring units 300 provided for the plurality of respective divided areas may be uniformly set to be the same. Still, the requested supply amount of irrigation water is expected to vary among the plurality of divided areas. Therefore, even if the irrigation water supply start time points in the plurality of divided areas are uniformly set to be the same, the irrigation water supply end times in the plurality of divided areas are the same or different.

With such a configuration, in step S310, the integrated calculation unit 600 outputs the water supply signal toward at least part of the plurality of monitoring units 300 provided for the plurality of respective divided areas. In step S320, the integrated calculation unit 600 is in the standby state until the monitoring processing by the monitoring unit 300 in the divided area with the longest water supply time among the plurality of irrigation schedules ends.

<User Update Processing>

Figure 11:
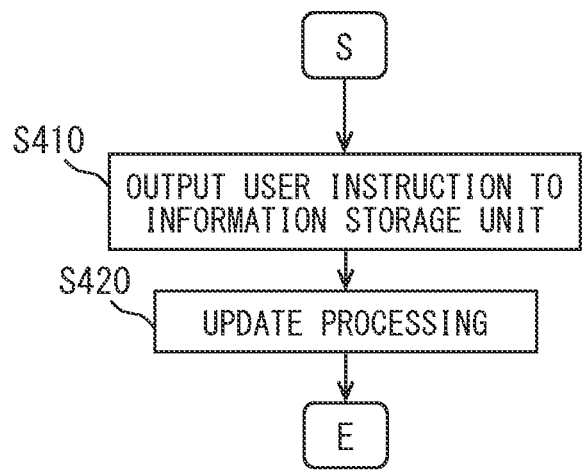
FIG. 11 is a flowchart illustrating user update processing.

The integrated calculation unit 600 executes the user update processing illustrated in FIG. 11 when a user instruction related to adjustment of the irrigation schedule and the intermittent driving interval is input from the input device 800.

In step S410, the integrated calculation unit 600 stores the user instruction input, in the information storage unit 500. Then, the integrated calculation unit 600 proceeds to step S420.

Upon proceeding to step S420, the integrated calculation unit 600 executes the update processing described based on FIG. 7. Thus, the irrigation schedule and the intermittent driving interval are updated based on the user instruction.

<Forced Update Processing>

Figure 12:
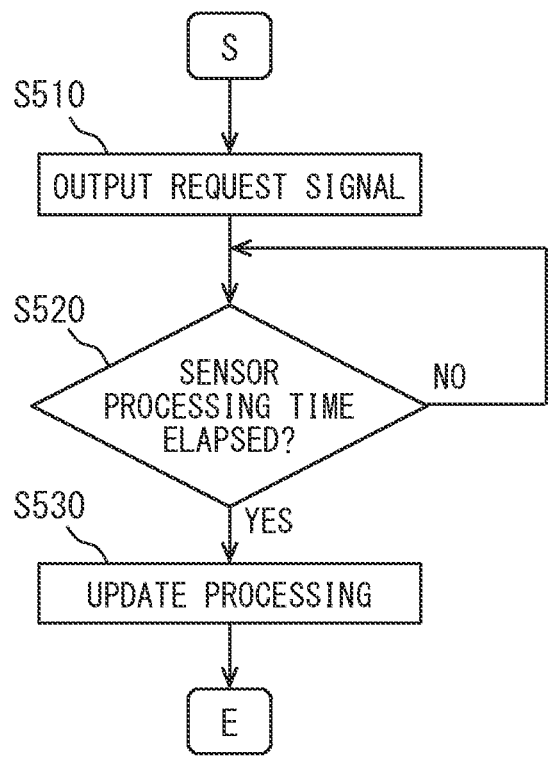
FIG. 12 is a flowchart illustrating forced update processing.

The integrated calculation unit 600 executes the forced update processing illustrated in FIG. 12 when a user instruction related to update of the irrigation schedule and the intermittent driving interval is input.

In step S510, the integrated calculation unit 600 outputs an instruction signal (request signal) including a request instruction for requesting for execution of the sensor processing. This request signal is output to the monitoring unit 300 through wireless communications. Then, the integrated calculation unit 600 proceeds to step S520.

Upon proceeding to step S520, the integrated calculation unit 600 stays in a standby state until the sensor processing by the monitoring unit 300 ends. When the sensor processing ends, the integrated calculation unit 600 proceeds to step S530.

Whether the sensor processing has ended can be determined based on whether the expected time until the end of the sensor processing has elapsed for example. Furthermore, the determination can be made by inquiring the monitoring unit 300 of whether the sensor processing has ended. A method of determining whether the sensor processing has ended is not particularly limited.

Upon proceeding to step S530, the integrated calculation unit 600 executes the update processing described based on FIG. 7. Thus, the irrigation schedule and the intermittent driving interval are updated based on various pieces of data at the time of user update request.

<Individual Irrigation Processing>

As described above based on FIGS. 6 to 12, in the present embodiment, the irrigation schedule in each of the plurality of divided areas is determined by the integrated calculation unit 600. The integrated calculation unit 600 controls the irrigation water supply based on each of the plurality of irrigation schedules.

A configuration may be employed in which the integrated calculation unit 600 determines the irrigation schedule for each of the plurality of divided areas, each of the plurality of monitoring units 300 individually controls the irrigation water supply based on a corresponding one of the plurality of irrigation schedules.

Figure 13:
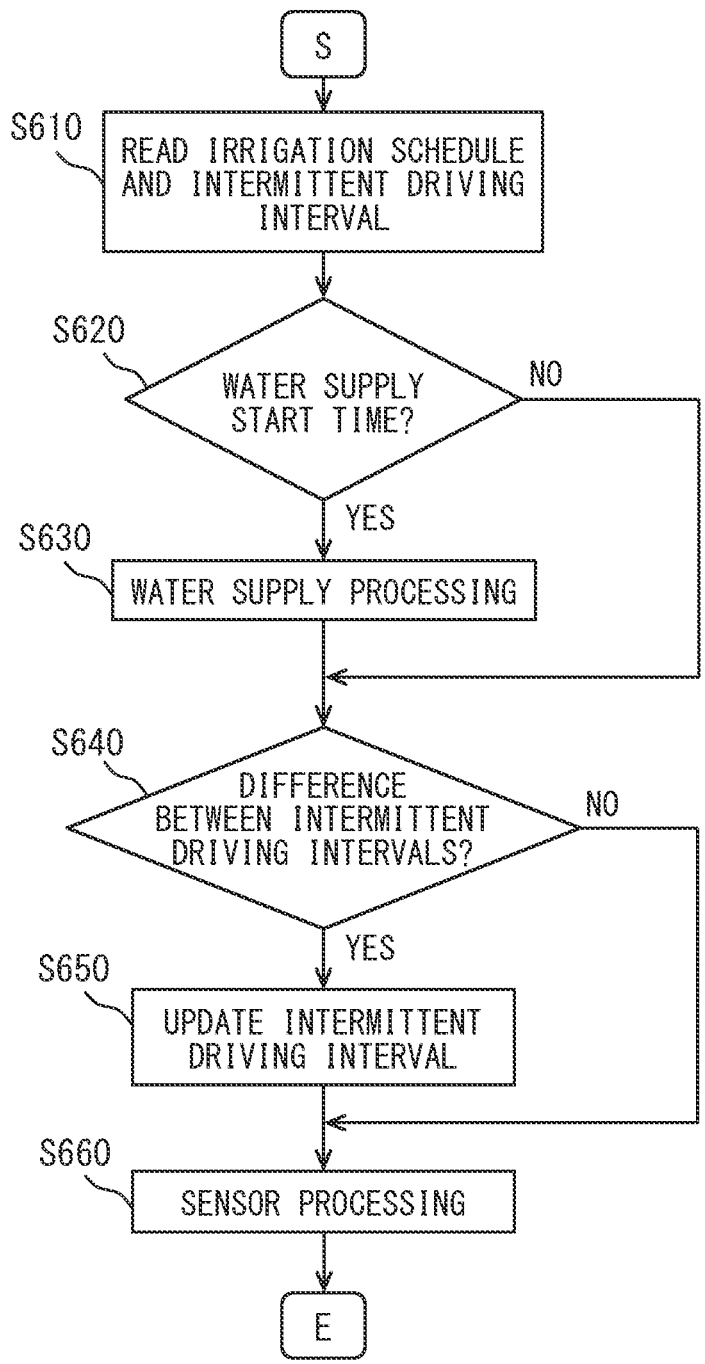
FIG. 13 is a flowchart illustrating individual irrigation processing.

In such a modification, instead of the sensor processing illustrated in FIG. 6 and the irrigation processing illustrated in FIG. 10, the monitoring unit 300 executes individual irrigation processing illustrated in FIG. 13.

Before the start in FIG. 13, the microcomputer 330 of the monitoring unit 300 is in the sleep mode. Upon receiving the wake-up signal from the RTC 350, the microcomputer 330 switches from the sleep mode to the normal mode. Then, the microcomputer 330 starts executing the individual irrigation processing illustrated in FIG. 13. The individual irrigation processing is executed at the intermittent driving interval of the microcomputer 330. The monitoring unit 300 executes the individual irrigation processing as the cycle task.

In step S610, the microcomputer 330 reads the irrigation schedule and the intermittent driving interval stored in the information storage unit 500. Thereafter, the microcomputer 330 proceeds to step S620.

Upon proceeding to step S620, the microcomputer 330 determines whether the current time is after the irrigation water supply start time point in the irrigation schedule read. When the current time is after the irrigation water supply start time point, the microcomputer 330 proceeds to step S630. When the current time is before the irrigation water supply start time point, the microcomputer 330 proceeds to step S640.

Upon proceeding to step S630, the microcomputer 330 executes the water supply processing illustrated in FIG. 9. Thereafter, the microcomputer 330 proceeds to step S640.

Upon proceeding to step S640, the microcomputer 330 compares the intermittent driving interval read with the intermittent driving interval stored. When there is a difference therebetween, the microcomputer 330 proceeds to step S650. When there is no difference therebetween, the microcomputer 330 proceeds to step S660.

Upon proceeding to step S650, the processing unit 334 of the microcomputer 330 adjusts the time interval during which the wake-up signal from the RTC 350 is output. As a result, the intermittent driving interval is updated. Thereafter, the microcomputer 330 proceeds to step S660.

Upon proceeding to step S660, the microcomputer 330 executes the sensor processing described based on FIG. 6. Upon finishing the sensor processing, the microcomputer 330 transitions to the sleep mode, and ends the individual irrigation processing.

A water supply start signal may be set to be output from the RTC 350 at the water supply start time included in the irrigation schedule read in advance. The microcomputer 330 may execute the water supply processing illustrated in FIG. 9 upon receiving the water supply start signal.

<Independent Update>

As a further example, a configuration may be employed in which each of the monitoring units 300 can independently determine the irrigation schedule for a corresponding one of the plurality of divided areas. In such a configuration, each of the plurality of monitoring units 300 executes the update processing illustrated in FIG. 7.

In step S110, each of the plurality of monitoring units 300 reads various types of information stored in the information storage unit 500, such as the user instruction from the user, the growth inhibition moisture point and the permanent wilting point of the plants 30, the water absorption amount that is an amount of water absorbed by the plants 30 per unit time, and the water retention capacity of the soil. Furthermore, each of the plurality of monitoring units 300 acquires the environment value detected by the environment sensor 310.

Note that the plurality of monitoring units 300 may be unable to read various types of information stored in the information storage unit 500 due to a communication failure. In view of this, in the configuration described above, the plurality of monitoring units 300 each stores the various types of information read from the information storage unit 500. When the stored information is not updated due to a communication failure or the like, each of the plurality of monitoring units 300 determines the irrigation schedule based on the non-updated information and the environment value detected by the environment sensor 310. Alternatively, each of the plurality of monitoring units 300 determines the irrigation schedule based on the environment value detected by the environment sensor 310.

<Monitoring Unit Communication>

In a case where the farm field 20 is wide, has severe undulations, or is under severe weather, information transmission between the integrated calculation unit 600 and each of the plurality of monitoring units 300 may fail due to a communication failure. The wireless communications between the integrated communication unit 400 and each of the plurality of monitoring units 300 may fail.

Without taking into consideration the undulations of and an obstacle in the farm field 20 hindering the communications, the monitoring unit 300 with a short separation distance from the integrated communication unit 400 is expected to be less likely to have a communication failure with the integrated communication unit 400, compared with the monitoring unit 300 with a long separation distance from the integrated communication unit 400.

Therefore, for example, among the plurality of monitoring units 300, the monitoring unit 300 with a short separation distance from the integrated communication unit 400 is defined as a child device, and the monitoring unit 300 having a long separation distance is referred to as a grandchild device. Thus, a configuration may be employed in which wireless communications between the integrated communication unit 400 and the grandchild device are performed via the child device.

<Weather Forecast and Irrigation Schedule>

As described above, the information storage unit 500 stores the current value of the soil moisture content, the change/decrease predicted value, and the user instruction. The information storage unit 500 stores the growth inhibition moisture point and the permanent wilting point of the plants 30, the water absorption amount which is an amount of water absorbed by the plants 30 per unit time, and the water retention capacity of the soil.

Furthermore, the information storage unit 500 stores the weather forecast for the farm field 20 output/distributed from an external information source 1000 as illustrated in FIG. 1 and FIG. 3. In the drawings, the external information source 1000 is denoted as ESI.

In S110 of the update processing described based on FIG. 7, the integrated calculation unit 600 reads various types of information including the weather forecast from the information storage unit 500. Then, in S120, the integrated calculation unit 600 determines the irrigation schedule for each of the plurality of monitoring units 300.

<Target Value and Estimation Value>

When determining the irrigation schedule, the integrated calculation unit 600 calculates, for example, a target value and an estimation value of the soil moisture content illustrated in FIGS. 14 to 19. In FIGS. 14 to 19, the vertical axis represents the soil moisture content. The horizontal axis represents time. In the drawings, the soil moisture content is denoted as W, and the time is denoted as T.

It is a matter of course that the target value of the soil moisture content is set to a value between the growth inhibition moisture point and the permanent wilting point. For the sake of sound growth of the plant 30, the target value of the soil moisture content is set to a value with a certain amount of difference from each of the growth inhibition moisture point and the permanent wilting point which are theoretical values.

The integrated calculation unit 600 sets, as the target value of the soil moisture content, an upper limit target value on the growth inhibition moisture point side and a lower limit target value on the permanent wilting point side. In the irrigation period for which the irrigation schedule is set, the integrated calculation unit 600 determines the irrigation schedule with the estimation value of the soil moisture content set between the upper limit target value and the lower limit target value. Furthermore, the integrated calculation unit 600 determines the irrigation schedule in such a manner that the estimation value of the soil moisture content does not exceed the growth inhibition moisture point, even when the estimation value of the soil moisture content is expected to exceed the upper limit target value due to heavy rain. The upper limit target value corresponds to the first target value. The lower limit target value corresponds to the second target value.

In the drawings, the growth inhibition moisture point is denoted as GBMP, the permanent wilting point is denoted as PWP, the upper limit target value is denoted as ULT, and the lower limit target value is denoted as LLT. The growth inhibition moisture point and the permanent wilting point are indicated by broken lines. The upper limit target value and the lower limit target value are indicated by one-dot chain lines. The estimation value of the soil moisture content is indicated by a solid line.

There is a difference between the growth inhibition moisture point and the upper limit target value. This upper limit difference range is determined based on the climate of the farm field 20 in consideration of the sound growth of the plants 30 described above. The climate of the farm field 20 includes an expected value of an average rainfall amount of the farm field 20 in the irrigation period of the irrigation schedule and a total rainfall amount predicted by the weather forecast in the irrigation period of the irrigation schedule. The expected value of the average rainfall amount of the farm field 20 in the irrigation period is stored in the information storage unit 500. In the drawings, the upper limit difference range is denoted as ULD.

Similarly, there is a difference between the permanent wilting point and the lower limit target value. The lower limit difference range is determined based on a recovery time expected to be required for the recovery of the water supply device 100 that has failed, a decrease amount of the soil moisture content per unit time, and the like, in consideration of the sound growth of the plants 30. For example, the lower limit difference range is determined based on a value obtained by multiplying the recovery time by the soil moisture content decrease amount per unit time. The recovery time is stored in the information storage unit 500. In the drawings, the lower limit difference range is denoted as LLD.

For example, when a weather forecast for one week from the external information source 1000 is stored in the information storage unit 500, the integrated calculation unit 600 determines the irrigation schedule for one week. When the weather forecast indicates that there will be no rainfall within in the week, the estimation value of the soil moisture content is expected to gradually decrease with the lapse of time. The decrease amount of the estimation value of the soil moisture content per unit time is determined based on the predicted value of the change/decrease in the soil moisture content of the soil layer. Hereinafter, in order to simplify the description, the estimation value of the soil moisture content is simply referred to as an estimation value as necessary.

<Irregular Water Supply>

Figure 14:
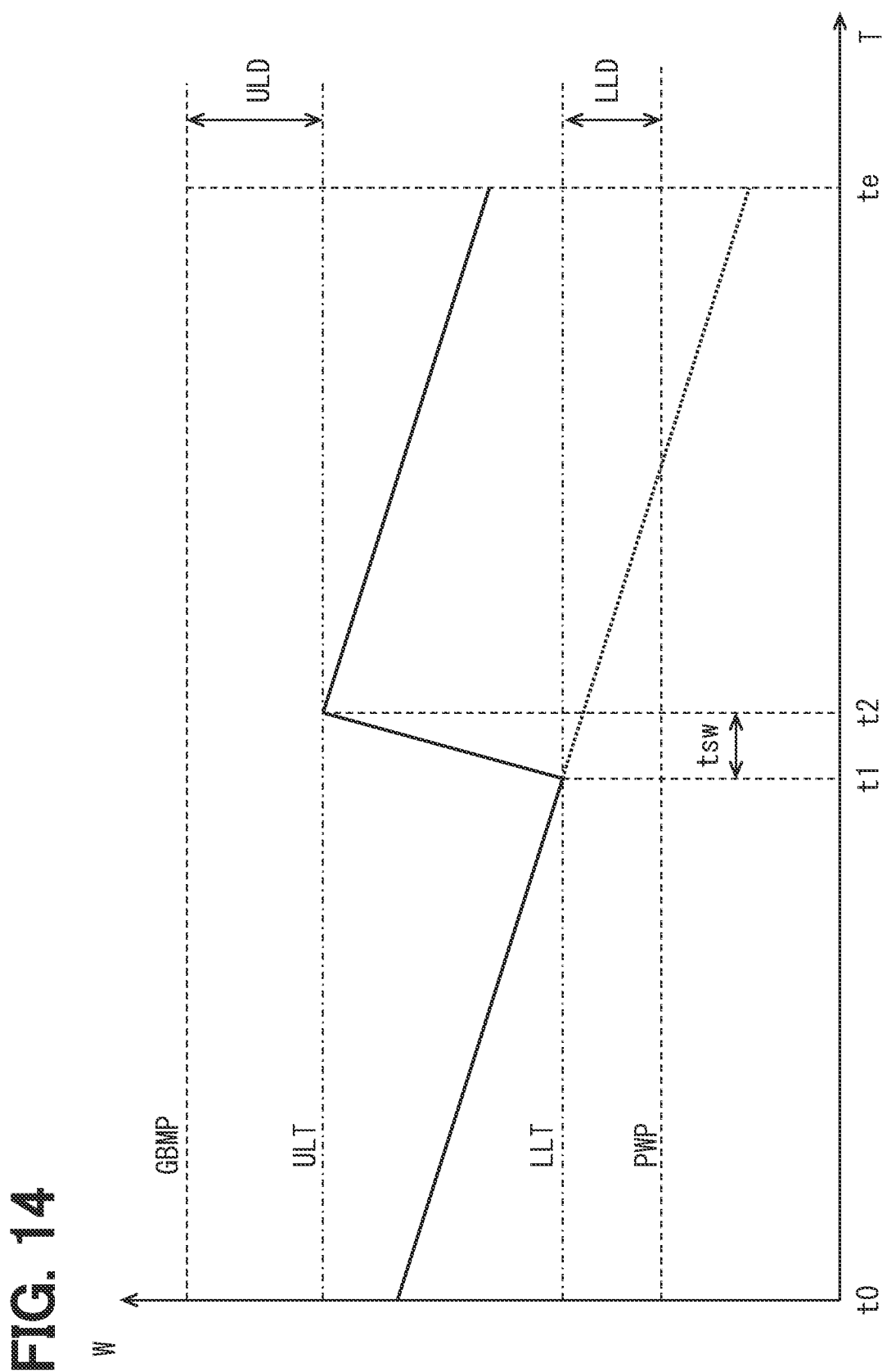
FIG. 14 is a timing chart illustrating an irrigation schedule.

In the example illustrated in FIG. 14, the estimation value gradually decreases from a time point t0 due to evaporation of water from the soil layer and the like. As a result of the gradual decrease, the estimation value is expected to fall below the lower limit target value at a time point t1. Therefore, the integrated calculation unit 600 determines the start of the irrigation water supply at the time point t1. As described above as an example, the irrigation water supply start time point can be set to the time point at which the estimation value reaches the lower limit target value.

The integrated calculation unit 600 determines the water supply amount at the time point t1 so that the estimation value reaches the upper limit target value. That is, the integrated calculation unit 600 determines water supply time tsw from the time point t1. At a time point t2 arriving when the water supply time tsw elapses, the estimation value reaches the upper limit target value. Thereafter, the estimation value gradually decreases again. In the drawings, the water supply time tsw is illustrated in an exaggerated manner, that is, longer than actual.

With the water supply described above, the estimation value is expected to be between the upper limit target value and the lower limit target value at a time point te one week after the time point t0. Therefore, the integrated calculation unit 600 determines not to supply the irrigation water between the time point t2 and the time point te.

Further example will be described. Specifically, as illustrated in FIG. 15 as an example, when the weather forecast indicates rainfall in an amount expressed with a bar at a time point tr during the irrigation period of the irrigation schedule, the integrated calculation unit 600 determines the irrigation schedule as follows.

Figure 15:
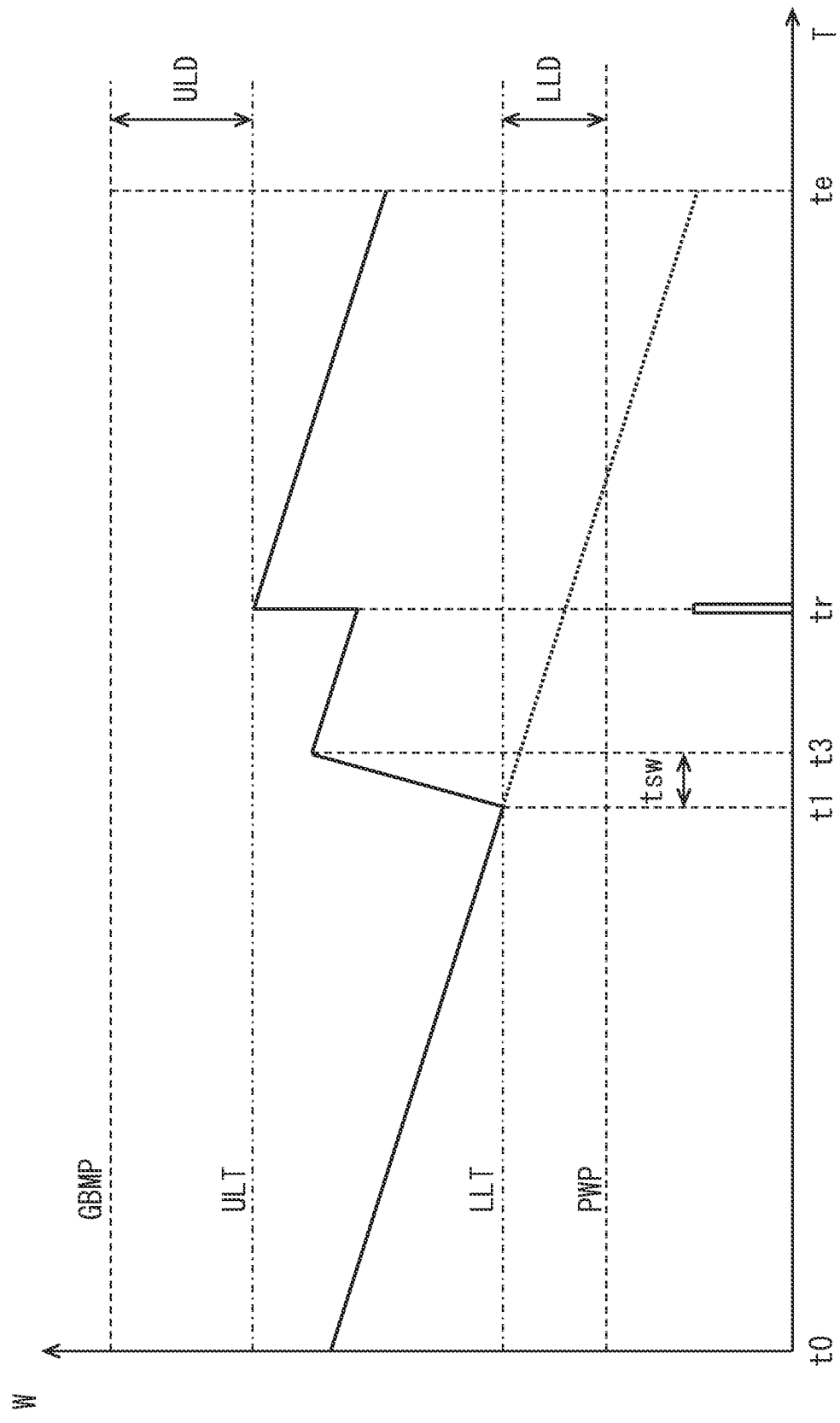
FIG. 15 is a timing chart illustrating the irrigation schedule.

Also in the example illustrated in FIG. 15, the estimation value gradually decreases from the time point t0. The estimation value is expected to fall below the lower limit target value at a time point t1. Therefore, the integrated calculation unit 600 determines the start of the irrigation water supply at the time point t1.

However, the forecast indicates the rainfall at the time point tr after the time point t1. Therefore, the integrated calculation unit 600 determines the supply amount of the irrigation water at the time t1 so that the estimation value reaches the upper limit target value at the time point tr based on the supply of the irrigation water at the time point t1 and the rainfall at the time point tr. The water supply time tsw from the time point t1 illustrated in FIG. 15 is shorter than the water supply time tsw from the time t1 illustrated in FIG. 14 due to rainfall at the time point tr.

The irrigation water supply starts at the time point t1, and at a time point t3 after elapse of the water supply time tsw, the irrigation water supply ends. The estimation value increases to be slightly smaller than the upper limit target value as a result of this irrigation water supply.

Thereafter, the estimation value gradually decreases again. Still, due to the rainfall at the time point tr, the estimation value is expected to reach a value at or around the upper limit target value.

Note that, in this example, it is indicated that the estimation value reaches the upper limit target value at the time point tr. However, when the estimation value reaches the upper limit target value or a value (intermediate target value) smaller than the upper limit target value is not particularly limited, as long as the estimation value increased by the irrigation water supply and rainfall does not exceed the upper limit target value. The intermediate target value is a value between the upper limit target value and the lower limit target value. The intermediate target value is an intermediate value between the upper limit target value and the lower limit target value for example.

<Regular Water Supply>

In the example of the irrigation schedule described above, the irrigation water supply start time point is set to a time point when the estimation value reaches the lower limit target value. Alternatively, a configuration may be employed in which the irrigation water supply start time point is set in advance.

Hereinafter, the irrigation schedule according to such a configuration will be described based on FIGS. 16 to 19. In this example, the water supply is scheduled to be performed for a total of three times at a predetermined water supply interval during the irrigation period of the irrigation schedule. The irrigation water supply is performed at time points ts1, ts2, and ts3.

Figure 16:
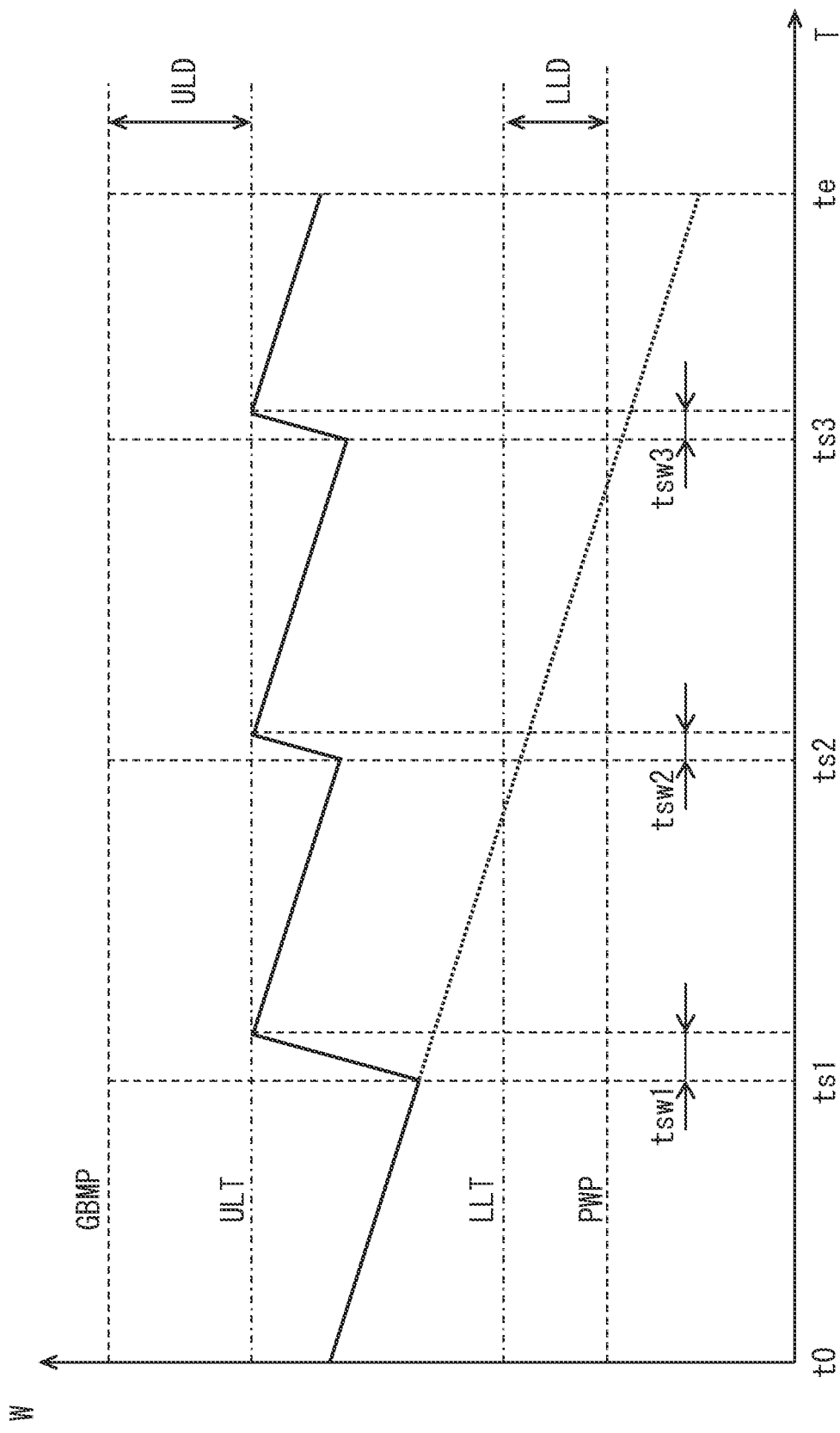
FIG. 16 is a timing chart illustrating the irrigation schedule.

As illustrated in FIG. 16 as an example, when the weather forecast indicates no rainfall during the irrigation period, the integrated calculation unit 600 determines the irrigation schedule as follows.

The estimation value is expected to gradually decrease from the time point t0 to the first supply time point ts1. The integrated calculation unit 600 determines the water supply amount at the first supply time point ts1 so that the estimation value reaches the upper limit target value. That is, the integrated calculation unit 600 determines first water supply time tsw1 from the first supply time point ts1.

After the water supply at the first supply time point ts1 is performed, the estimation value gradually decreases until the second supply time point ts2. The integrated calculation unit 600 determines second water supply time tsw2 from the second supply time point ts2 so that the estimation value reaches the upper limit target value.

After the water supply at the second supply time point ts2 is performed, the estimation value gradually decreases until the third supply time point ts3. The integrated calculation unit 600 determines third water supply time tsw3 from the third supply time point ts3 so that the estimation value reaches the upper limit target value.

By performing the irrigation water supply based on the irrigation schedule described above, the estimation value is expected to be a value slightly smaller than the upper limit target value at the time point to a week after the time point t0. It is expected that the soil moisture content around the upper limit target value is maintained in the irrigation schedule. It is a matter of course that the soil moisture content around the intermediate target value may be maintained in the irrigation schedule by adjusting the water supply amount at the supply time.

Figure 17:
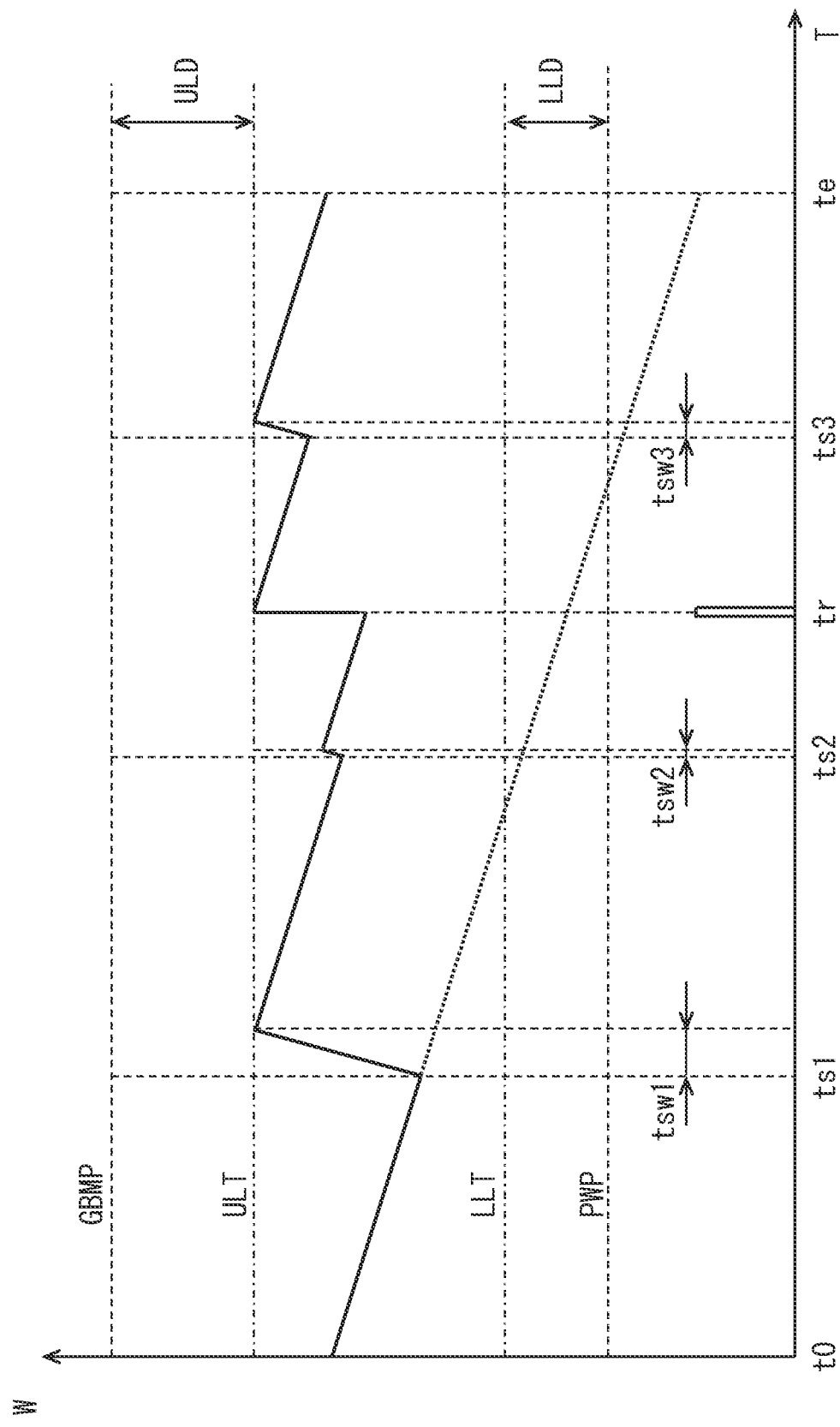
FIG. 17 is a timing chart illustrating the irrigation schedule.

As illustrated in FIG. 17 as an example, when the weather forecast indicates rainfall in an amount expressed with a bar at the time point tr during the irrigation period, the integrated calculation unit 600 determines the irrigation schedule as follows.

The estimation value gradually decreases from the time point t0 to the first supply time point ts1 also in the example illustrated in FIG. 17. The integrated calculation unit 600 determines the first water supply time tsw1 from the first supply time point ts1 so that the estimation value reaches the upper limit target value.

Thereafter, the estimation value gradually decreases until the second supply time point ts2. The forecast indicates the rainfall at the time point tr after the second supply time point ts2. Thus, the integrated calculation unit 600 determines the second water supply time tsw2 from the second supply time point ts2 so that the estimation value reaches the upper limit target value at the time point tr, as a result of the irrigation water supply at the second supply time point ts2 and the rainfall at the time point tr. The second water supply time tsw2 illustrated in FIG. 17 is shorter than the second water supply time tsw2 illustrated in FIG. 16 due to rainfall at the time point tr.

After the water supply at the second supply time point ts2 is performed, the estimation value increases to be slightly smaller than the upper limit target value. Thereafter, the estimation value gradually decreases again. Still, due to the rainfall at the time point tr, the estimation value reaches a value at or around the upper limit target value.

Thereafter, the estimation value gradually decreases until the third supply time point ts3 after the rainfall at the time point tr. In this case, the integrated calculation unit 600 determines the third water supply time tsw3 from the third supply time point ts3 so that the estimation value reaches the upper limit target value. The third water supply time tsw3 illustrated in FIG. 17 is shorter than the third water supply time tsw3 illustrated in FIG. 16 due to rainfall at the time point tr after the second water supply time tsw2.

Figure 18:
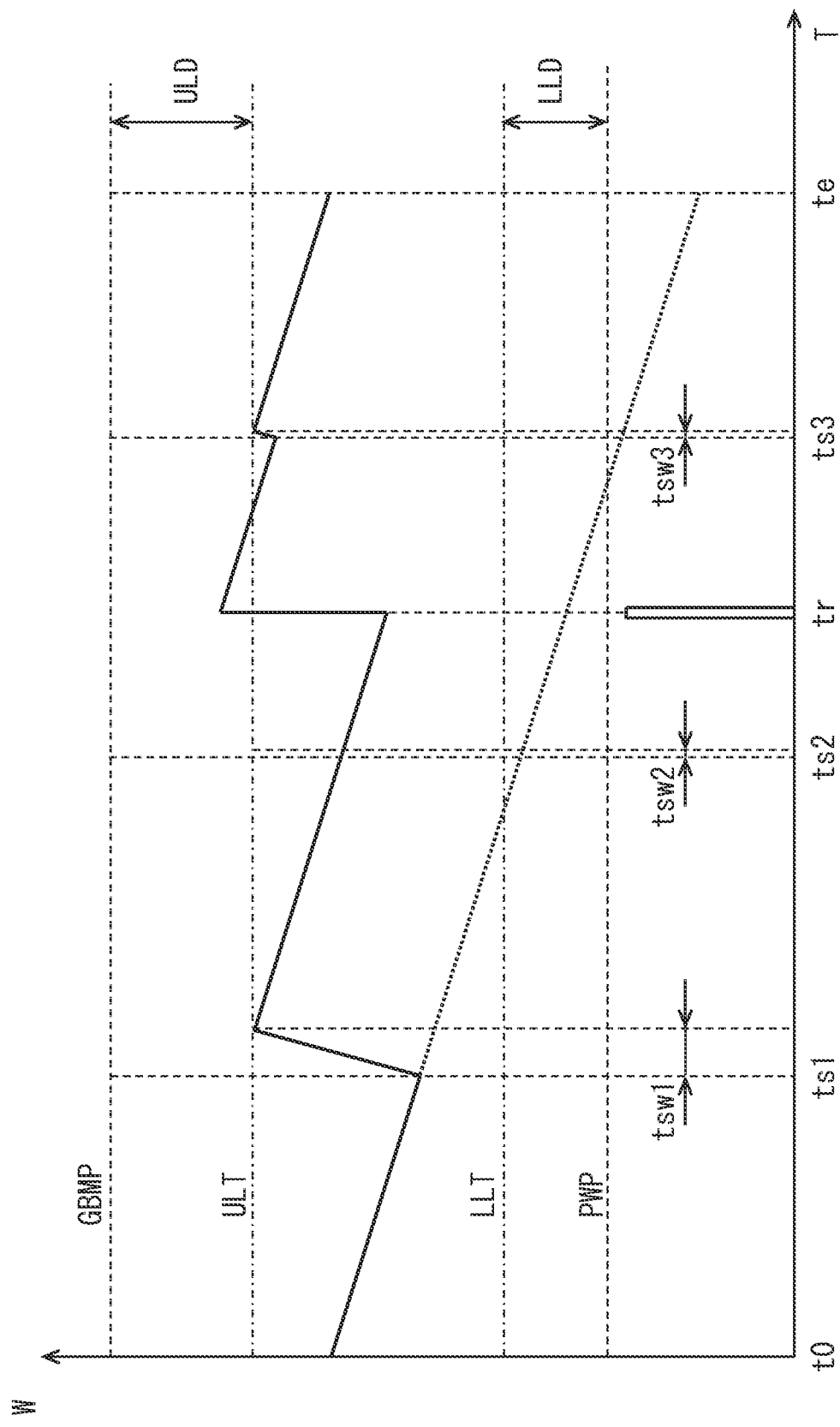
FIG. 18 is a timing chart illustrating the irrigation schedule.

As illustrated in FIG. 18 as an example, when the weather forecast indicates heavy rainfall in an amount expressed with a bar at the time point tr during the irrigation period, the integrated calculation unit 600 determines the irrigation schedule as follows.

The integrated calculation unit 600 determines whether the estimation value exceeds the upper limit target value at the time point tr, due to the irrigation water supply at the second supply time point ts2 and the rainfall at the time point tr. In the example illustrated in FIG. 18, since the amount of rainfall at the time point tr is large, the estimation value is expected to exceed the upper limit target value at the time point tr, even if it is determined to stop the water supply at the second supply time point ts2.

Figure 19:
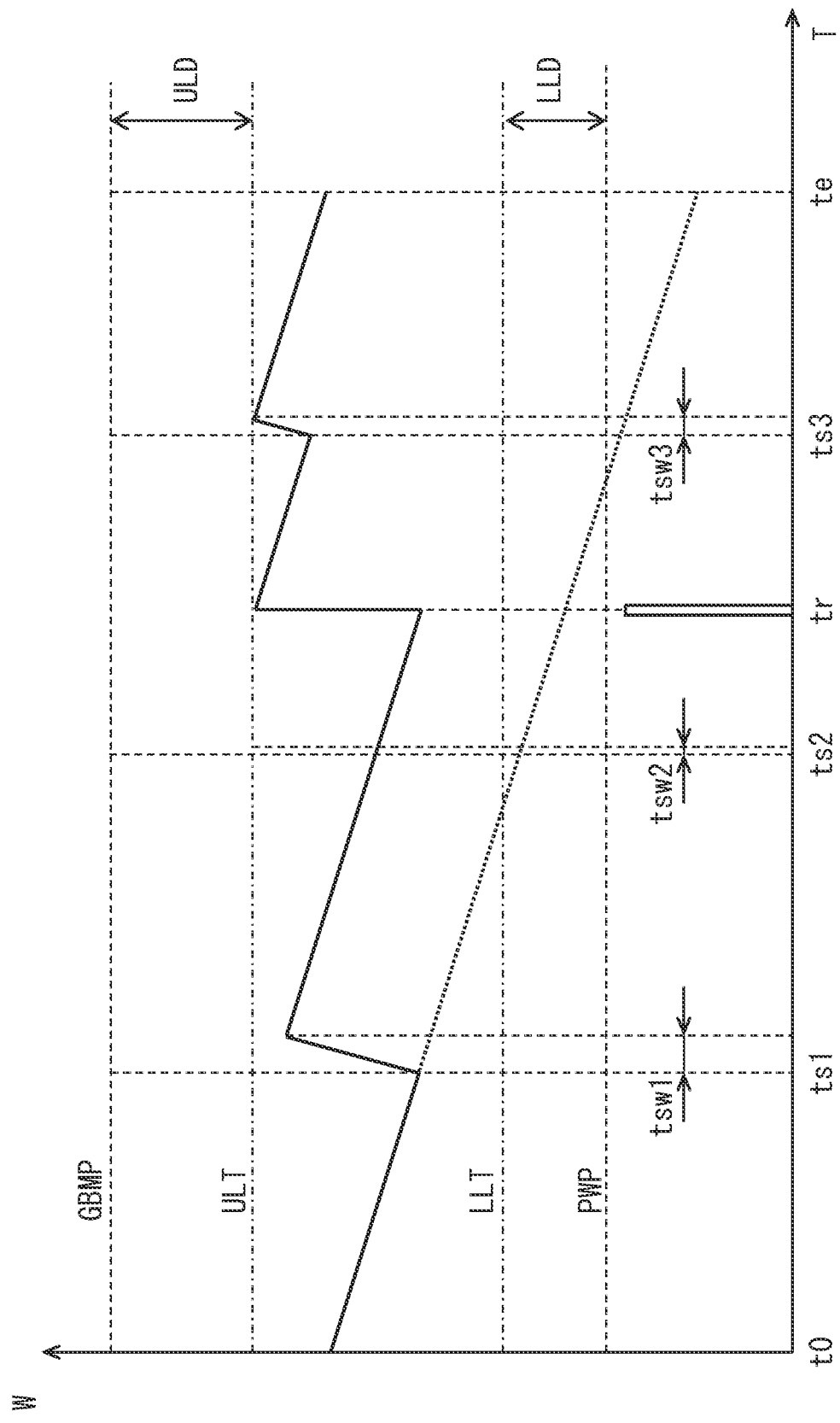
FIG. 19 is a timing chart illustrating the irrigation schedule.

Therefore, for example, as illustrated in FIG. 19, the integrated calculation unit 600 reduces the water supply amount at the first supply time point ts1 by an amount corresponding to the difference between the estimation value at the time point tr and the upper limit target value as a result of stopping the water supply at the second supply time point ts2. As a result, the estimation value is the upper limit target value at the time point tr.

As described above, the integrated calculation unit 600 determines the irrigation schedule so that the estimated amount of the total water supply amount at the supply time before the forecasted rainfall time is prevented from exceeding the upper limit target value at the forecasted rainfall time.

The estimation value is expected to exceed the upper limit target value at the forecasted rainfall time due to the heavy rain and to fall below the lower limit target value at a time point before the forecasted rainfall time. In this case, the integrated calculation unit 600 perform the water supply at a supply time point before the forecasted rainfall time, without making the estimation value exceed the growth inhibition moisture point at the forecasted rainfall time.

The estimation value may fall below the lower limit target value during the regular supply times due to sudden drying. In view of this, the irregular water supply described based on FIG. 14 and FIG. 15 may be performed in addition to the regular water supply described above based on FIG. 16 to FIG. 19. That is, the water supply may be performed at the timing when the estimation value reaches the lower limit target value between the regular supply times. Alternatively, in order to avoid such irregular water supply, the water supply interval may be changed based on the decrease amount of the estimation value per unit time.

The supply time and the forecasted rainfall time may overlap. The rainfall amount is merely a forecast, and it is difficult to predict how much the soil moisture content increases due to rainfall. Therefore, if water is supplied during rainfall, the soil moisture content may excessively increase beyond expectation. To avoid this, when the supply time and the forecasted rainfall time overlap, the integrated calculation unit 600 changes the supply time to be later than the forecasted rainfall time without making the estimation value fall below the lower limit target value.

<Irrigation Schedule Update Processing>

Figure 20:
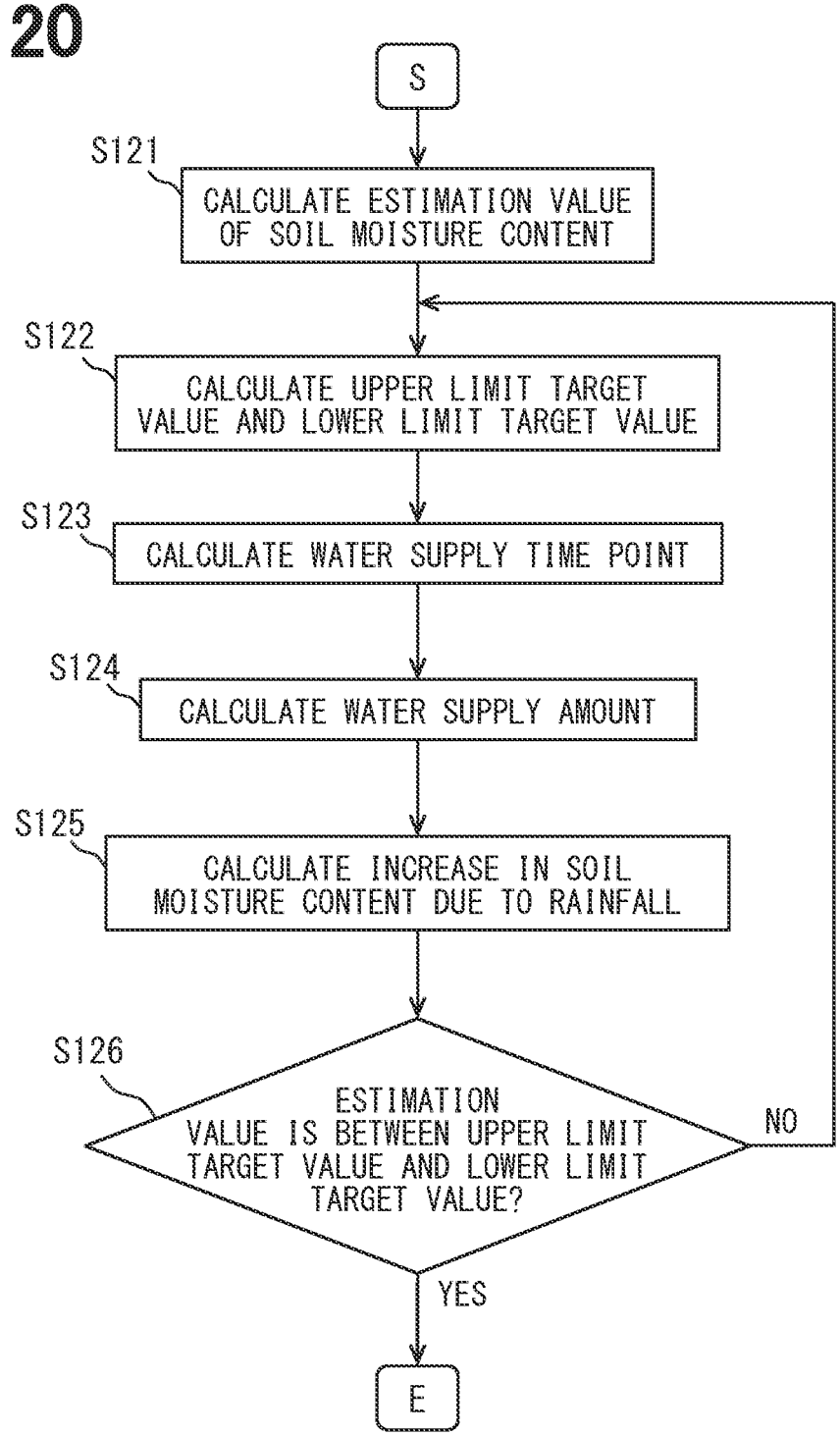
FIG. 20 is a flowchart illustrating irrigation schedule update processing.

In step S120 of the update processing described based on FIG. 7, the integrated calculation unit 600 executes irrigation schedule update processing illustrated in FIG. 20.

Before the start in FIG. 20, the integrated calculation unit 600 executes step S110 illustrated in FIG. 7. This means that the various types of information stored in the information storage unit 500 have been read by the integrated calculation unit 600.

In step S121, the integrated calculation unit 600 calculates the decrease amount of the soil moisture content per unit time, based on the environment value related to the amount of water evaporated from the soil layer, the water absorption amount that is the amount of water absorbed by the plants 30 per unit time, and the amount of water penetrating into a layer lower than the soil layer per unit time. Then, the integrated calculation unit 600 calculates the estimation value of the soil moisture content without taking the increase in the soil moisture content due to the water supply and the rainfall, based on the decrease amount in the soil moisture content per unit time thus calculated and on the current value of the soil moisture content read from the information storage unit 500. Then, the integrated calculation unit 600 proceeds to step S122.

Upon proceeding to step S122, the integrated calculation unit 600 calculates the upper limit target value based on the growth inhibition moisture point, the expected value of the average rainfall amount of the farm field 20 during the irrigation period of the irrigation schedule, the total rainfall amount predicted by the weather forecast during the irrigation period of the irrigation schedule, and the like. At the same time, the integrated calculation unit 600 calculates the lower limit target value based on the permanent wilting point, the recovery time, the decrease amount of the soil moisture content per unit time calculated in step S121, and the like. Then, the integrated calculation unit 600 proceeds to step S123.

For the irregular irrigation water supply, the integrated calculation unit 600 determines a water supply time point as a time point at which the estimation value is expected to fall below the lower limit target value in step S123. For the regular irrigation water supply, the integrated calculation unit 600 calculates the water supply time point in the irrigation schedule, based on the elapsed time from the previous water supply time point and the water supply interval in step S123. When the irregular water supply and the regular water supply are both performed, at step S123, the integrated calculation unit 600 calculates the water supply time point in the irrigation schedule, based on the time point at which the estimation value is expected to fall below the lower limit target value, the elapsed time from the previous water supply time point, and the water supply interval. Then, the integrated calculation unit 600 proceeds to step S124.

Upon proceeding to step S124, the integrated calculation unit 600 calculates the water supply amount based on a difference between the upper limit target value and the estimation value at the water supply time point. The integrated calculation unit 600 calculates the water supply amount for each water supply time point from the water supply time point on the start side to the water supply time point on the end side of the irrigation schedule. In this way, the integrated calculation unit 600 calculates the estimation value of the soil moisture content in consideration of an increase in the soil moisture content due to the water supply. Then, the integrated calculation unit 600 proceeds to step S125.

Upon proceeding to step S125, the integrated calculation unit 600 calculates an increase in the soil moisture content due to rainfall during the irrigation period of the irrigation schedule. It is a matter of course that when the weather forecast indicates no rainfall during the irrigation period, the increase in the soil moisture content due to rainfall is zero. Then, the integrated calculation unit 600 proceeds to step S126.

Upon proceeding to step S126, the integrated calculation unit 600 determines whether the water supply time point, the water supply amount, and the rainfall at the forecasted rainfall time calculated so far have resulted in the estimation value of the soil moisture content falling between the upper limit target value and the lower limit target value during the entire irrigation period. When the estimation value of the soil moisture content falls between the upper limit target value and the lower limit target value in the entire irrigation period, the integrated calculation unit 600 ends the irrigation schedule update processing.

On the other hand, when the estimation value of the soil moisture content does not fall between the upper limit target value and the lower limit target value in the entire irrigation period, the integrated calculation unit 600 returns to step S122. Then, the integrated calculation unit 600 recalculates the target value, the water supply time point, and the water supply amount. The integrated calculation unit 600 repeats step S123 to step S126 until the estimation value of the soil moisture content falls between the upper limit target value and the lower limit target value in the entire irrigation period.

The integrated calculation unit 600 calculates the water supply amount, the water supply time point, and the target value in this order. When the estimation value of the soil moisture content as a result of recalculating the water supply amount only falls between the upper limit target value and the lower limit target value in the entire irrigation period, the integrated calculation unit 600 does not recalculate the water supply time point and the target value. When the estimation value of the soil moisture content as a result of recalculating the water supply amount only does not fall between the upper limit target value and the lower limit target value during the entire irrigation period, the integrated calculation unit 600 recalculates the water supply amount and the water supply time point. When the estimation value of the soil moisture content still does not fall between the upper limit target value and the lower limit target value in the entire irrigation period, the integrated calculation unit 600 recalculates each of the water supply amount, the water supply time point, and the target value. In this process, the integrated calculation unit 600 sets the upper limit target value to be closer to the growth inhibition moisture point. The integrated calculation unit 600 sets the lower limit target value to be closer to the permanent wilting point.

<Operations and Effects>

As described above, the irrigation schedule is determined based on the estimation value of the soil moisture content based on the environment value and the like and the weather forecast. Thus, the soil moisture content of an outdoor divided area is prevented from being unsuitable for the plants 30 due to weather changes such as rainfall and drying. The soil moisture content is prevented from exceeding the growth inhibition moisture point or falling below the permanent wilting point.

The integrated calculation unit 600 determines the water supply amount to prevent the estimation value of the soil moisture content from exceeding the upper limit target value lower than the growth inhibition moisture point over the entirety of the irrigation period of the irrigation schedule. Then, the integrated calculation unit 600 determines a range of difference between the growth inhibition moisture point and the upper limit target value (upper limit difference range) based on the climate of the farm field 20 and the like. The climate of the farm field 20 includes an expected value of an average rainfall amount of the farm field 20 in the irrigation period and a total rainfall amount predicted by the weather forecast in the irrigation period.

With the upper limit difference range thus set, the soil moisture content is prevented from reaching the growth inhibition moisture point, even when the rainfall heavier than forecasted occurs after the soil moisture content has been brought close to the upper limit target value through the irrigation water supply.

The integrated calculation unit 600 determines the water supply amount to prevent the estimation value of the soil moisture content from falling below the lower limit target value higher than the permanent wilting point over the entirety of the irrigation period of the irrigation schedule. The integrated calculation unit 600 determines a range of difference between the permanent wilting point and the lower limit target value (lower limit difference range) based on the recovery time, the decrease amount in the soil moisture content per unit time, and the like.

With the lower limit difference range thus set, even if the soil moisture content is close to the lower limit target value but the irrigation water cannot be supplied due to a failure of the water supply valves 152 or the like, the soil moisture content is prevented from reaching the permanent wilting point before the recovery from the failure.

The integrated calculation unit 600 supplies water at a timing when the estimation value of the soil moisture content reaches the lower limit target value in the irrigation schedule. As a result, the soil moisture content is prevented from falling below the lower limit target value.

The integrated calculation unit 600 set the irrigation water supply time to be different from the forecasted rainfall time. Thus, even if the amount of rainfall is larger than that forecasted, excessive increase in the soil moisture content is suppressed.

Second Embodiment

Next, a second embodiment will be described based on FIGS. 21 to 24.

In the example described in the first embodiment, the integrated calculation unit 600 determines the irrigation schedule for each of the plurality of divided areas using the weather forecast input from the external information source 1000. On the other hand, in the present embodiment, the integrated calculation unit 600 predicts a weather change in the farm field 20 based on the environment value detected by each of the plurality of monitoring units 300. Then, the integrated calculation unit 600 determines the irrigation schedule for each of the plurality of divided areas, by using the weather prediction.

For example, in Japan, an automatic weather data collection system called AMeDAS is provided at a weather observation point in each region. Weather data such as rainfall amount, temperature, sunshine duration, wind direction, and wind speed are observed by AMeDAS provided at the weather observation points in these regions. In addition, weather data such as distribution and transition of rain clouds over Japan is observed by a weather satellite or the like. The Meteorological Agency announces the weather forecast based on the weather data observed by AMeDAS at the local weather observation points and the weather satellites.

The similar applies to other countries. The weather forecast based on weather data observed by observation devices at local weather observation points and satellites provided are announced in each country.

Unfortunately, the weather observation points where the weather data is acquired are not equally distributed. The distribution density of the weather observation points is higher in a region with a higher population density. Thus, the distribution density of the weather observation points is lower in a region with a lower population density.

The farm field 20 provided with the irrigation system 10 is generally cultivated in a region with a lower population density. Therefore, the weather change of the cultivated area of the entire farm field 20 may be collectively notified by the weather forecast with no difference among parts in the farm field 20.

Generally, the farm field 20 cultivated in a region with a low population density is wide and has severe undulations. The climate of the farm field 20 may be severe. Thus, the weather may largely differ between the east side and west side of the farm field 20, contrary to the weather forecast notifying a change in weather in the entire farm field 20. There may be heavy rain on the east side, while the weather is fine on the west side. Depending on the movement of rain clouds, an accumulated rainfall amount or an accumulated solar radiation amount in one day may significantly differ between the east side and the west side. Thus, there may be a case where the weather forecast is the same between the east side and the west side, but the weather changes differently between the east side and the west side.

In view of this, the irrigation system 10 of the present embodiment predicts a change in weather of the farm field 20 based on the environment value detected in each of the plurality of divided areas. Then, the irrigation schedule for each of the plurality of divided areas is determined by using the weather prediction.

In the present embodiment, the environment sensor 310 of each of the plurality of monitoring units 300 include the soil moisture sensor 311, the solar radiation sensor 312, the rain sensor 313, the temperature sensor 314, the humidity sensor 315, the atmospheric pressure sensor 316, and the wind sensor 317. The environment values of the divided areas are detected by these various sensors.

Figure 21:
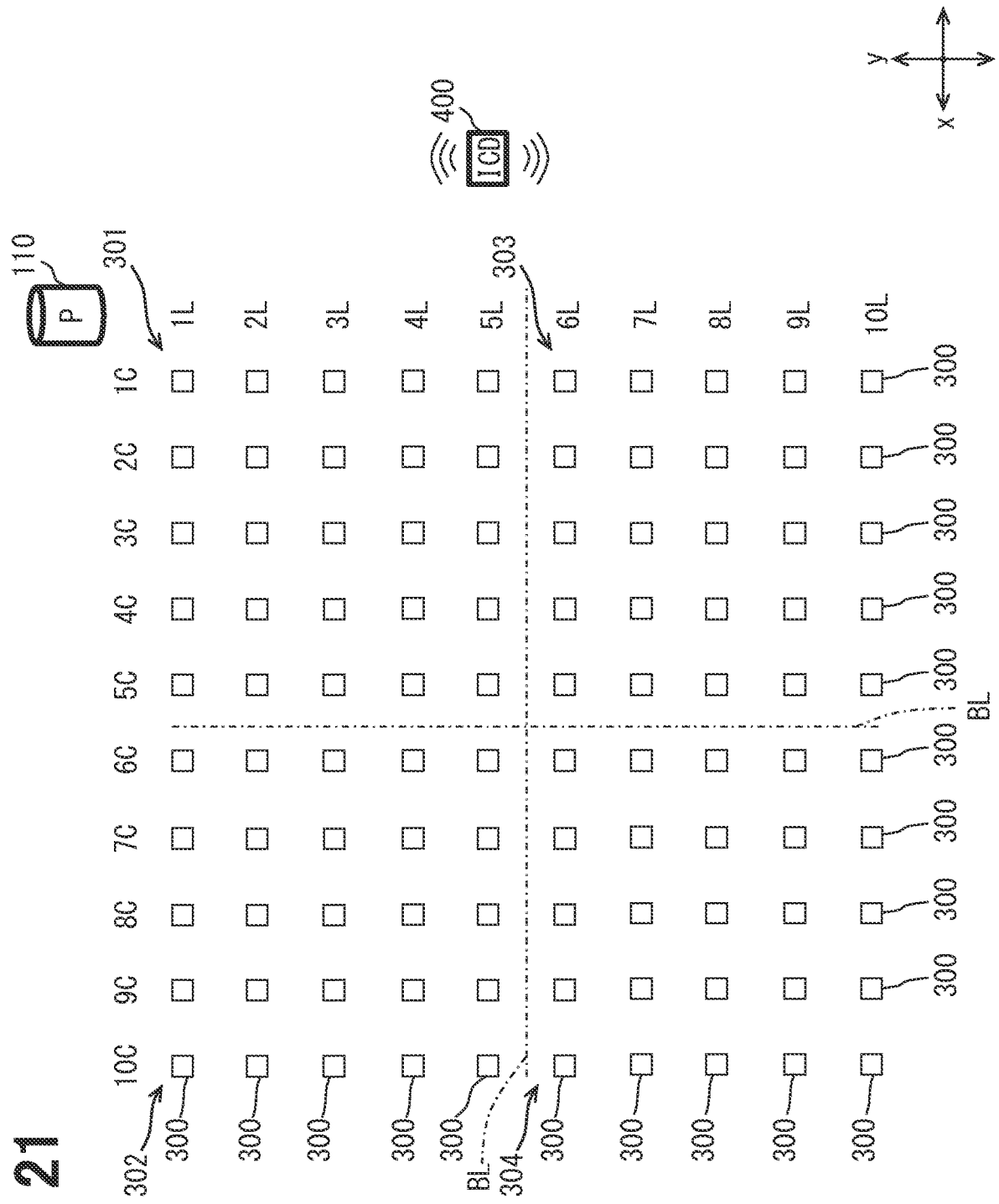
FIG. 21 is a schematic diagram illustrating a state in which monitoring units are arranged in matrix in the farm field.
Figure 22:
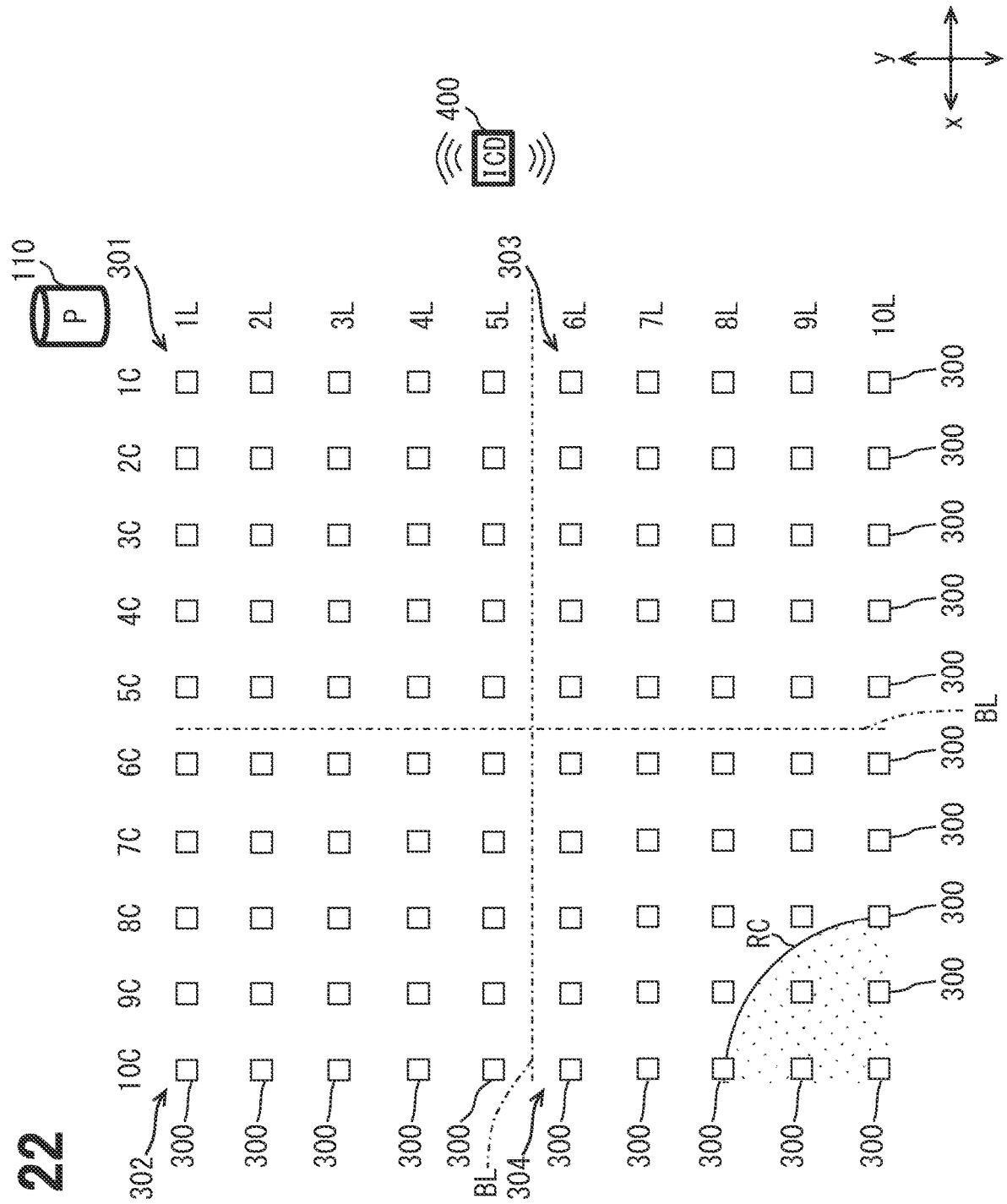
FIG. 22 is a schematic diagram illustrating movement of rain clouds over the farm field.
Figure 23:
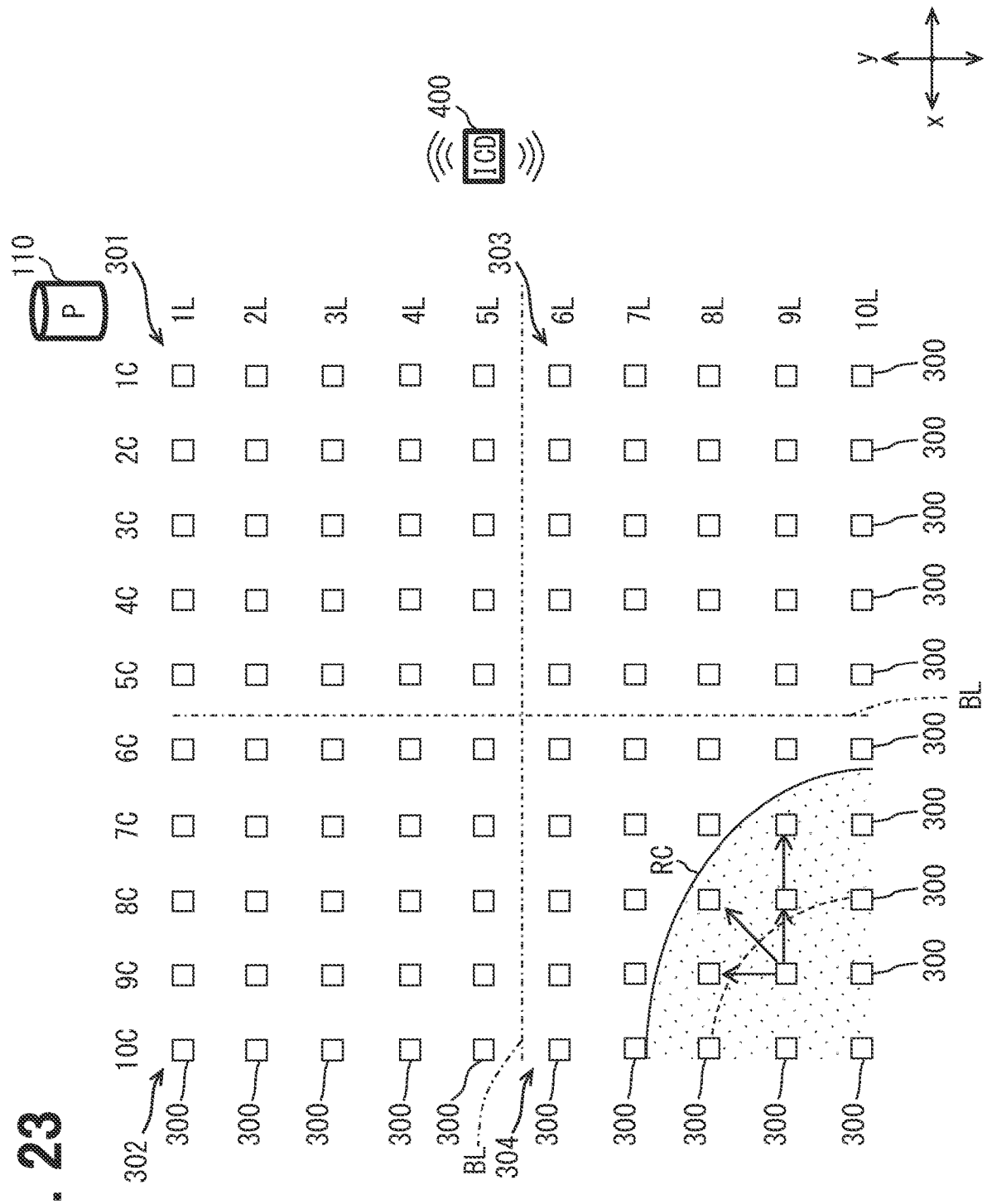
FIG. 23 is a schematic diagram illustrating movement of rain clouds over a farm field.

As described above, the plurality of monitoring units 300 are arranged in a matrix in the farm field 20. In order to simplify the description of the present embodiment, as schematically illustrated in FIGS. 21 to 23, it is assumed that 100 monitoring units 300 are arranged in a matrix of 10 rows and 10 columns in the farm field 20. The row direction corresponds to the x direction and extends along the east-west direction. The column direction corresponds to the y direction and extends along the north-south direction.

In these drawings, for example, among the various components illustrated in FIG. 1, those not so related to the matrix arrangement of the monitoring units 300 described below are omitted. In addition, in order to avoid complication of notation, reference numerals are given only to the monitoring units 300 in the 10th row and the 10th column.

In the drawings, the row numbers and the column numbers increase in a direction away from the pump 110. For example, the first row is denoted as 1L, and the first column is denoted as 1C. The side with a smaller row number is the north side, and the side with a larger row number is the south side. The side with a smaller column number is the east side, and the side with a larger column number is the west side. In the example illustrated, the integrated communication unit 400 is located on the east side of the farm field 20. Therefore, the monitoring unit 300 with a smaller column number corresponds to the monitoring unit 300 located closer to the integrated communication unit 400.

In the configuration illustrated in the drawings, the plurality of monitoring units 300 located in the first to fifth rows of the first to fifth columns detect the environment value on the northeast side of the farm field 20. The plurality of monitoring units 300 located in the sixth to tenth columns of the first to fifth rows detect the environment value on the northwest side of the farm field 20. The plurality of monitoring units 300 located in the first to fifth columns of the sixth to tenth rows detect the environment value on the southeast side of the farm field 20. The plurality of monitoring units 300 located in the sixth to tenth columns of the sixth to tenth rows detect the environment value on the southwest side of the farm field 20.

In the following, in order to simplify the description, the plurality of monitoring units 300 provided on the northeast side, the northwest side, the southeast side, and the southwest side of the farm field 20 are collectively denoted as a northeast monitoring unit group 301, a northwest monitoring unit group 302, a southeast monitoring unit group 303, and a southwest monitoring unit group 304, respectively. In the drawings, boundary lines BL for distinguishing these four monitoring unit groups are one-dot chain lines. Each of these four monitoring unit groups includes a total of 25 monitoring units 300.

For example, as illustrated in FIG. 22, when a rain cloud RC hatched in the drawing is located on the southwest side of the farm field 20, rainfall is detected in some of the plurality of monitoring units 300 included in the southwest monitoring unit group 304. Of course, no rainfall is detected by each of the plurality of monitoring units 300 included in the other three monitoring unit groups. Through the detection of rainfall, the rain cloud RC is detected to be only on the southwest side of the farm field 20.

For example, when the rain cloud RC moves with elapse of a predetermined period of time as illustrated in FIG. 23, the number of monitoring units 300 that detect raindrops in the southwest monitoring unit group 304 increases. The direction and the speed of the movement of the rain cloud RC is detected based on a difference in the environment value between the plurality of monitoring units 300 adjacent to each other in the row direction and the column direction.

The monitoring unit 300 located in the ninth row and the ninth column will be representatively used for the description. The monitoring unit 300 is located immediately below the rain cloud RC at the timing of each of FIGS. 22 and 23. Thus, the monitoring unit 300 detects raindrops at both of these timings.

On the other hand, each of the monitoring unit 300 in the eighth row and the ninth column, the monitoring unit 300 in the eighth row and the eighth column, and the monitoring unit 300 located in the ninth row and the eighth column adjacent to this monitoring unit 300 is not located immediately below the rain cloud RC at the timing of FIG. 22. Thus, these three monitoring unit 300 detect no raindrops at the timing of FIG. 22.

At the timing of FIG. 23 after the elapse of the predetermined period of time, each of the three monitoring units 300 is located immediately below the rain cloud RC. Thus, these three monitoring unit 300 detect the raindrops at the timing of FIG. 23.

The movement of the rain cloud RC from location of the ninth row and the ninth column to the location of the eighth row and the ninth column is observed, based on a temporal change in the raindrop detection by the plurality of monitoring units 300 over time. Thus, the movement of the rain cloud RC toward the northwest side of the farm field 20 is observed.

Similarly, the movement of the rain cloud RC from the location at the ninth row and the ninth column to the location at the eighth row and the eighth column is observed. Thus, the movement of the rain cloud RC toward the northeast side of the farm field 20 is observed.

The movement of the rain cloud RC from the location at the ninth row and the ninth column to the location at the ninth row and the eighth column is observed. Thus, the movement of the rain cloud RC toward the southeast side of the farm field 20 is observed.

At the timing of FIG. 23, no raindrop is detected by each of the monitoring units 300 in the seventh row and the ninth column and the seventh row and the seventh column, whereas raindrop is detected by the monitoring unit 300 located in the ninth row and the seventh column.

Such a difference between the detection results indicates that the rain cloud RC is moving faster toward the southeast side of the farm field 20 than toward the northwest side and the northeast side.

As described above, it is possible to predict how the rain cloud RC generated in a partial region of the farm field 20 moves to another region by detecting a difference in environment values such as raindrops detected by the plurality of monitoring units 300 or a temporal change thereof. Furthermore, it is possible to actually detect and predict a temporal change in rainfall amount and the accumulated rainfall amount in the farm field 20. Furthermore, it is possible to actually detect and predict a temporal change in solar radiation amount and the integrated solar radiation amount in the farm field 20. Thus, a weather change in the farm field 20 can be detected and predicted.

This weather prediction is performed by the integrated calculation unit 600. The integrated calculation unit 600 updates the irrigation schedule for each of the plurality of monitoring units 300 based on the weather prediction.

<Weather Prediction Processing>

Figure 24:
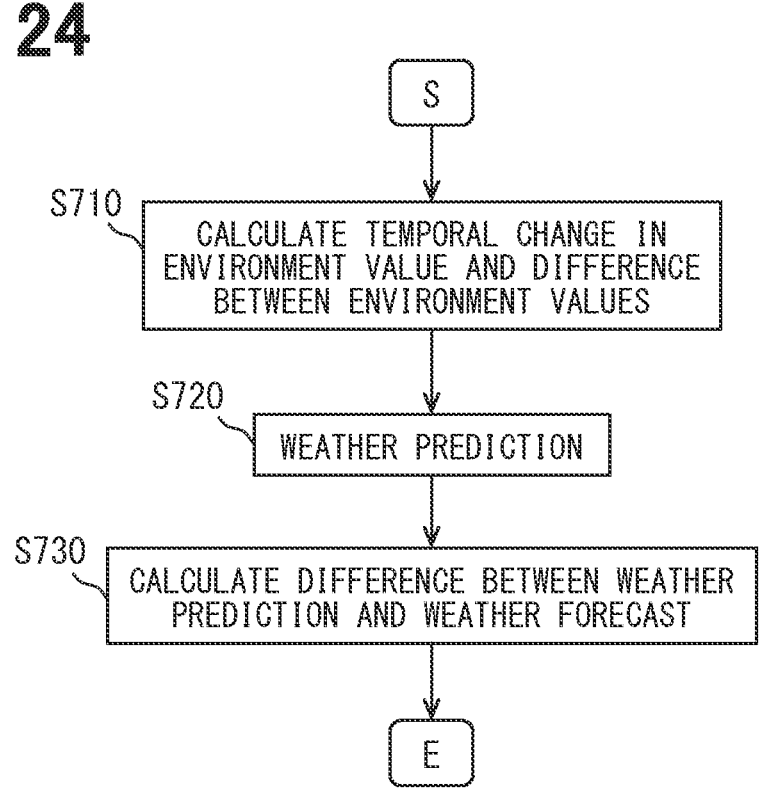
FIG. 24 is a flowchart illustrating weather prediction processing.

The integrated calculation unit 600 executes the weather prediction processing illustrated in FIG. 24 as the cycle task. A result of this processing is reflected on the irrigation schedule update processing described based on FIG. 20.

In step S710 of FIG. 24, the integrated calculation unit 600 calculates a temporal change in the environment value detected by each of the plurality of monitoring units 300. In addition, the integrated calculation unit 600 calculates a difference between and temporal change in various environment values detected by the monitoring units 300 adjacent to each other in the row direction and the column direction. Regarding the examples illustrated in FIGS. 21 to 23, the integrated calculation unit 600 calculates a difference between and a temporal change in various environment values detected by the monitoring units 300 included in the four monitoring unit groups. Then, the integrated calculation unit 600 proceeds to step S720.

Upon proceeding to step S720, the integrated calculation unit 600 determines whether the value calculated in step S710 exceeds a detection error. Without taking into consideration temporary blocking of sunlight by clouds or the like as well as undulations and soil difference between divided areas of the farm field 20 and the like, the calculated value is expected to not exceed the detection error as long as there is no change in weather. When there is a change in weather, the calculated value is expected to exceed the detection error. In view of this, the integrated calculation unit 600 identifies an area with a change in weather and an area without a change in weather, based on whether the calculated value exceeds the detection error. Regarding the change in rainfall amount illustrated in FIG. 22 and FIG. 23 only, part of the farm field 20 on the southwest side is the area with a change in weather, and other areas are the areas without a change in weather.

Next, the integrated calculation unit 600 calculates a geographical separation distance (far or close) between the area with a change in weather the area without a change in weather. Based on the separation distance and a temporal change in the environment value in the area with a change in weather, the integrated calculation unit 600 performs calculation to figure out which area will have the rainfall or fine weather in each area, and when. In this manner, the integrated calculation unit 600 performs weather prediction for each of the plurality of divided areas based on the environment values detected in the plurality of divided areas. Then, the integrated calculation unit 600 proceeds to step S730.

Upon proceeding to step S730, the integrated calculation unit 600 calculates a difference between the weather prediction calculated in step S720 and the weather forecast notified from the external information source 1000. The difference between the weather prediction and the weather forecast is reflected on, for example, step S125 of the irrigation schedule update processing described based on FIG. 20.

When the difference between the weather prediction and the weather forecast is larger than a predetermined weather determination value, the irrigation schedule on the earlier side of the irrigation period may be determined using only the weather prediction among the weather prediction and the weather forecast.

Note that the integrated calculation unit 600 may determine the irrigation schedule based on the weather prediction without acquiring the weather forecast from the external information source 1000. In this case, the integrated calculation unit 600 does not execute step S730 illustrated in FIG. 24. In addition, the irrigation period of the irrigation schedule set in this case is shorter than the irrigation period in the case of using the weather forecast.

<Operations and Effects>

As described above, the integrated calculation unit 600 updates the irrigation schedule based on the weather prediction for the farm field 20. Thus, the soil moisture content of the open farm field 20 is prevented from exceeding the growth inhibition moisture point or falling below the permanent wilting point due to a change in weather. The soil moisture content is controlled to be suitable for the plants 30. As a result, inhibition of the sound growth of the plant 30 is suppressed.

The irrigation system 10 described in the present embodiment includes at least one of the components of the irrigation system 10 described in the first embodiment. Therefore, it is a matter of course that the irrigation system 10 of the present embodiment performs and provides the operations and effects described in the first embodiment using the same components as those of the irrigation system 10 described in the first embodiment. Therefore, the description thereof is omitted. In other embodiments described below, description of the same operations and effects is omitted.

Third Embodiment

The present disclosure relates to an irrigation system and a monitoring unit.

As disclosed in JP2017-009305A, a sensing device including an environmental energy based power generating conversion unit and a control unit has been known. The environmental energy based power generating conversion unit converts environmental energy obtained from a sensing target into electric power. The control unit controls a state monitoring interval for the sensing device based on the electric power obtained by the environmental energy based power generating conversion unit.

In the sensing device described in the above publication, driving of the sensing device is determined based on the electric power obtained by the power generation. Unfortunately, a change in the environment of the sensing device may result in depletion of the electric power for the driving.

An object of the present disclosure is to provide an irrigation system and a monitoring unit with which depletion of electric power is suppressed.

An irrigation system according to an aspect of the present disclosure includes:

a plurality of monitoring units 300 provided to a plurality of respective divided areas obtained by diving an open farm field 20 in which a plant 30 grows; and an integrated calculation unit 600 configured to perform wireless communications with each of the plurality of monitoring units, wherein the monitoring units each include
- a communication unit 340 configured to transmit and receive a radio signal to and from the integrated calculation unit,
- an environment sensor 310 configured to detect an environment value of the divided area;
- a calculation processing unit 330 that has a first mode and a second mode consuming larger electric power than the first mode, and is configured to switch from the first mode to the second mode and perform calculation processing upon receiving a wake-up signal,
- a wake-up unit 350 configured to output the wake-up signal to the calculation processing unit at a wake-up interval, and
- a power generation unit 360 configured to convert light energy into electric energy, store the electric power as electric power, and supplies the stored electric power to the calculation processing unit, and the integrated calculation unit determines the wake-up interval based on a power storage amount in the power generation unit and an environment value detected by an environment sensor.

A monitoring unit according to an aspect of the present disclosure is a monitoring unit provided to each of a plurality of respective divided areas obtained by diving an open farm field 20 in which a plant 30 grows, and includes:
- an environment sensor 310 configured to detect an environment value of the divided area;
- a calculation processing unit 330 that has a first mode and a second mode consuming larger electric power than the first mode, and is configured to switch from the first mode to the second mode and perform calculation processing upon receiving a wake-up signal;
- a wake-up unit 350 configured to output the wake-up signal to the calculation processing unit at a wake-up interval; and
- a power generation unit 360 configured to convert light energy into electric energy, store the electric power as electric power, and supplies the stored electric power to the calculation processing unit, wherein the calculation processing unit determines the wake-up interval based on a power storage amount in the power generation unit and an environment value detected by an environment sensor.

With this configuration, the power storage amount is prevented from being depleted due to a change in the environment of the farm field 20.

A third embodiment will be described below based on FIG. 25 to FIG. 31.

In the example described in the first embodiment, the time interval (wake-up interval) at which the RTC 350 of each of the plurality of monitoring unit 300 outputs the wake-up signal is determined based on the amount of electric power (power storage amount) stored in the power storage unit 362. Specifically, in the example described, the intermittent driving interval of the microcomputer 330 of each of the plurality of monitoring units 300 is determined based on the power storage amount.

In the present embodiment, the intermittent driving interval of the microcomputer 330 of each of the plurality of monitoring units 300 is determined based on the power storage amount, the solar radiation amount, the rainfall amount, and time. The processing content of the sensor processing executed at the intermittent driving interval is also determined based on these.

As described in the first embodiment, the electric power as a result of conversion from the light energy into the electric energy by the solar cell 361 is stored in the power storage unit 362. This means that a decrease in the amount of light incident on the solar cell 361, leads to a decrease in the amount of power generated by the solar cell 361, resulting in a decrease in the amount of power stored in the power storage unit 362. The electric power stored in the power storage unit 362 may be depleted as a result of driving the microcomputer 330.

The amount of light incident on the solar cell 361 depends on the solar radiation amount, the amount of rainfall, and time. Thus, in the present embodiment, the integrated calculation unit 600 determines the intermittent driving interval of the microcomputer 330 of each of the plurality of monitoring units 300 and the processing content of the sensor processing, based on each of the power storage amount, the solar radiation amount, the rainfall amount, and time.

In a strict sense, the amount of light incident on the solar cell 361 also depends on the latitude of each of the plurality of monitoring units 300. The latitude of each of the plurality of monitoring units 300 can be detected, for example, with a GPS installed in each of the plurality of monitoring units 300. Alternatively, the latitude of each of the plurality of monitoring units 300 is determined with a GPS installed in the integrated calculation unit 600 or the latitude of the farm field 20 is input from the user to the integrated calculation unit 600 using the input device 800. Although not specifically mentioned below, the integrated calculation unit 600 also uses the latitude of the plurality of monitoring units 300 when determining the intermittent driving interval and the processing content of the sensor processing.

<Sensor Processing Update Processing>

Figure 25:
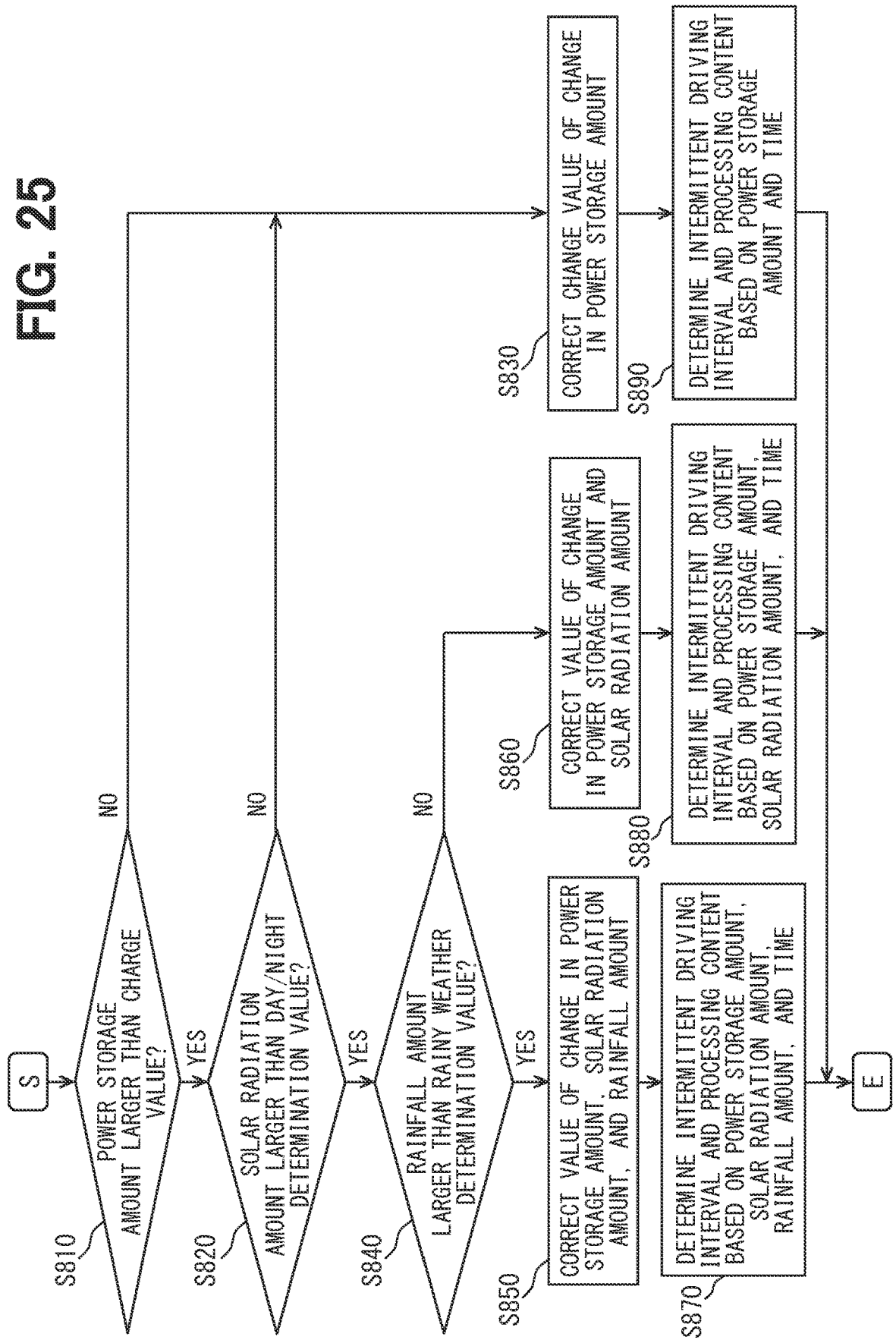
FIG. 25 is a flowchart illustrating sensor processing update processing.

In step S120 of the update processing described based on FIG. 7, the integrated calculation unit 600 executes sensor processing update processing illustrated in FIG. 25. A result of this processing is reflected on the intermittent driving interval of the update processing described based on FIG. 8. The result of the processing is also reflected on the processing content of the sensor processing described based on FIG. 6. The integrated calculation unit 600 includes a charge value, a day/night determination value, and a rainy weather determination value as comparison values for executing the processing.

In step S810 of FIG. 25, the integrated calculation unit 600 determines whether the power storage amount is larger than the charge value. When the power storage amount is larger than the charge value, the integrated calculation unit 600 proceeds to step S820. When the power storage amount is equal to or smaller than the charge value, the integrated calculation unit 600 determines that there is a possibility of depletion of the electric power amount in the power storage unit 362. In this case, the integrated calculation unit 600 proceeds to step S830.

Upon proceeding to step S820, the integrated calculation unit 600 determines whether the solar radiation amount is larger than the day/night determination value. When the solar radiation amount is larger than the day/night determination value, it is expected that a sufficient amount of light for generating power is incident on the solar cell 361. In this case, the integrated calculation unit 600 proceeds to step S840. On the other hand, when the solar radiation amount is equal to or smaller than the day/night determination value, it is expected that a sufficient amount of light for generating power is not incident on the solar cell 361. In this case, the integrated calculation unit 600 proceeds to step S830.

Upon proceeding to step S840, the integrated calculation unit 600 determines whether the rainfall amount is larger than the rainy weather determination value. When the rainfall amount is larger than the rainy weather determination value, the integrated calculation unit 600 determines that there is a rainfall. In this case, the integrated calculation unit 600 proceeds to step S850. On the other hand, when the rainfall amount is equal to or smaller than the rainy weather determination value, the integrated calculation unit 600 proceeds to step S860.

Upon proceeding to step S850, the integrated calculation unit 600 detects a temporal change in each of the power storage amount, the solar radiation amount, and the rainfall amount. When the power storage amount is in an increasing trend, the integrated calculation unit 600 corrects, that is, increments the detected power storage amount. On the other hand, when the power storage amount is in a decreasing trend, the integrated calculation unit 600 corrects, that is, decrements the detected power storage amount.

Similarly, when the solar radiation amount is in an increasing trend, the integrated calculation unit 600 corrects, that is, increments the detected solar radiation amount. When the solar radiation amount is in a decreasing trend, the integrated calculation unit 600 corrects, that is, decrements the detected solar radiation amount. When the rainfall amount is in an increasing trend, the integrated calculation unit 600 corrects, that is, increments the detected rainfall amount. When the rainfall amount is in a decreasing trend, the integrated calculation unit 600 corrects, that is, decrements the detected rainfall amount. As described above, the power storage amount, the solar radiation amount, and the rainfall amount are corrected, that is, incremented or decremented in accordance with whether the power storage amount, the solar radiation amount, and the rainfall amount is in the increasing or decreasing trend. Then, the integrated calculation unit 600 proceeds to step S870.

Upon proceeding to step S870, the integrated calculation unit 600 determines the intermittent driving interval and the processing content of the sensor processing, based on each of the power storage amount, the solar radiation amount, and the rainfall amount corrected by being incremented or decremented in step S850 and on the current time. Then, the integrated calculation unit 600 ends the sensor processing update processing.

Specifically, in step S870, the integrated calculation unit 600 first determines a basic value for the intermittent driving interval based on the power storage amount and the current time. The integrated calculation unit 600 sets a shorter basic value for the intermittent driving interval, for a larger power storage amount. The integrated calculation unit 600 sets a shorter basic value for the intermittent driving interval, for current time closer to time with intense sunlight.

Figure 26:
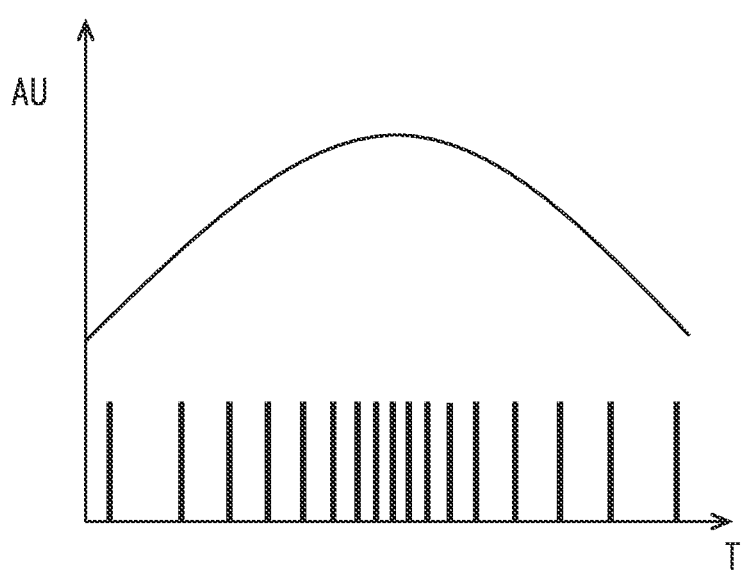
FIG. 26 is a graph illustrating a correspondence relationship between a solar radiation amount and an intermittent driving interval.

As schematically illustrated in FIG. 26 for example, the integrated calculation unit 600 sets a shorter basic value for the intermittent driving interval, for a larger solar radiation amount. As schematically illustrated in FIG. 27, the integrated calculation unit 600 sets a shorter basic value for the intermittent driving interval, for a larger rainfall amount.

Figure 27:
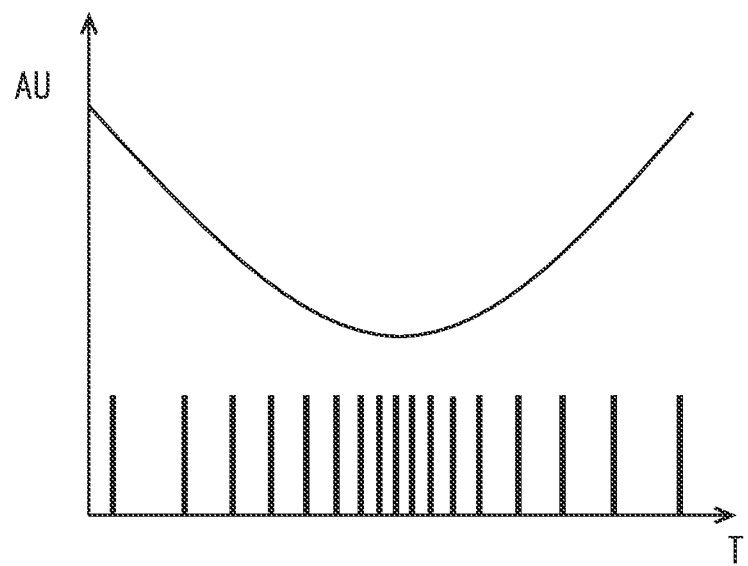
FIG. 27 is a graph illustrating a correspondence relationship between a rainfall amount and an intermittent driving interval.

In FIGS. 26 and 27, the vertical axis represents an arbitrary value, and the horizontal axis represents time. The arbitrary value is denoted as AU, and the time is denoted as T. The solar radiation amount and the rainfall amount are indicated by solid lines. The intermittent driving interval is indicated by an interval between adjacent bar graphs.

In step S870, the integrated calculation unit 600 determines a basic content of the sensor processing based on the power storage amount and the current time. Then, the integrated calculation unit 600 determines a richer processing content for the sensor processing, for a larger solar radiation amount. This means that the integrated calculation unit 600 increases the processing load on the sensor processing. The integrated calculation unit 600 determines a simpler processing content for the sensor processing, for a larger rainfall amount. This means that the integrated calculation unit 600 reduces the processing load on the sensor processing.

As described based on FIG. 6, in the sensor processing, the microcomputer 330 of each of the plurality of monitoring units 300 acquires sensor signals input from various sensors, and outputs the sensor signals and the acquisition time to the integrated communication unit 400 via the communication unit 340 through wireless communication. The richness of the processing content of the sensor processing corresponds to the number of the plurality of sensor signals input from various sensors and processed. A richer processing content of the sensor processing is provided for a larger number of sensor signals processed. A larger number of sensor signals processed leads to a larger processing load. On the other hand a smaller number of sensor signals processed leads to a smaller processing load.

As described above, the types of sensor signals include water pressure, current, electric power, soil moisture content, solar radiation amount, rainfall amount, temperature, humidity, atmospheric pressure, and air volume. These are selected under priority for the sensor processing. As an example of the priority, for example, the water pressure, the electric power, the soil moisture content, the solar radiation amount, the rainfall amount, the current, the temperature, the humidity, the atmospheric pressure, and the air volume are selected in this order. The water pressure, the electric power, and the soil moisture content have higher priorities over the others. The solar radiation amount and the rainfall amount are given priority lower than these. Compared with these, the priorities of the current, the temperature, the humidity, the atmospheric pressure, and the air volume are low. In the sensor processing with the processing content simplified as much as possible, at least one of the water pressure, the power storage amount, and the soil moisture content is output from the communication unit 340 to the integrated communication unit 400 through wireless communications.

Upon proceeding to step S860 by determining that the rainfall amount is equal to or smaller than the rainy weather determination value in step S840 which is an earlier step in the flow, the integrated calculation unit 600 detects a temporal change in the power storage amount and the solar radiation amount. Then, the integrated calculation unit 600 corrects, that is, increments or decrements the power storage amount and the solar radiation amount as described above. Then, the integrated calculation unit 600 proceeds to step S880.

Upon proceeding to step S880, the integrated calculation unit 600 determines the intermittent driving interval and the processing content of the sensor processing, based on each of the power storage amount and the solar radiation amount corrected by being incremented or decremented in step S860 and on the current time.

Upon proceeding to step S830 by determining that the solar radiation amount is equal to or smaller than the day/night determination value in step S820 which is an earlier step in the flow, the integrated calculation unit 600 detects a temporal change in the power storage amount. Similarly, upon proceeding to step S830 by determining that the power storage amount is equal to or smaller than the charge value in step S810, the integrated calculation unit 600 detects a temporal change in the power storage amount. Then, the integrated calculation unit 600 corrects, that is, increments or decrements the power storage amount as described above. Then, the integrated calculation unit 600 proceeds to step S890.

Upon proceeding to step S890, the integrated calculation unit 600 determines the intermittent driving interval and the processing content of the sensor processing, based on the power storage amount corrected by being incremented or decremented in step S830 and on the current time.

In steps S830 and S890, the intermittent driving interval and the processing content of the sensor processing may be simply set to prescribed values. The prescribed value can be set with the longest intermittent driving interval, with the water pressure, the power storage amount, the soil moisture content selected for the sensor processing, and the like.

When water is provided as a result of sudden rain or water supply although the weather is fine, the solar radiation amount detected by the solar radiation sensor 312 unexpectedly changes due to refraction of light caused by water droplets and evaporation of the water droplets. As a result, rainfall is temporarily detected by the rain sensor 313. In order to prevent the intermittent driving interval and the processing content of the sensor processing from changing each time such a change occurs, the integrated calculation unit 600 may use time average values of the solar radiation amount and the rainfall amount in the sensor processing update processing.

<Operations and Effects>

As described above, the intermittent driving interval (wake-up interval) is determined based on the power storage amount, the solar radiation amount, the rainfall amount, and time. Thus, the intermittent driving interval is determined based on the power storage amount of the monitoring unit 300 and the environment value of the farm field 20. As a result, depletion of the power storage amount is prevented.

The intermittent driving interval is appropriately made short based on the power storage amount and the environment value of the farm field 20. Thus, the sensor processing is executed at a shorter interval, with a decrease of the power storage amount suppressed. As a result, a decrease in the update frequency of the sensor information stored in the information storage unit 500 is suppressed. As a result, the irrigation schedule determined based on the sensor information becomes close to the irrigation schedule determined based on the actual environment value of the farm field 20.

When the power storage amount is equal to or smaller than the charge value, the intermittent driving interval is determined based on the power storage amount regardless of the solar radiation amount and the rainfall amount. With this configuration, the intermittent driving interval is prevented from being shortened even when the power storage amount is equal to or smaller than the charge value, due to detection of a solar radiation amount by the solar radiation sensor 312 temporary receiving light emitted from lighting equipment at night for example. Thus, depletion of the power storage amount is prevented.

When the solar radiation amount is equal to or smaller than the day/night determination value, the intermittent driving interval is determined based on the power storage amount regardless of the solar radiation amount. With this configuration, variation of the intermittent driving interval based on the solar radiation amount and the rainfall amount can be prevented at night during which power generation by the solar cell 361 receiving light cannot be expected.

When the rainfall amount is equal to or smaller than the rainy weather determination value, the intermittent driving interval is determined regardless of the rainfall amount. With this configuration, the intermittent driving interval is prevented from varying due to temporary provision of water by rainfall or water supply, in a case where there is actually no rainfall.

Thus, the richness of the processing content of the sensor processing is determined based on the power storage amount of the monitoring unit 300 and the environment value of the farm field 20. Thus, the amount of power consumed by the sensor processing is determined based on the power storage amount of the monitoring unit 300 and the environment value of the farm field 20. As a result, depletion of the power storage amount is prevented.

<Modification of Sensor Processing Update Processing>

In the example described, the intermittent driving interval and the processing content of the sensor processing are determined in the sensor processing update processing. Alternatively, the processing content of the sensor processing may not be changed in this sensor processing update processing. In this case, the integrated calculation unit 600 does not determine the processing content of the sensor processing in steps S870 to S890 illustrated in FIG. 25.

In the example described, a change value is corrected in the sensor processing update processing. Alternatively, the change value may not be corrected. In this case, the integrated calculation unit 600 does not execute step S830, step S850, and step S860.

In the example described, the rainfall amount is used in the sensor processing update processing. Alternatively, the rainfall amount may not be used. In this case, the integrated calculation unit 600 does not execute step S840, step S850, and step S870. Upon determining that the solar radiation amount is larger than the day/night determination value in step S820, the integrated calculation unit 600 proceeds step S860.

In the example described, the solar radiation amount is used in the sensor processing update processing. Alternatively, the solar radiation amount may not be used. In this case, the integrated calculation unit 600 does not execute step S820, step S860, and step S880. Upon determining that the power storage amount is larger than the charge value in step S810, the integrated calculation unit 600 proceeds step S840. Upon determining that the rainfall amount is equal to or smaller than the rainy weather determination value in step S840, the integrated calculation unit 600 proceeds to step S830. Upon proceeding to step S850 as a result of determining that the rainfall amount is larger than the rainy weather determination value in step S840, the integrated calculation unit 600 corrects, that is, increases or reduces the power storage amount and the rainfall amount. Then, in step S870, the integrated calculation unit 600 determines the intermittent driving interval and the processing content of the sensor processing based on each of the power storage amount and the rainfall amount and on the current time.

In the example described, the current time is used for the sensor processing update processing. Alternatively, the current time may not be used. In this case, the integrated calculation unit 600 does not determine the intermittent driving interval and the processing content of the sensor processing in steps S870 to S890 by using the current time.

In the example described, the integrated calculation unit 600 determines the intermittent driving interval and the processing content of the sensor processing for each of the plurality of monitoring units 300. Alternatively, each of the plurality of monitoring units 300 may determine the intermittent driving interval and the processing content of the sensor processing.

<Drive Start Time Point of Monitoring Unit>

Note that, in the embodiments described above, the drive start time point in the intermittent driving of each of the plurality of monitoring units 300 has not been mentioned. The drive start time points of the plurality of monitoring units 300 may be the same or different from each other.

An example of the drive start time point of each of the plurality of monitoring units 300 is illustrated in FIG. 28 to FIG. 31. In these drawings, the monitoring units 300 with the same drive start time point are hatched for the sake of simplification of the description.

Figure 28:
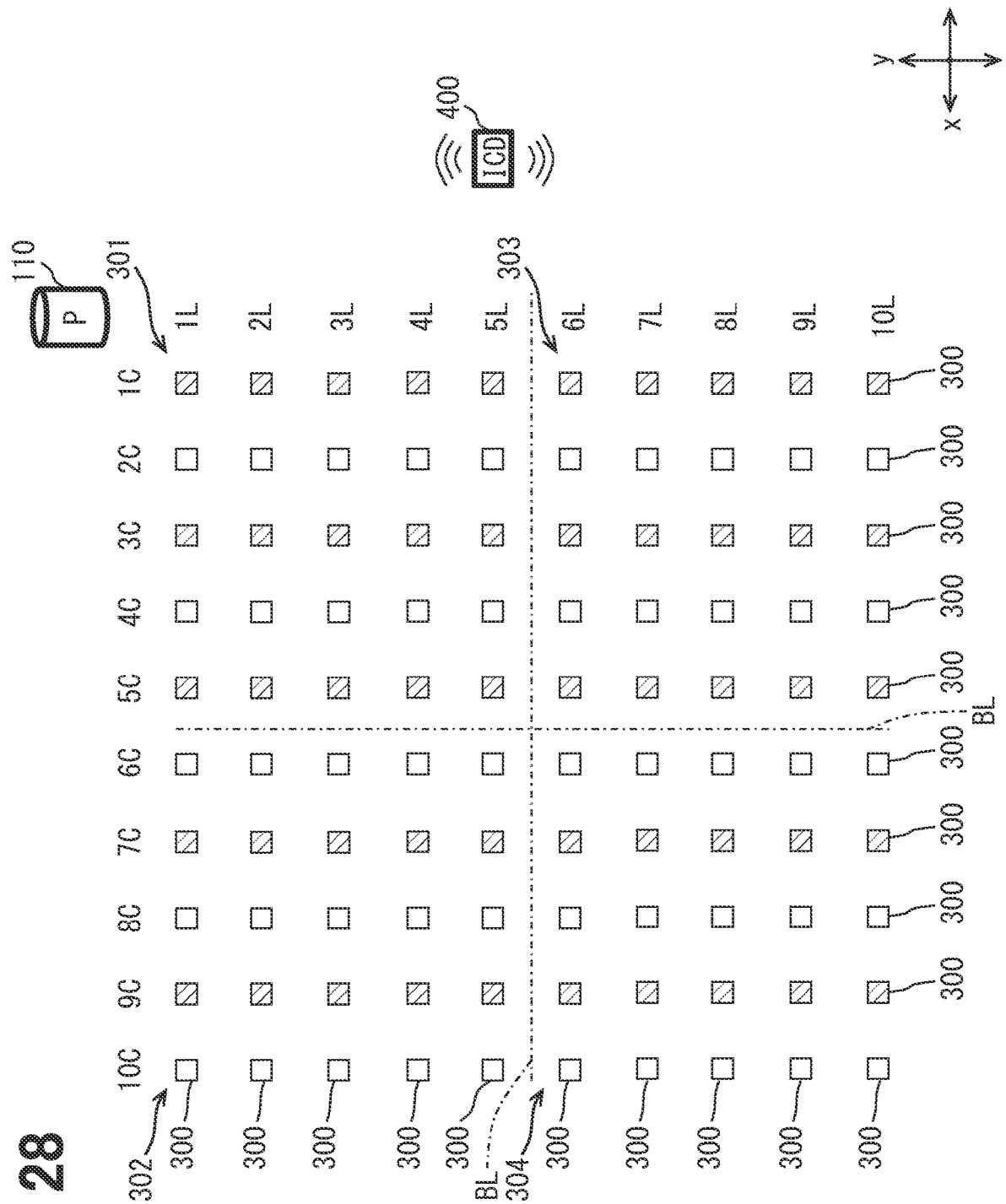
FIG. 28 is a schematic diagram illustrating drive start time points of a plurality of the monitoring units.

In the example illustrated in FIG. 28, the drive start time points of the plurality of monitoring units 300 located in the odd-numbered columns are the same. The drive start time points of the plurality of monitoring units 300 located in the even-numbered columns are the same. The drive start time point is different between the plurality of monitoring units 300 located in the odd-numbered column and the plurality of monitoring units 300 located in the even-numbered column.

Figure 29:
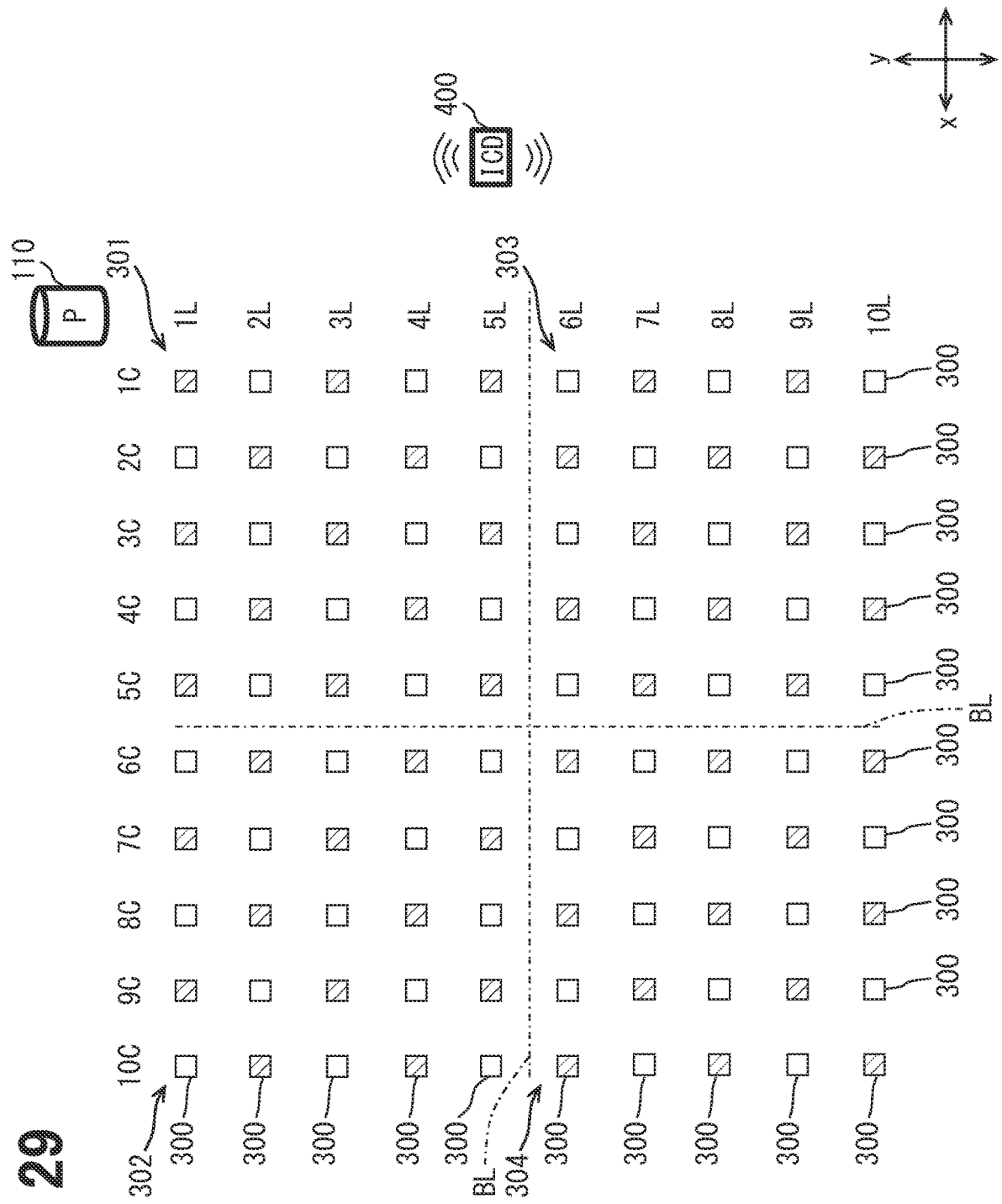
FIG. 29 is a schematic diagram illustrating drive start time points of a plurality of the monitoring units.

In the example illustrated in FIG. 29, the drive start time point is the same between each of the plurality of monitoring unit 300 located in an odd-numbered column and an odd-numbered row and each of the plurality of monitoring unit 300 located in an even-numbered column and an even-numbered row. The drive start time point is the same between each of the plurality of monitoring unit 300 located in an odd-numbered column and an even-numbered row and each of the plurality of monitoring unit 300 located in an even-numbered column and an odd-numbered row. The drive start time point is different between the plurality of monitoring units 300 located in an odd-numbered column and an odd-numbered row and in an even-numbered column and an even-numbered row, and the plurality of monitoring units 300 located in an odd-numbered column and an even-numbered row and in an even-numbered column and an odd-numbered row.

Figure 30:
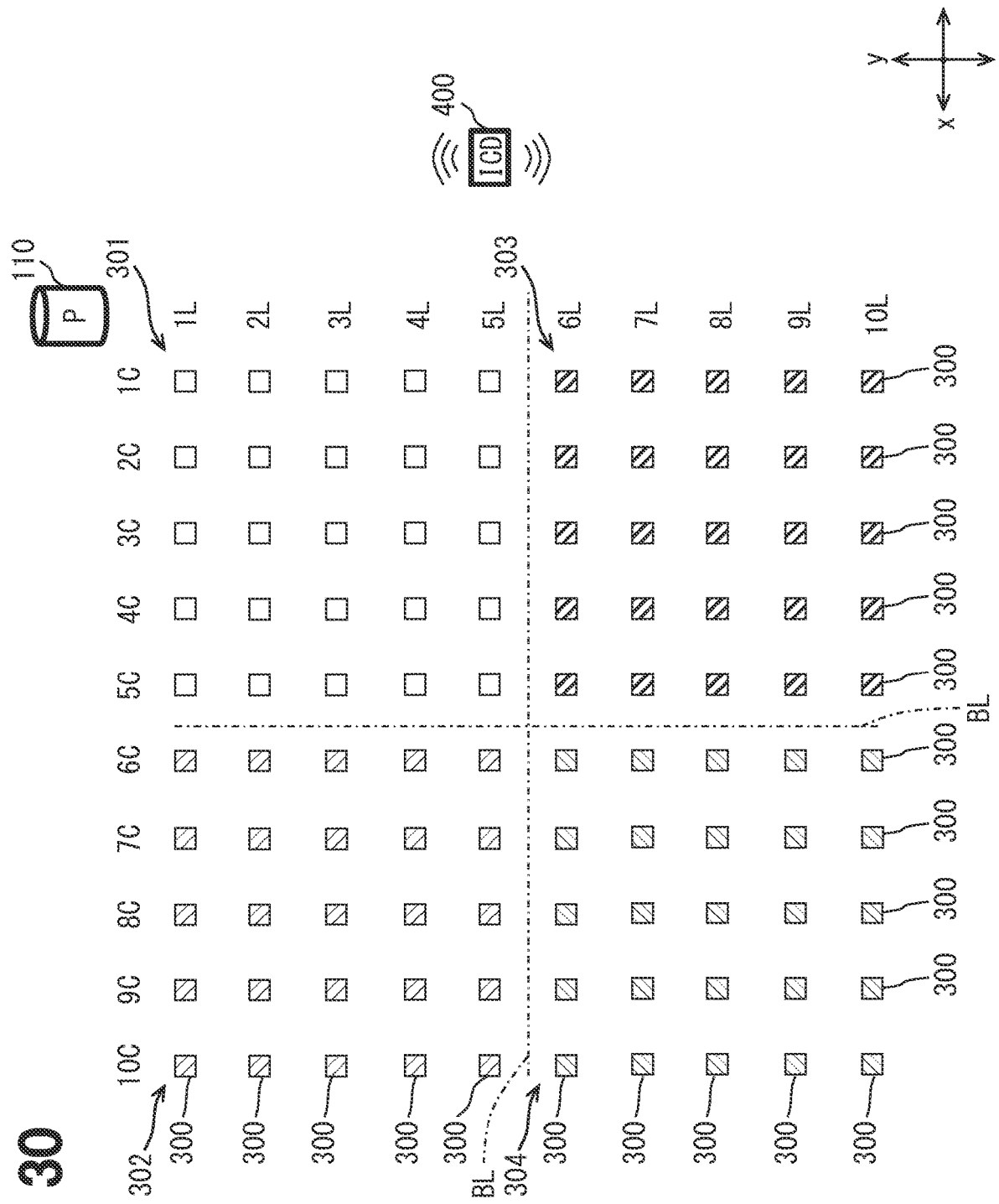
FIG. 30 is a schematic diagram illustrating drive start time points of a plurality of the monitoring units.

In the example illustrated in FIG. 30, the drive start time point is the same among the plurality of monitoring units 300 in the northeast monitoring unit group 301 located on the northeast side of the farm field 20. The drive start time point is the same among the plurality of monitoring units 300 in the northwest monitoring unit group 302 located on the northwest side of the farm field 20. The drive start time point is the same among the plurality of monitoring units 300 in the southeast monitoring unit group 303 located on the southeast side of the farm field 20. The drive start time point is the same among the plurality of monitoring units 300 in the southwest monitoring unit group 304 located on the southwest side of the farm field 20. The drive start time point is different among the plurality of monitoring units 300 in the northeast monitoring unit group 301, the plurality of monitoring units 300 in the northwest monitoring unit group 302, the plurality of monitoring units 300 in the southeast monitoring unit group 303, and the plurality of monitoring units 300 in the southwest monitoring unit group 304.

Figure 31:
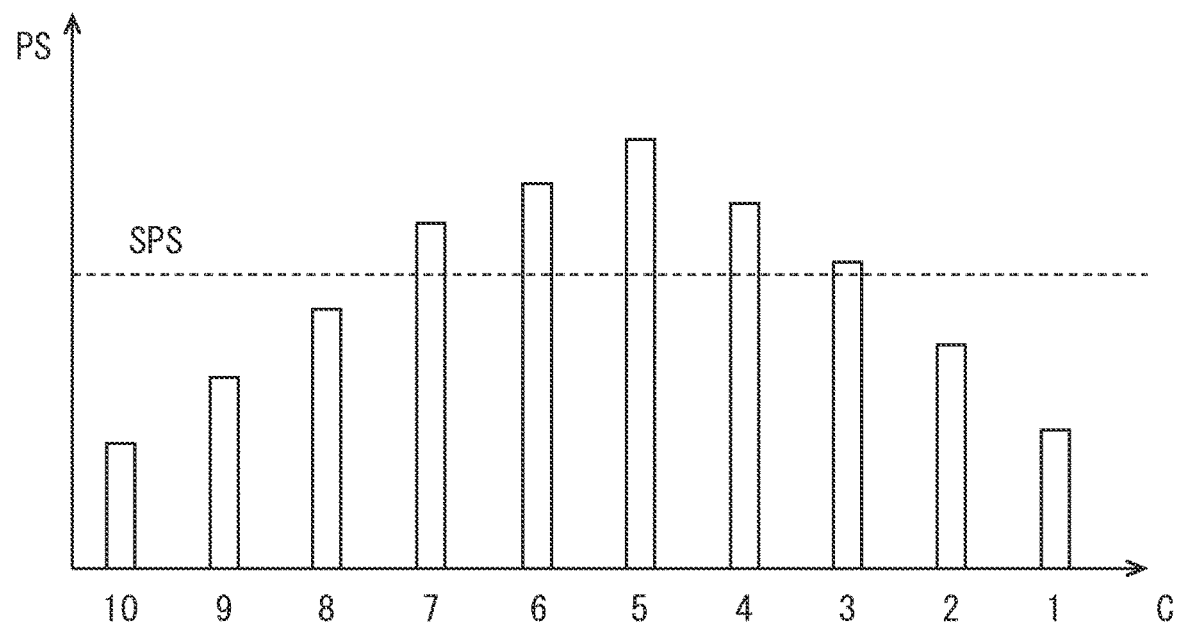
FIG. 31 is a graph illustrating power storage amounts of a plurality of monitoring units.

In FIG. 31, the power storage amount of each of 10 monitoring units 300 located in the first row among the plurality of monitoring units 300 is illustrated with a bar graph as a representative of 100 monitoring units 300. The vertical axis represents the power storage amount, and the horizontal axis represents the column. The power storage amount is denoted as PS, and the column is denoted as C.

In the example illustrated in FIG. 31, the monitoring units 300 located in the fifth, sixth, fourth, seventh, third, eighth, second, ninth, first, and tenth columns are in the descending order in terms of the power storage amount. Under this condition, the drive start time point of each of the plurality of monitoring units 300 located in the first row may be in the order of the fifth, sixth, fourth, seventh, third, eighth, second, ninth, first, and tenth columns corresponding to the descending order of the power storage amount.

Alternatively, the drive start time point may be the same among five monitoring units 300 with a power storage amount larger than a standard power storage amount indicated by a broken line in FIG. 31. The drive start time point may be the same among five monitoring units 300 with the power storage amount smaller than the standard power storage amount. In the drawings, the standard power storage amount is denoted as SPS.

<Solar Cell Deterioration Determination>

There is a correlation between the solar radiation amount detected by the solar radiation sensor 312 and the amount of power generated by the solar cell 361 (power generation amount). It is expected that the solar cell 361 generates electric power in an amount corresponding to the solar radiation amount detected by the solar radiation sensor 312, as long as the solar cell 361 is not deteriorated. The amount of electric power actually generated by the solar cell 361 can be calculated based on the amount of current detected by the above-described current sensor 363 and the like.

Thus, the level of deterioration of the solar cell 361 can be determined by comparing the power generation amount expected to be achieved by the solar cell 361 based on the solar radiation amount detected with the amount of current detected. For example, when the power generation amount calculated from the amount of current is about 90% of the power generation amount expected from the solar radiation amount, the solar cell 361 can be determined to have deteriorated to such an extent that the power generation efficiency drops by about 10%.

The deterioration determination for the solar cell 361 may be performed by each of the plurality of monitoring units 300 or may be performed by the integrated calculation unit 600. For example, when the solar cell 361 needs to be replaced because the power generation efficiency of the solar cell 361 has dropped by about 50%, the integrated calculation unit 600 may indicate this on the monitor 700. Thus, the user is notified of the fact that the solar cell 361 needs to be replaced.

Fourth Embodiment

The present disclosure relates to a monitoring unit and an irrigation system.

As disclosed in JP2015-231326A, a method for detecting contamination of a solar panel has been known.

The solar panel may be detected by the method described in the above publication, but the above publication does not disclose a configuration for removing the contamination.

An object of the present disclosure is to provide a monitoring unit and an irrigation system with a specific configuration for the contamination removal.

A monitoring unit according to an aspect of the present disclosure is a monitoring unit that is provided to each of a plurality of divided areas obtained by dividing an open farm field 20 in which a plant 30 grows, together with a water supply device 100 configured to supply irrigation water to each of the plurality of divided areas, and includes:

- a case 370 including a housing 371 and a translucent lid portion 372 that closes an opening of the housing;
- a solar radiation sensor 312 that is disposed in an internal space of the case to face an inner surface 372*b* of the lid portion on side of the internal space, and is configured to detect an amount of light entering from a first region of an outer surface 372a on side opposite to the inner surface;

a solar cell 361 that is disposed in the internal space to face the inner surface, and is configured to convert light energy entering from a second region of the outer surface different from the first region, into electric energy;

a liquid sensor 313, 318 configured to detect liquid adhering to a third region of the outer surface different from each of the first region and the second region;

a current sensor 363 configured to detect current output from the solar cell;

a wiper 373 configured to slide on the outer surface; and a calculation processing unit 330 configured to drive the wiper, when a contamination determination value is exceeded by an absolute value of a difference between electric power expected to be generated by the solar cell from the solar radiation amount detected by the solar radiation sensor and electric power generated by the solar cell from an amount of the current detected by the current sensor, and the liquid sensor detects the liquid adhering to the outer surface.

An irrigation system according to an aspect of the present disclosure is an irrigation system comprising:

a plurality of monitoring units 300 that are provided to a plurality of respective divided areas obtained by dividing an open farm field 20 in which a plant 30 grows, together with a water supply device 100 configured to supply irrigation water to each of the plurality of divided areas; and an integrated calculation unit 600 configured to perform wireless communications with each of the plurality of monitoring units, wherein the monitoring units each include;

a case 370 including a housing 371 and a translucent lid portion 372 that closes an opening of the housing;

a solar radiation sensor 312 that is disposed in an internal space of the case to face an inner surface 372b of the lid portion on side of the internal space, and is configured to detect an amount of light entering from a first region of an outer surface 372a on side opposite to the inner surface;

a solar cell 361 that is disposed in the internal space to face the inner surface, and is configured to convert light energy entering from a second region of the outer surface different from the first region, into electric energy;

a liquid sensor 313, 318 configured to detect liquid adhering to a third region of the outer surface different from each of the first region and the second region;

a current sensor 363 configured to detect current output from the solar cell;

a wiper 373 configured to slide on the outer surface;

a calculation processing unit 330 configured to acquire and output, to the integrated calculation unit, each of a solar radiation amount detected by a solar radiation sensor, current detected by a current sensor, and a detection result of the liquid sensor; and a communication unit 340 configured to output, as a radio signal, the output from the calculation processing unit to the integrated calculation unit, and the integrated calculation unit outputs, to the monitoring units, an instruction signal including an instruction to drive the wiper, when a contamination determination value is exceeded by an absolute value of a difference between electric power expected to be generated by the solar cell from the solar radiation amount detected by the solar radiation sensor and electric power generated by the solar cell from an amount of the current detected by the current sensor, and the liquid sensor detects the liquid adhering to the outer surface.

Thus, contaminants on the outer surface 372a are removed. Furthermore, the outer surface 372a is prevented from being scratched by the wiper 373 sliding.

A fourth embodiment will be described below based on FIG. 32 to FIG. 35.

Figure 32:
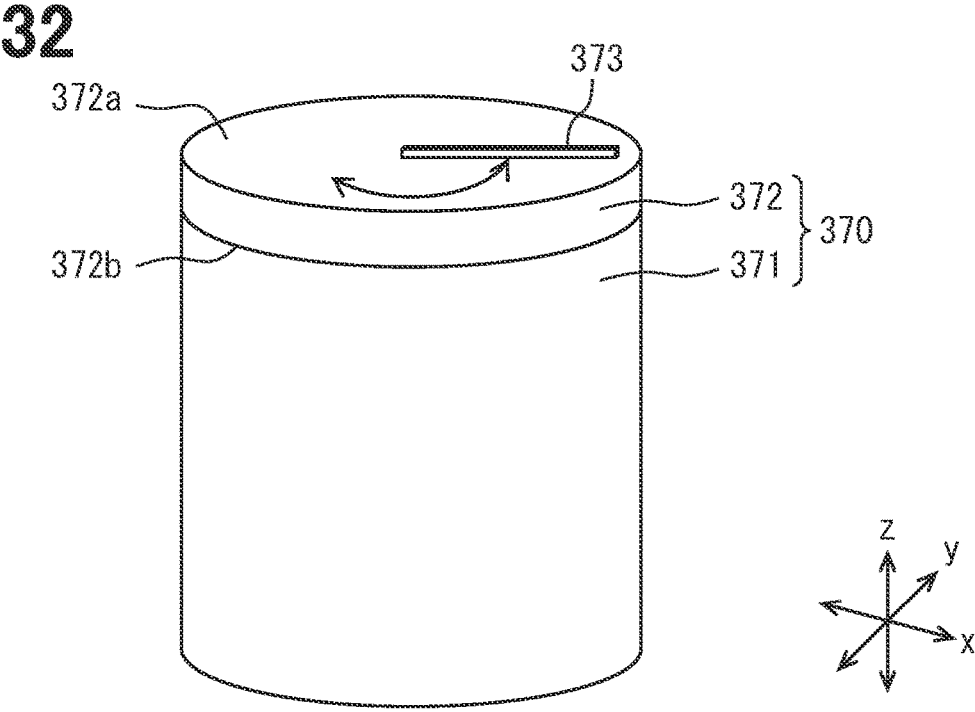
FIG. 32 is a perspective view illustrating a sensor case.
Figure 33:
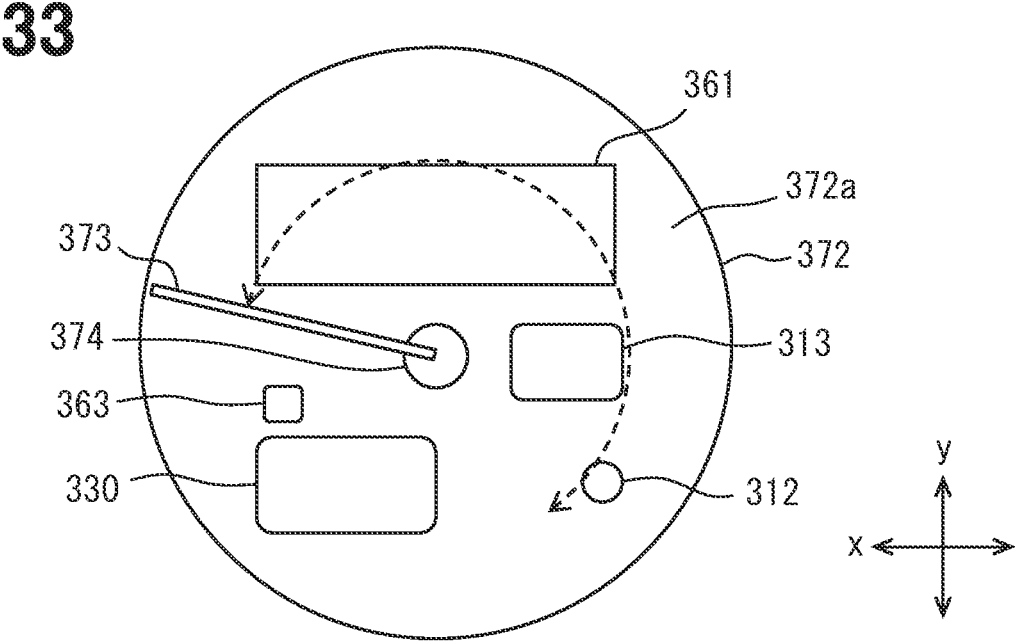
FIG. 33 is an upper view illustrating a sensor case.

The monitoring unit 300 of the present embodiment includes a sensor case 370 illustrated in FIGS. 32 and 33. The sensor case 370 stores the solar radiation sensor 312, the rain sensor 313, and the control unit 320. In FIG. 33, only the microcomputer 330, the solar cell 361, and the current sensor 363 among the components of the control unit 320 are illustrated.

The sensor case 370 includes a cylindrical housing 371 whose axial direction extends in the z direction and a lid portion 372 that closes an opening of the housing 371. The housing 371 has two bottom surfaces arranged in the z direction, with the bottom surface on the ground side closed and with the bottom surface on the sky side open. The lid portion 372 closes the opening of the bottom surface on the sky side.

The lid portion 372 is translucent. Therefore, light such as sunlight incident on an outer surface 372a of the lid portion 372 enters the inside of the lid portion 372 through the outer surface 372a of the lid portion 372. This light propagates inside the lid portion 372, and then is emitted, from an inner surface 372b on the side opposite to the outer surface 372a, into the internal space of the housing 371.

Each of the solar radiation sensor 312, the rain sensor 313, and the solar cell 361 is disposed in the internal space of the housing 371 to face the inner surface 372b of the lid portion 372. Therefore, the light emitted from the inner surface 372b is incident on each of the solar radiation sensor 312 and the solar cell 361. The light can propagate between the rain sensor 313 and the outer surface 372a.

With such an arrangement configuration, the solar radiation amount is detected by the solar radiation sensor 312. The rain sensor 313 detects a water droplet adhering to the outer surface 372a. The solar cell 361 converts light energy into electric energy.

When the outer surface 372a of the lid portion 372 on which the light is incident is contaminated, the light is difficult to enter into the lid portion 372.

As illustrated in FIG. 33, the solar radiation sensor 312 and the solar cell 361 are separated from each other in a direction orthogonal to the z direction. Therefore, the solar radiation sensor 312 and the solar cell 361 face different regions of the outer surface 372a. A region of the outer surface 372a through which light mainly incident on the solar radiation sensor 312 passes is different from that through which the light mainly incident on the solar cell 361 passes.

For example, when a region (solar radiation region) of the outer surface 372a through which the light incident on the solar radiation sensor 312 is expected to pass is contaminated, the amount of light incident on the solar radiation sensor 312 is reduced. As a result, the detection accuracy of the solar radiation amount is compromised.

Similarly, when a region (solar region) of the outer surface 372a through which the light incident on the solar cell 361 is expected to pass is contaminated, the amount of light incident on the solar cell 361 is reduced. As a result, the power generation amount is reduced.

The rain sensor 313 is separated from each of the solar radiation sensor 312 and the solar cell 361 in the direction orthogonal to the z direction. Thus, a region (rain region) of the outer surface 372a where the rain sensor 313 mainly detects the adhering of the water droplet is different in position from the solar radiation region and the solar region described above. When the rain region is contaminated, the water droplet detection accuracy of the rain sensor 313 is compromised.

In order to solve such an issue, a wiper 373 is provided on the outer surface 372a side of the lid portion 372 of the sensor case 370. A motor 374 for driving the wiper 373 is provided in the housing 371. The wiper 373 driven by the motor 374 slides on the outer surface 372a. Through the rotation of the wiper 373, the contaminant adhering to the outer surface 372a of the lid portion 372 is wiped off. Thus, the entrance of the light into the lid portion 372 is less likely to be hindered.

However, when no liquid such as water is on the outer surface 372a, it may be difficult for the wiper 373 sliding on the outer surface 372a to remove the contaminant adhering to the outer surface 372a. Furthermore, the outer surface 372a may be scratched by the wiper 373 sliding on the outer surface 372a, due to increased friction between the wiper 373 and the outer surface 372a. When the outer surface 372a is scratched, diffused reflection of light occurs at the location of the scratch, and thus the light may be less likely to enter into the lid portion 372.

<Wiping Processing>

Figure 34:
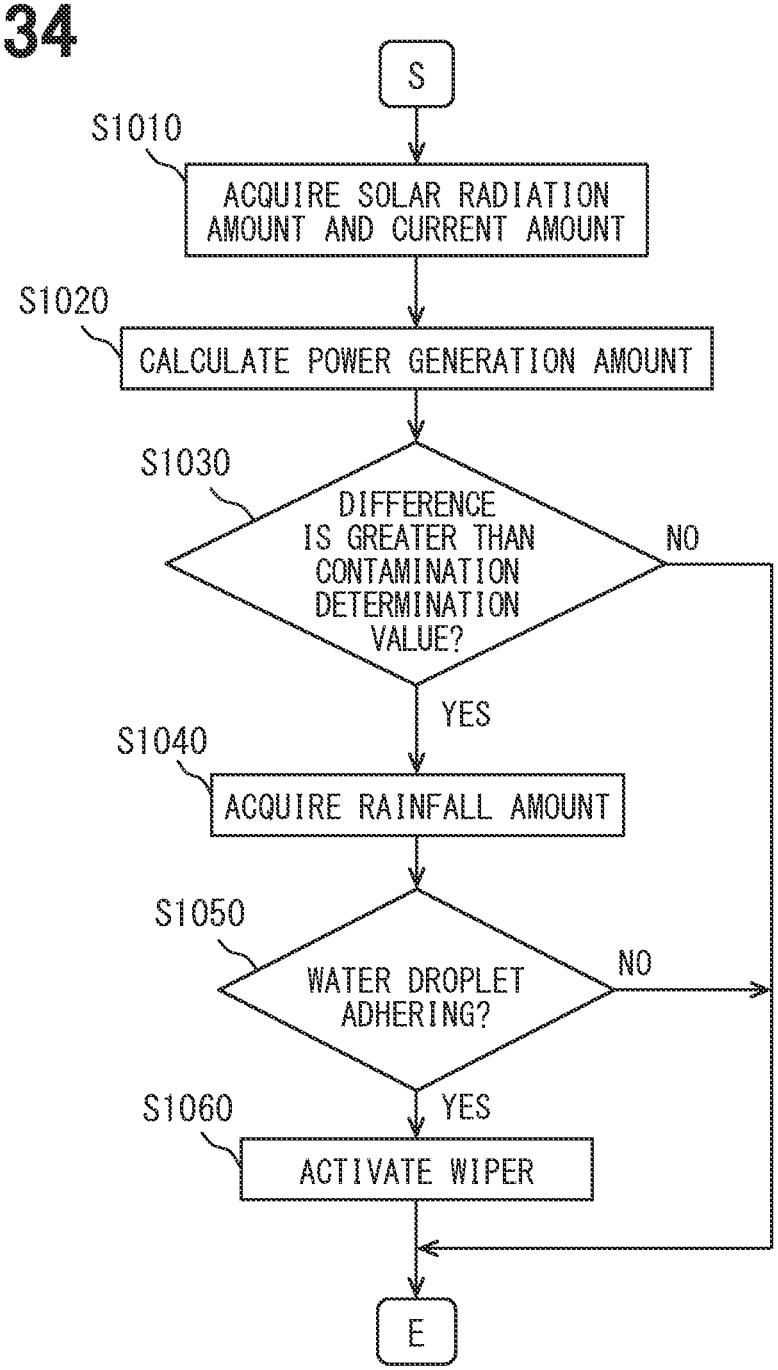
FIG. 34 is a flowchart illustrating wiping processing.

Therefore, the microcomputer 330 executes the wiping processing illustrated in FIG. 34 as the cycle task in parallel with the sensor processing described based on FIG. 6. The microcomputer 330 includes a contamination determination value as a comparison value for performing the wiping processing.

In step S1010 in FIG. 34, the microcomputer 330 acquires the solar radiation amount and the amount of current. Then, the microcomputer 330 proceeds to step S1020.

Upon proceeding to step S1020, the microcomputer 330 calculates the power generation amount expected to be achieved by the solar cell 361 based on the solar radiation amount detected by the solar radiation sensor 312. At the same time, the microcomputer 330 calculates the amount of power generated by the solar cell 361 based on the amount of current detected by the current sensor 363. Thereafter, the microcomputer 330 proceeds to step S1030.

Upon proceeding to step S1030, the microcomputer 330 obtains a difference between the power generation amount based on the solar radiation amount and the power generation amount achieved by the solar cell 361 calculated based on the amount of current. It is determined whether the absolute value of the difference is larger than the contamination determination value. When the absolute value of the difference is larger than the contamination determination value, the microcomputer 330 proceeds to step S1040. When the absolute value of the difference is equal to or smaller than the contamination determination value, the microcomputer 330 ends the wiping processing.

The contamination determination value can be determined, for example, based on a difference between a power generation amount expected to be achieved by the solar cell 361 with theoretically maximum contamination and a power generation amount expected by the solar cell 361 with no contamination at all. The contamination determination value is a value for determining whether the power generation amount has decreased to an extent that cannot be explained by the deterioration of the solar cell 361.

As described above, the position of the solar radiation region on the outer surface 372a through which the light incident on the solar radiation sensor 312 is expected to pass is different from that of the solar region on the outer surface 372a through which the light incident on the solar cell 361 is expected to pass. Thus, the solar radiation region and the solar region are less likely to have the same level of contamination. The solar radiation region and the solar region are expected to have difference levels of contamination adhered.

Therefore, as described above, the difference between the power generation amount calculated based on the solar radiation amount on the solar radiation sensor 312 after passing through the solar radiation region, and the power generation amount achieved by the solar cell 361 calculated based on the amount of current detected by the current sensor 363. When one of the solar radiation region and the solar region is contaminated, the absolute value of the difference between the two power generation amounts is expected to be large to exceed the contamination determination value.

Upon proceeding to step S1040 as a result of determining that the absolute value of the difference is larger than the contamination determination value, the microcomputer 330 detects the rainfall amount using the rain sensor 313. Thereafter, the microcomputer 330 proceeds to step S1050.

In a strict sense, the rainfall amount detected by the rain sensor 313 corresponds to the water droplet adhered area in the rain region of the outer surface 372a. The rainfall amount can be determined to be larger with a higher ratio of the water droplet adhered area to the rain region.

Upon proceeding to step S1050, the microcomputer 330 determines whether water droplets are adhering to the outer surface 372a, based on the rainfall amount detected by the rain sensor 313. The determination on whether the water droplets are adhering can be made based on whether the rainfall amount is larger than the rainy weather determination value used in the sensor processing update processing described based on FIG. 25 for example. When the rainfall amount is larger than the rainy weather determination value, the microcomputer 330 proceeds to step S1060. When the rainfall amount is equal to or smaller than the rainy weather determination value, the microcomputer 330 ends the wiping processing.

Upon proceeding to step S1060, the microcomputer 330 drives the wiper 373. As a result, the contaminant adhering to the outer surface 372a is expected to be wiped off together with the water droplets adhering to the outer surface 372a.

<Operations and Effects>

As described above, the microcomputer 330 determines whether the outer surface 372a is contaminated. The microcomputer 330 determines whether water droplets are adhering to the outer surface 372a. When water droplets are adhering to the outer surface 372a, the microcomputer 330 drives the wiper 373. On the other hand, when no water droplet is adhering to the outer surface 372a, the microcomputer 330 does not drive the wiper 373. With the control thus executed, the contaminant adhering to the outer surface 372a is wiped off. Furthermore, the outer surface 372a is prevented from being scratched by the wiper 373 sliding.

As described above, the monitoring unit 300 is provided in the open farm field 20. It rains on the farm field 20. Therefore, raindrops adhere to the outer surface 372a of the sensor case 370. Furthermore, the irrigation water is supplied to the farm field 20. When the sensor case 370 is located on the extension line of the direction (parabolic discharge direction) in which the irrigation water is discharged from the drip holes 137, the irrigation water is highly likely to adhere to the outer surface 372*a*.

For example, with such a configuration, the water droplets for removing the contamination easily adheres to the outer surface 372*a* of the lid portion 372, compared with a configuration where the sensor case 370 is simply provided on a roadside. The farm field 20 needs not to be provided with a dedicated injection mechanism for applying liquid, such as the irrigation water, onto the outer surface 372*a*.

It is a matter of course that a configuration may be employed in which the farm field 20 is provided with such an injection mechanism. Furthermore, a configuration may be employed in which the liquid discharged from the injection mechanism is selectively applied to a plurality of the sensor cases 370. Which of the plurality of sensor cases 370 the liquid is applied can be determined based on, for example, how easily the irrigation water discharged from the drip holes 137 adheres to the outer surface 372*a* of the sensor cases 370.

A configuration may be employed in which the water spray nozzle described in the first embodiment is attached to the drip holes 137, and the sensor case 370 is provided on the extension line of the parabolic injection direction of the irrigation water from the water spray nozzle. With this configuration, the water droplets for removing the contamination can adhere to the outer surface 372*a* of the sensor case 370, by controlling the injection of the irrigation water from the water spray nozzle through opening/closing control on the water supply valves 152. As described above, a configuration may be employed in which irrigation water is used for supplying water to the plants 30 and removing contamination on the outer surface 372*a* of the sensor case 370.

In the example described, the microcomputer 330 of each of the plurality of monitoring unit 300 executes the wiping processing. Alternatively, the integrated calculation unit 600 may execute the wiping processing. In this case, the integrated calculation unit 600 executes steps S1010 to S1050 for the wiping processing illustrated in FIG. 34 for each of the plurality of monitoring units 300. Then, in step S1060, the integrated calculation unit 600 outputs an instruction signal including an instruction for operating the wiper to the monitoring unit 300. The instruction for wiper operation corresponds to the driving instruction.

<Rain Sensor>

No specific configuration of the rain sensor 313 is described above. The rain sensor 313 can have the following configuration for example.

Although not illustrated, the rain sensor 313 can have a configuration including a light emitting unit and a light receiving unit. The light emitting unit emits light from the inner surface 372*b* side toward the rain region of the outer surface 372*a*. The light receiving unit converts received light into an electrical signal.

When no water droplet is adhering to the rain region, most of the light emitted from the light emitting unit is reflected at the interface between the outer surface 372*a* and the air. The reflected light is incident on the light receiving unit. In this case, the maximum amount of light is received by the light receiving unit. The light receiving unit outputs an electrical signal corresponding to this amount of light to the microcomputer 330.

However, when water droplets are adhering to the rain region, part of the light emitted from the light emitting unit travels from the outer surface 372*a* to the water droplet and is emitted to the outside from the water droplet. Therefore, this light is not received by the light receiving unit. The amount of light reflected at the interface between the outer surface 372*a* and air decreases, and the amount of light received by the light receiving unit decreases. An electrical signal corresponding to the reduced amount of light is output from the light receiving unit to the microcomputer 330.

As described above, when water droplets are adhering to the rain region, the electrical signal output from the light receiving unit varies. An increase in the water droplet adhered area in the rain region leads to a large amount of such change. Thus, the rain sensor 313 generates an electrical signal corresponding to the water droplet adhered area in the rain region.

<Rainfall Amount Detection Processing>

The accumulated rainfall amount can be further calculated with the rain sensor 313 and the wiper 373. In this case, the microcomputer 330 executes rainfall amount detection processing illustrated in FIG. 35 as the cycle task.

Figure 35:
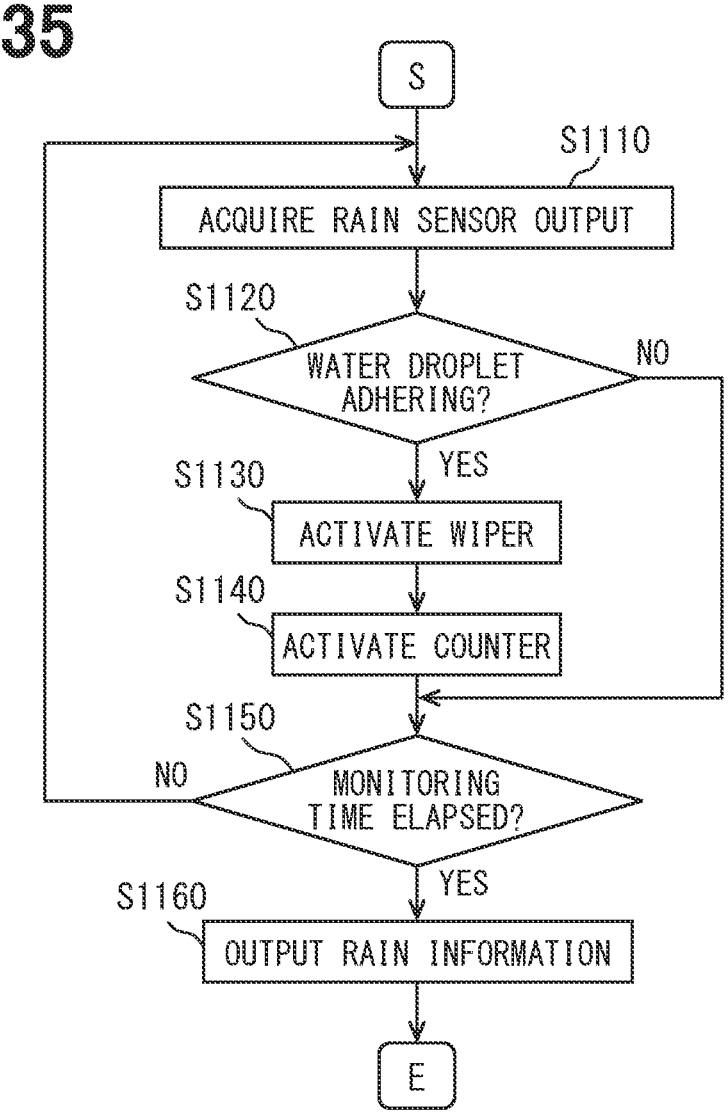
FIG. 35 is a flowchart illustrating rainfall amount detection processing.

In step S1110 illustrated in FIG. 35, the microcomputer 330 acquires the output from the rain sensor 313. Thereafter, the microcomputer 330 proceeds to step S1120.

Upon proceeding to step S1120, the microcomputer 330 determines whether the water droplets are adhering to the rain region, based on the output from the rain sensor 313. When water droplets are adhering to the rain region, the microcomputer 330 proceeds to step S1130. When no water droplet is adhering to the rain region, the microcomputer 330 proceeds to step S1150.

Upon proceeding to step S1130, the microcomputer 330 starts operating the wiper 373. As a result, water droplets adhering to the outer surface 372*a* are removed. In this case, the microcomputer 330 executes the processing in step S1140. Specifically, the microcomputer 330 starts a counter and counts the number of times the outer surface 372*a* is wiped by the wiper 373. Thereafter, the microcomputer 330 proceeds to step S1150.

Upon proceeding to step S1150, the microcomputer 330 determines whether monitor time has elapsed. When the monitor time has elapsed, the microcomputer 330 proceeds to step S1160. When the monitor time has not elapsed yet, the microcomputer 330 repeats steps S1110 to S1150. As a result, whether the water droplets are adhering continues to be determined during the monitor time. The wiping by the wiper 373 is continued during the monitoring time, and the number of times the wiping is performed with the wiper 373 is measured.

Upon proceeding to step S1160, the microcomputer 330 calculates the accumulated rainfall amount within the monitor time, based on the water droplet adhered area detected by the rain sensor 313, the number of times the wiping is performed by the wiper 373 during the monitor time. Then, the microcomputer 330 outputs rain information including the accumulated rainfall amount from the communication unit 340 to the integrated communication unit 400.

<Rainfall Amount Detection Processing Using Camera>

Figure 36:
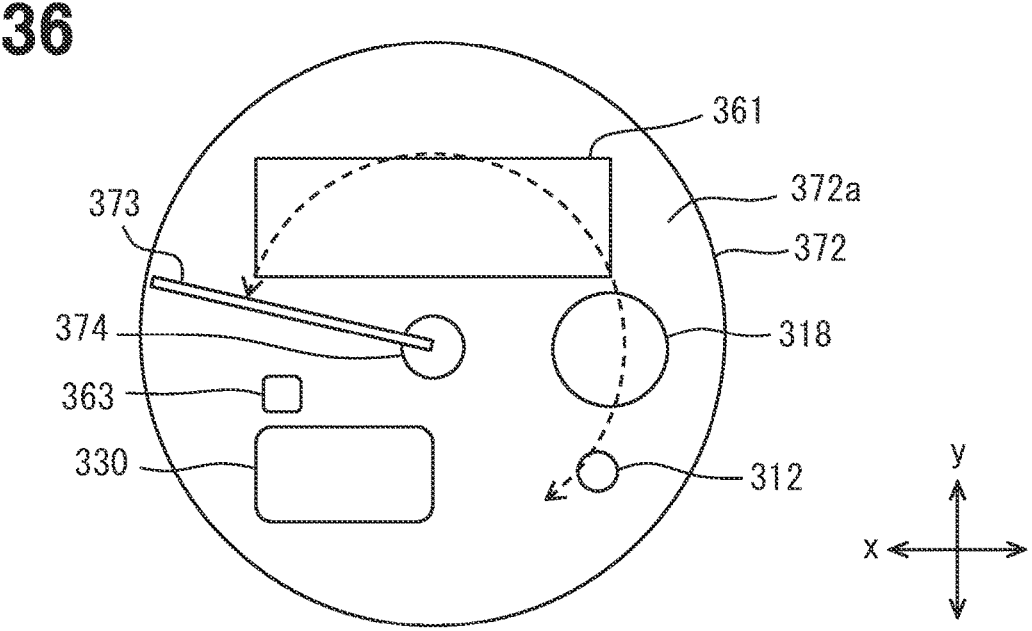
FIG. 36 is an upper view illustrating a modification of the sensor case.

As illustrated in FIG. 36, a configuration may be employed in which the monitoring unit 300 includes a camera 318 instead of the rain sensor 313. The camera 318 captures an image on the upper side of the outer surface 372*a*. With this configuration, the microcomputer 330 of the monitoring unit 300 executes the rainfall amount detection processing using the camera 318 illustrated in FIG. 37, as the cycle task. The rain sensor 313 and the camera 318 correspond to a liquid sensor.

Figure 37:
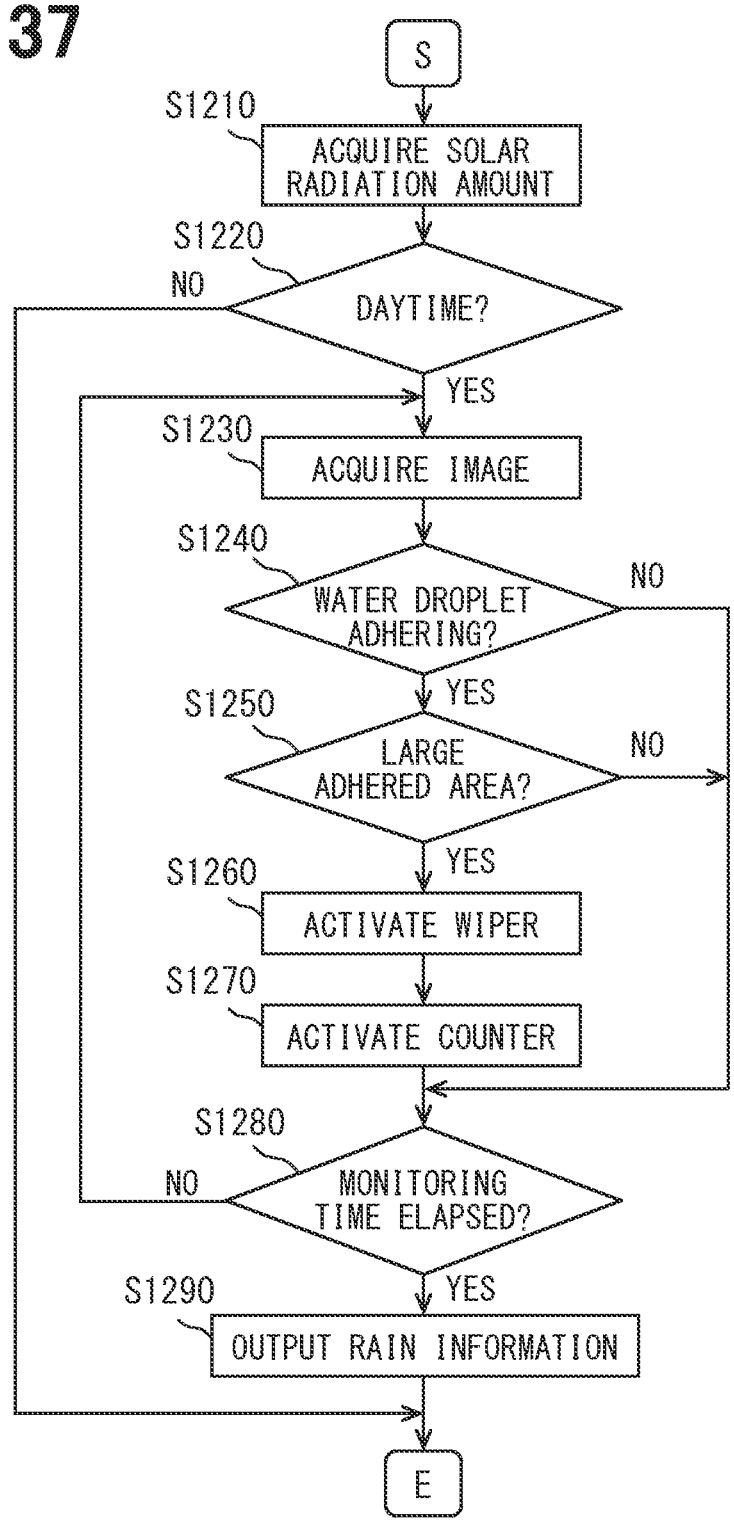
FIG. 37 is a flowchart illustrating rainfall amount detection processing using a camera.

In step S1210 illustrated in FIG. 37, the microcomputer 330 acquires the solar radiation amount. Thereafter, the microcomputer 330 proceeds to step S1220.

Upon proceeding to step S1220, the microcomputer 330 determines whether its daytime or night, based on the solar radiation amount acquired. The daytime determination can be made based on whether the solar radiation amount is larger than the day/night determination value used in the sensor processing update processing described based on FIG. 25 for example. When the solar radiation amount is larger than the day/night determination value, the microcomputer 330 proceeds to step S1230. When the solar radiation amount is equal to or smaller than the day/night determination value, the microcomputer 330 ends the rainfall amount detection processing.

Upon proceeding to step S1230, the microcomputer 330 starts driving the camera 318. Then, the microcomputer 330 makes the camera 318 captured an image on the upper side of the outer surface 372a. Thereafter, the microcomputer 330 proceeds to step S1240.

Upon proceeding to step S1240, the microcomputer 330 determines whether the water droplets are adhering to the outer surface 372a, based on an image captured by the camera 318. When water droplets are adhering to the outer surface 372a, the microcomputer 330 proceeds to step S1250. When no water droplet is adhering to the outer surface 372a, the microcomputer 330 proceeds to step S1280.

Whether the water droplet are adhering to the outer surface 372a can be determined, for example, based on whether the image is defocused.

Upon proceeding to step S1250, the microcomputer 330 determines whether the water droplet adhered area of the outer surface 372a is large. When the adhered area is large, the microcomputer 330 proceeds to step S1260. When the adhered area is small, the microcomputer 330 proceeds to step S1280. Whether the adhered area is large can be determined using, for example, the rainy weather determination value as described above.

Upon proceeding to step S1260, the microcomputer 330 starts operating the wiper 373. As a result, water droplets adhering to the outer surface 372a are removed. In this case, the microcomputer 330 executes the processing in step S1270.

The microcomputer 330 starts a counter and counts the number of times the outer surface 372a is wiped by the wiper 373. Thereafter, the microcomputer 330 proceeds to step S1280.

Upon proceeding to step S1280, the microcomputer 330 determines whether monitor time has elapsed. When the monitor time has elapsed, the microcomputer 330 proceeds to step S1290. When the monitor time has not elapsed yet, the microcomputer 330 repeats steps S1230 to S1280. As a result, whether the water droplets are adhering continues to be determined based on the image acquired, during the monitor time. The wiping by the wiper 373 is continued during the monitoring time, and the number of times the wiping is performed with the wiper 373 is measured.

Upon proceeding to step S1290, the microcomputer 330 calculates the accumulated rainfall amount within the monitor time, based on the water droplet adhered area detected by the camera 318, the number of times the wiping is performed by the wiper 373 during the monitor time. Then, the microcomputer 330 outputs rain information including the accumulated rainfall amount from the communication unit 340 to the integrated communication unit 400.

Fifth Embodiment

The present disclosure relates to a monitoring unit.

As disclosed in JP-3444192B, an imaging environment estimation device included in a vehicle automatic driving system of a vehicle has been known.

The imaging environment estimation device described in the above publication calculates an approximate straight line based on a distance between a white line extending away from a vehicle on a road and an image capturing device and the level of blurring of the white line in the captured image. Then, the imaging environment estimation device discriminates between fog and rainfall based on the magnitude of the inclination of the approximate straight line.

Since such determination is performed, when there is no white line extending away from the vehicle as the detection target, the approximate straight line for discriminating between fog and rainfall cannot be calculated. Thus, fog might not be detectable.

An object of the present disclosure is to provide a monitoring unit capable of detecting fog.

A monitoring unit according to an aspect of the present disclosure includes:
- an upper portion 376 having a first surface 380b provided with a reference image 384;
- a camera 318 configured to capture the reference image;
- a lower portion 375 configured to store the camera with part of the camera provided to a second surface 379a;
- a support portion 385 that has a communication window 385c formed to communicate an opposing space between the first surface and the second surface with an outer atmosphere, and is configured to connect the upper portion and the lower portion to each other with the first surface and the second surface separated from each other;
- an eaves portion 386 that has a communication hole 386a having a smaller opening area than the communication window and communicating the communication window with the outer atmosphere, and is connected to the support portion to cover the communication hole; and
- a calculation processing unit 330 configured to determine whether there is a water droplet on the first surface based on defocusing of the reference image captured by the camera.

With this configuration, water droplets due to dew condensation and not water droplets due to rainfall are likely to adhere to the first surface 380b. Thus, whether fog is appearing can be detected based on defocusing of the reference image 384 provided to the first surface 380b.

A fifth embodiment will be described below based on FIG. 38 to FIG. 42.

Figure 38:
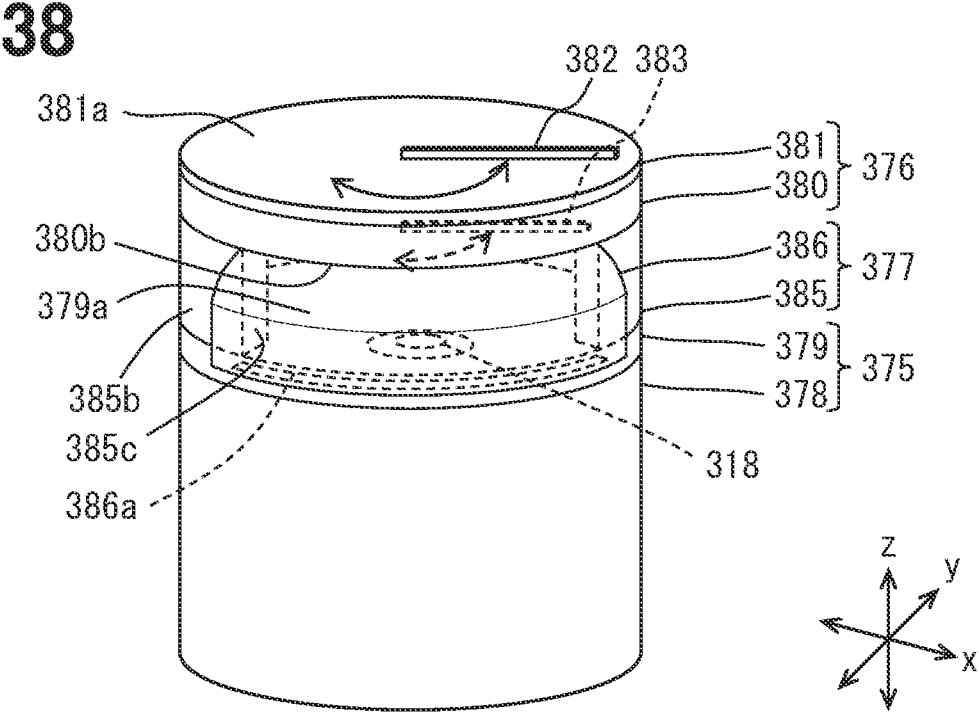
FIG. 38 is a perspective view illustrating a first sensor case, a second sensor case, and a coupling case.

As illustrated in FIG. 38, the monitoring unit 300 of the present embodiment includes a first sensor case 375, a second sensor case 376, and a coupling case 377. The first sensor case 375 and the second sensor case 376 are arranged in the z direction with the coupling case 377 provided in between. The first sensor case 375 and the second sensor case 376 are mechanically connected to each other via the coupling case 377. A part of these three members may be integrally connected by resin molding or the like.

Figure 39:
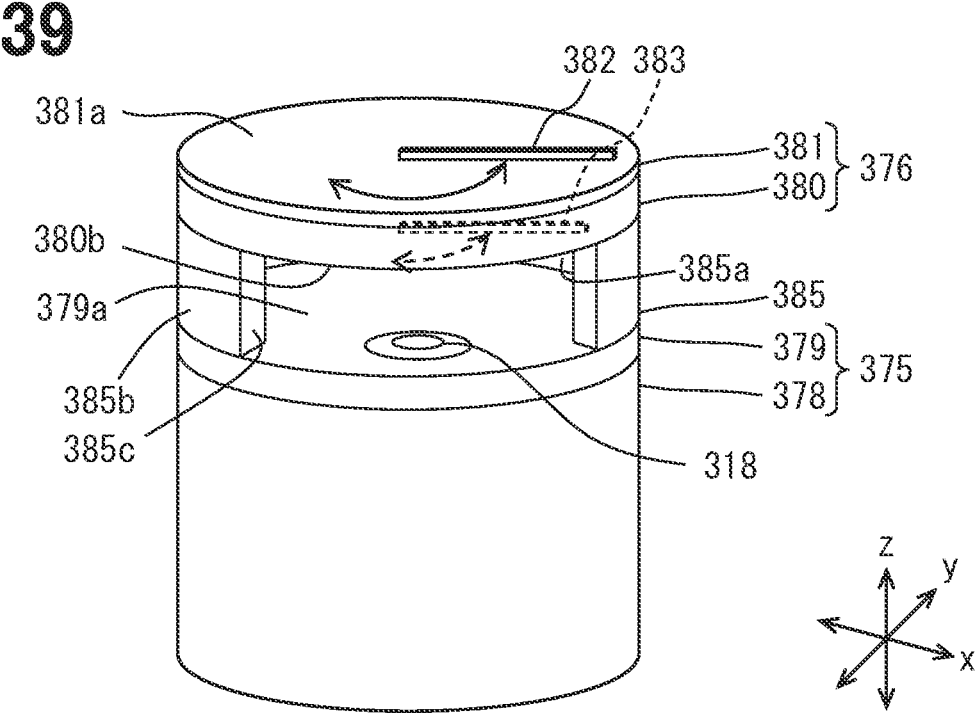
FIG. 39 is a perspective view with an eaves portion removed from the perspective view in FIG. 38.
Figure 40:
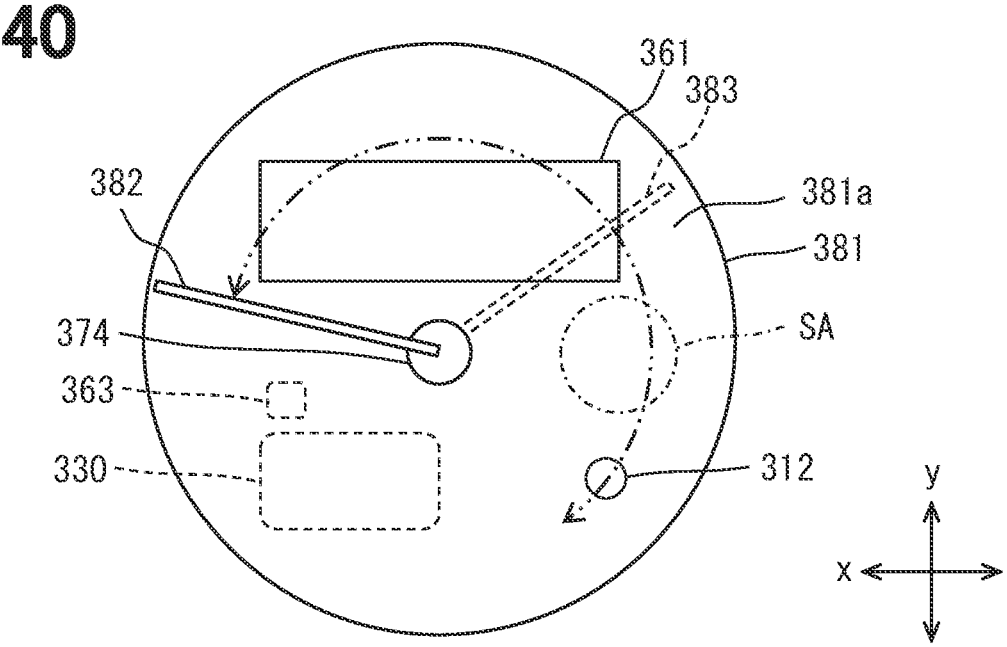
FIG. 40 is an upper view illustrating the second sensor case.

The first sensor case 375 stores components other than the solar cell 361 among the components of the control unit 320. As illustrated in FIG. 39, the camera 318 is stored in the first sensor case 375. As illustrated in FIG. 40, the second sensor case 376 stores the solar radiation sensor 312 and the solar cell 361. The member stored in the first sensor case 375 and the member stored in the second sensor case 376 are electrically connected to each other via wiring or the like extending via the coupling case 377.

In FIG. 40, the microcomputer 330, the solar cell 361, and the current sensor 363 among the components of the control unit 320 are illustrated. The microcomputer 330 and the current sensor 363 are stored in the first sensor case 375, and in FIG. 40, the positions where they are projected onto the second sensor case 376 along the z direction are indicated by broken lines.

The first sensor case 375 includes a cylindrical first housing 378 and a first lid portion 379 that closes an opening of the first housing 378. The first housing 378 has a bottom portion and a side wall. The bottom portion has two surfaces arranged in the z direction. The side wall stands in the z direction from one surface located on the sky side of the two surfaces. The side wall also extends annularly in the circumferential direction around the z direction. An opening of the first housing 378 is defined on the distal end side of the side wall.

The first lid portion 379 has a lower surface on the first sensor case 375 side and an upper surface 379a on the opposite side, arranged in z direction. The first lid portion 379 is connected to the first housing 378, to have a first lower surface face the bottom portion of the first housing 378 in the z direction. The first lid portion 379 closes the opening of the first housing 378. The upper surface 379a corresponds to the second surface.

A through hole is formed through the lower surface and the upper surface 379a in the z direction, in the first lid portion 379. The camera 318 is provided in the through hole. The distal end side of the camera 318 protrudes from the opening of the through hole on the upper surface 379a side. The camera 318 captures an image on the upper side of the upper surface 379a.

In the present embodiment, the position where the through hole, in which the camera 318 is provided, is formed in the upper surface 379a is different from the geometric center of the upper surface 379a. Alternatively, these may be at the same positions.

In the present embodiment, the upper surface 379a is flat. Alternatively, the upper surface 379a may not be flat. For example, the upper surface 379a may protrude in the z direction away from the first housing 378, with the opening position of the through hole serving as the apex. In such a configuration, even if water droplets are adhering to the upper surface 379a, the water droplets easily flow down on the upper surface 379a so as to be separated from the camera 318 provided in the through hole.

The upper surface 379a may be configured to have higher wettability than the portion of the camera 318 protruding from the opening of the through hole on the upper surface 379a side. In other words, the portion of the camera 318 protruding from the opening of the through hole on the upper surface 379a side may be configured to have higher water repellency than the upper surface 379a. With such a configuration, the state where the water droplets are adhering to the camera 318 is less likely to be maintained. Furthermore, the upper surface 379a may be provided with a dedicated wiper for wiping the lens of the camera 318.

The second sensor case 376 includes a cylindrical second housing 380 and a second lid portion 381 that closes an opening of the second housing 380. The second housing 380 has a bottom portion and a side wall. The bottom portion has a lower outer surface 380b and a lower inner surface on the opposite side that are arranged in the z direction. The side wall stands in the z direction from the lower inner surface. At the same time, the side wall extends annularly in the circumferential direction around the z direction. An opening of the second housing 380 is defined on the distal end side of the side wall. The lower outer surface 380b corresponds to the first surface.

The second lid portion 381 includes an upper outer surface 381a and an upper inner surface on the opposite side, arranged in the z direction. The second lid portion 381 is connected to the second housing 380 to have the upper inner surface face the lower inner surface of the bottom portion in the z direction. The second lid portion 381 closes the opening of the second housing 380. The internal space of the second sensor case 376 is located between the upper inner surface of the second lid portion 381 and the lower inner surface of the bottom portion in the z direction.

The second housing 380 and the second lid portion 381 are translucent. Thus, light incident on the upper outer surface 381a of the second lid portion 381 enters the inside of the second lid portion 381 through the upper outer surface 381a. The light propagates inside the second lid portion 381, and then is emitted into the internal space of the second sensor case 376 from the upper inner surface. On the other hand, the light incident on the lower outer surface 380b of the bottom portion of the second housing 380 enters the inside of the bottom portion through the lower outer surface 380b. The light propagates inside the bottom portion, and then is emitted into the internal space of the second sensor case 376 from the lower inner surface. Alternatively, the light propagates in the bottom portion and the side wall, and then enters the inside of the second lid portion 381.

The solar radiation sensor 312 and the solar cell 361 are each arranged to face the upper inner surface of the second lid portion 381 in the z direction. Therefore, the light emitted into the internal space of the second sensor case 376 from the upper inner surface is incident on each of the solar radiation sensor 312 and the solar cell 361.

Figure 41:
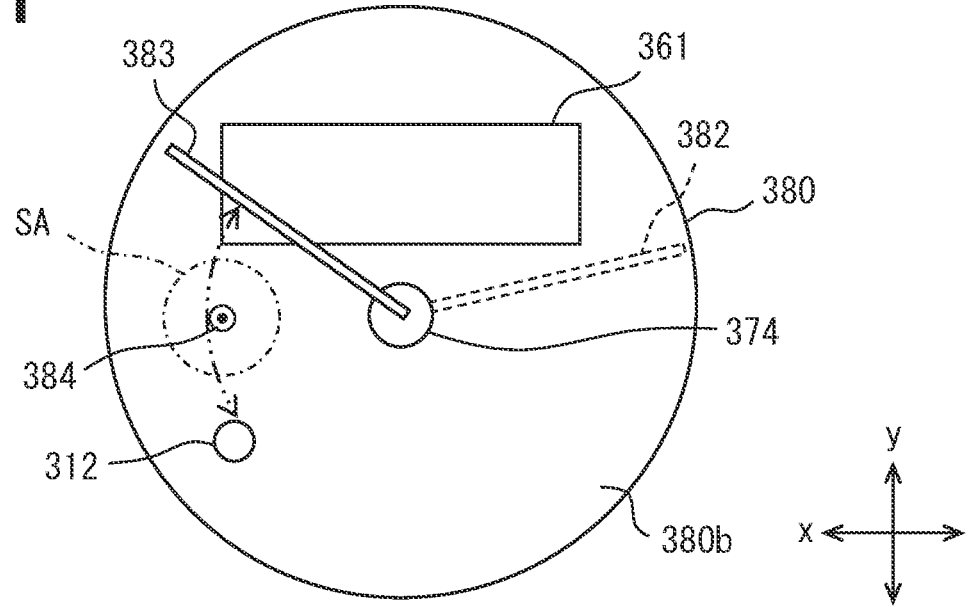
FIG. 41 is a lower view illustrating the second sensor case.

As illustrated in FIG. 40, an upper wiper 382 is provided on the upper outer surface 381a side of the second lid portion 381. As illustrated in FIG. 41, a lower wiper 383 is provided on the lower outer surface 380b side of the second housing 380. The second sensor case 376 is provided with the motor 374 for driving each of the upper wiper 382 and the lower wiper 383.

The upper wiper 382 driven by the motor 374 slides on the upper outer surface 381a. The lower wiper 383 driven by the motor 374 slides on the lower outer surface 380b. As a result, water droplets and the contaminants adhering to the upper outer surface 381a and the lower outer surface 380b are wiped off.

As illustrated in FIGS. 38 and 39, a positional relationship between the second sensor case 376 and the first sensor case 375 is determined with the coupling case 377, such that the lower outer surface 380b of the second sensor case 376 and the upper surface 379a of the first sensor case 375 face each other while being separated from each other in the z direction.

As described above, the first sensor case 375 is provided with the camera 318 that captures an image on the upper side of the upper surface 379a. The camera 318 faces the lower outer surface 380b of the second sensor case 376 in the z direction. Furthermore, the camera 318 and the translucent upper outer surface 381a of the second sensor case 376 are arranged in the z direction. The camera 318 can capture an image including part of each of the lower outer surface 380b and the upper outer surface 381a.

Note that air may or may not be present in a region between the lower outer surface 380b and the upper outer surface 381a located within the viewing angle of the camera 318. The configuration with no air in the region between the lower outer surface 380b and the upper outer surface 381a located within the viewing angle can be achieved, for example, by filling the region between the lower inner surface of the bottom portion of the second housing 380 and the upper inner surface of the second lid portion 381 located with the viewing angle with a translucent material. As the translucent material, for example, a material for forming the second housing 380 or the second lid portion 381 can be used. The region between the lower inner surface and the upper inner surface located within the viewing angle may be filled with part of the second housing 380 or the second lid portion 381.

In FIGS. 40 and 41, a region (image capturing region SA) of image capturing by the camera 318 is defined by a one-dot chain line. The image capturing region SA is separated from each of the solar radiation sensor 312, the solar cell 361, and the motor 374 stored in the second sensor case 376, in a direction orthogonal to the z direction. The image capturing region SA is separated, in a direction orthogonal to the z direction, from each of the solar radiation region of the upper outer surface 381a through which the light incident on the solar radiation sensor 312 is expected to pass and the solar region of the upper outer surface 381a through which the light incident on the solar cell 361 is expected to pass.

As illustrated in FIG. 41, a fog symbol 384 as a reference image is provided in the image capturing region SA in the lower outer surface 380b. The camera 318 is focused on the fog symbol 384. Therefore, when no water droplet or the like is adhering to the lower outer surface 380b, the image of the fog symbol 384 captured by the camera 318 is in focus. However, when waters droplet and the like are adhering to the lower outer surface 380b, the image of the fog symbol 384 captured by the camera 318 defocused due to irregular reflection of light caused by the water droplets.

As illustrated in FIGS. 38 and 39, the coupling case 377 includes a support portion 385 and an eaves portion 386. The support portion 385 has a cylindrical shape with the axial direction in the z direction. Two bottom surfaces of the support portion 385 arranged in the z direction are open. The support portion 385 has an upper annular end surface and a lower annular end surface extending annularly in the circumferential direction around the z direction as part of these two bottom surfaces.

The upper annular end surface of the support portion 385 is arranged to face the edge side of the lower outer surface 380b of the second sensor case 376 in the z direction. The support portion 385 and the second sensor case 376 are mechanically connected by an adhesive, fitting, or the like.

The lower annular end surface of the support portion 385 is arranged to face the edge side of the upper surface 379a of the first sensor case 375 in the z direction. The support portion 385 and the first sensor case 375 are mechanically connected by an adhesive, fitting, or the like.

The support portion 385 has an inner side surface 385a and an outer side surface 385b of an annular shape, connecting the upper annular end surface and the lower annular end surface. The inner side surface 385a defines a hollow space of the support portion 385. The hollow space is located between the lower outer surface 380b of the second sensor case 376 and the upper surface 379a of the first sensor case 375 in the z direction. The outer side surface 385b is exposed to an outer atmosphere.

As illustrated in FIG. 39, in the support portion 385, a communication window 385c is formed through the inner side surface 385a and the outer side surface 385b and communicates the hollow space of the support portion 385 with the outer atmosphere. The communication window 385c opens in a direction orthogonal to the z direction. That is, the communication window 385c opens in the horizontal direction. At least part of the hollow space of the support portion 385 corresponds to the opposing space.

As illustrated in FIG. 38, the eaves portion 386 is provided on the support portion 385 so as to cover the communication window 385c. A communication hole 386a having a smaller opening area than the communication window 385c is formed in the eaves portion 386.

The communication hole 386a is open on the ground side in the z direction. The communication hole 386a communicates with the communication window 385c. With this configuration, the outside air flowing from the ground side toward the eaves portion 386 flows into the hollow space of the support portion 385 through the communication hole 386a and the communication window 385c. On the other hand, the eaves portion 386 prevents raindrops or the like falling from the sky side onto the eaves portion 386, from entering the hollow space of the support portion 385 through the communication window 385c.

The configuration of the communication path between the communication hole 386a and the communication window 385c is not particularly limited. Any configuration that can prevent liquid such as rainwater from entering the communication window 385c through the communication hole 386a can be employed as the configuration of the communication path. As a specific configuration of the communication path, a configuration may be employed with a labyrinth structure in which the path extends while being folded back at least once to have a long path length for example.

The hollow space of the support portion 385 is located between the upper surface 379a of the first sensor case 375 and the lower outer surface 380b of the second sensor case 376 in the z direction. Therefore, the camera 318 provided on the upper surface 379a and the fog symbol 384 provided on the lower outer surface 380b are provided in the hollow space of the support portion 385. Each of the camera 318 and the fog symbol 384 is exposed to the outside air flowing into the hollow space of the support portion 385 through the communication hole 386a and the communication window 385c.

For example, when fog appears in the farm field 20, outside air containing a large amount of moisture flows into the hollow space of the support portion 385. As a result, dew condensation occurs on the lower outer surface 380b provided with the fog symbol 384. When the camera 318 captures an image of the fog symbol 384 on the lower outer surface 380b to which the water droplets are adhering due to the dew condensation, a defocused image of the fog symbol 384 is acquired due to diffused reflection of light caused by the water droplets.

On the other hand, when the rain falls on the farm field 20, raindrops are prevented from entering the hollow space of the support portion 385. Only the outside air containing some moisture flows into the hollow space of the support portion 385. Therefore, adhering of water droplets to the lower outer surface 380b provided with the fog symbol 384 is prevented. When the camera 318 captures an image of the fog symbol 384 on the lower outer surface 380b the adhering of water droplets on which is prevented, an in-focus image of the fog symbol 384 is acquired.

<Fog Detection Processing>

The microcomputer 330 of the monitoring unit 300 executes fog detection processing illustrated in FIG. 42 as the cycle task. The microcomputer 330 executes this fog detection processing in parallel with the sensor processing described based on FIG. 6.

In step S1310 illustrated in FIG. 42, the microcomputer 330 acquires the solar radiation amount. Thereafter, the microcomputer 330 proceeds to step S1320.

Upon proceeding to step S1320, the microcomputer 330 determines whether its daytime or night, based on the solar radiation amount acquired. The daytime determination can be made based on whether the solar radiation amount is larger than the day/night determination value described above for example. When the solar radiation amount is larger than the day/night determination value, the microcomputer 330 proceeds to step S1330. When the solar radiation amount is equal to or smaller than the day/night determination value, the microcomputer 330 ends the fog detection processing.

Upon proceeding to step S1330, the microcomputer 330 starts driving the camera 318. An image of the fog symbol 384 on the lower outer surface 380b is captured by the camera 318. Thereafter, the microcomputer 330 proceeds to step S1340.

Upon proceeding to step S1340, the microcomputer 330 determines whether the image of the fog symbol 384 captured by the camera 318 is blurred. When the image is blurred, the microcomputer 330 proceeds to step S1350. When the image is not blurred, the microcomputer 330 ends the fog detection processing.

Upon proceeding to step S1350, the microcomputer 330 starts operating the lower wiper 383. As a result, water droplets and contaminant adhering to the lower outer surface 380b are removed. At this timing, the microcomputer 330 also starts operating the upper wiper 382. As a result, water droplets and contaminant adhering to the upper outer surface 381a are removed. Thereafter, the microcomputer 330 proceeds to step S1360.

Upon proceeding to step S1360, the microcomputer 330 determines whether removal time has elapsed. When the removal time has elapsed, the microcomputer 330 ends the fog detection processing. When the removal time has not elapsed yet, the microcomputer 330 repeats steps S1350 to S1360 and continues the operations of the lower wiper 383 and the upper wiper 382.

<Operations and Effects>

As described above, the image of the fog symbol 384 is acquired by the camera 318. Then, whether the fog symbol 384 in the image is defocused is determined. Thus, whether fog is appearing in the farm field 20 can be determined.

The lower outer surface 380b and the upper outer surface 381a may be wiped by the lower wiper 383 and the upper wiper 382, regardless of whether the fog detection processing is executed. After the wiping, the rainfall amount detection processing using the camera 318 described based on FIG. 37 may be executed, with the camera 318 focused on the upper outer surface 381a. Thus, the rainfall amount is detected. Alternatively, a rain symbol similar to the fog symbol 384 may be provided on the upper outer surface 381a, and rainfall may be detected based on how much the rain symbol is blurred.

In the present embodiment, an example is described where the lower outer surface 380b is provided with the lower wiper 383. Alternatively, the lower wiper 383 can be omitted, for example, if the lower outer surface 380b is included in the viewing angle of the camera 318 and a range excluding the fog symbol 384 is provided with water repellent treatment. Furthermore, a configuration may be employed in which the monitoring unit 300 includes an ultrasonic wave element that generates ultrasonic waves for blowing off water droplets adhering to the lower outer surface 380b.

(Other Modifications)

In the first embodiment, an example is described in which the lateral pipe 134 is more separated from the ground in the z direction than the apices of the plants 30 fully grown are. Alternatively, the lateral pipe 134 may be located closer to the ground side in the z direction than the apices of the plants 30 fully grown are.

In the first embodiment, an example is described in which each of the lateral pipe 134 and the longitudinal pipe 133 is provided on the sky side of the farm field 20. Alternatively, at least one of the lateral pipe 134 and the longitudinal pipe 133 may be provided on the ground. At least one of the lateral pipe 134 and the longitudinal pipe 133 may be provided in the ground.

Although the present disclosure has been described based on the embodiments, it should be understood that the present disclosure is not limited to the embodiments and structures. The present disclosure also includes various modifications and variations within a range of equivalence. Furthermore, although various combinations and modes are described in the present disclosure, the scope and idea of the present disclosure further include other combinations and modes including only one element, more elements, or less elements in these.

(Technical Idea)

The present specification includes various technical ideas described below.

<Weather Prediction>

[Technical Idea 1]

A control device configured to control a water supply device 100 that supplies irrigation water to an open farm field 20 in which a plant 30 grows, to control time and amount of the irrigation water supplied to the farm field, the control device comprising:

a storage unit 500, 620 configured to store an environment value input from an environment sensor 310 provided to each of a plurality of divided areas obtained by dividing the farm field;

a processing calculation unit 610 configured to perform weather prediction for each of the plurality of divided areas based on the environment value of each of the plurality of divided areas, and based on the weather prediction, calculate an irrigation schedule in which supply time and amount of the irrigation water individually supplied to each of the plurality of divided areas during an irrigation period are determined; and an output unit 332, 630 configured to output to the water supply device, a control signal for controlling supply and no supply of the irrigation water to each of the plurality of divided areas based on the irrigation schedule.

[Technical Idea 2]

The control device according to Technical Idea 1, wherein the processing calculation unit performs the weather prediction for each of the plurality of divided areas based on a temporal change in the environment value of each of the plurality of divided areas, a difference in the environment value among the plurality of divided areas at different geographical positions in the farm field, and a temporal change in the difference.

[Technical Idea 3]

The control device according to Technical Idea 2, wherein the processing calculation unit identifies, based on the difference in the environment value among the plurality of divided areas at different geographical positions in the farm field and the temporal change in the difference, the divided area with a weather change and the divided area without the weather change, calculates a separation distance between the divided area with the weather change and the divided area without the weather change, and performs the weather prediction for each of the plurality of divided areas based on the separation distance and the temporal change in the environment values of the plurality of divided areas.

[Technical Idea 4]

The control device according to any one of Technical Ideas 1 to 3, wherein the storage unit stores, in addition to the environment value, weather forecast for the farm field input from the external information source 1000, and the processing calculation unit determines the irrigation schedule based on the weather prediction and the weather forecast.

[Technical Idea 5]

An irrigation program executed by a processor to cause the processor to acquire an environment value input from an environment sensor 310 provided to each of a plurality of divided areas obtained by dividing an open farm field 20 in which a plant 30 grows, calculate weather prediction for each of the plurality of divided areas based on the environment value of each of the plurality of divided areas, calculate, based on the weather forecast, an irrigation schedule in which supply time and amount of irrigation water individually supplied to each of the plurality of divided areas during an irrigation period are determined, and output a control signal for controlling supply and no supply of the irrigation water to the divided areas based on the irrigation schedule.

<Intermittent Driving Interval>

[Technical Idea 1]

An irrigation system comprising:

a plurality of monitoring units 300 provided to a plurality of respective divided areas obtained by diving an open farm field 20 in which a plant 30 grows; and an integrated calculation unit 600 that performs wireless communications with each of the plurality of monitoring units, wherein the monitoring units each include a communication unit 340 configured to transmit and receive a radio signal to and from the integrated calculation unit, an environment sensor 310 configured to detect an environment value of the divided area;

a calculation processing unit 330 that has a first mode and a second mode consuming larger electric power than the first mode, and is configured to switch from the first mode to the second mode and perform calculation processing upon receiving a wake-up signal, a wake-up unit 350 configured to output the wake-up signal to the calculation processing unit at a wake-up interval, and a power generation unit 360 configured to convert light energy into electric energy, store the electric power as electric power, and supplies the stored electric power to the calculation processing unit, and the integrated calculation unit determines the wake-up interval based on a power storage amount in the power generation unit and an environment value detected by an environment sensor.

[Technical Idea 2]

The irrigation system according to Technical Idea 1, wherein the integrated calculation unit determines the wake-up interval based on the power storage amount when the power storage amount is equal to or smaller than a charge value, and determines the wake-up interval based on the power storage amount and the environment value when the power storage amount is larger than the charge value.

[Technical Idea 3]

The irrigation system according to Technical Idea 2, wherein the environment value includes a solar radiation amount, and the integrated calculation unit determines the wake-up interval based on the power storage amount when the solar radiation amount is equal to or smaller than a day/night determination value, and determines the wake-up interval based on the power storage amount and the solar radiation amount when the solar radiation amount is larger than the day/night determination value.

[Technical Idea 4]

The irrigation system according to Technical Idea 3, wherein the integrated calculation unit detects a temporal change in each of the power storage amount and the solar radiation amount, and determines the wake-up interval based on the power storage amount corrected by being incremented or decremented in accordance with an increasing or decreasing trend of the power storage amount, or based on the power storage amount corrected by being incremented or decremented in accordance with the increasing or decreasing trend of the power storage amount and the solar radiation amount corrected being incremented or decremented in accordance with an increasing or decreasing trend of the solar radiation amount.

[Technical Idea 5]

The irrigation system according to Technical Idea 3 or 4, wherein the integrated calculation unit sets the wake-up interval to be shorter as the power storage amount increases, and sets the wake-up interval to be shorter as the solar radiation amount increases, when the solar radiation amount is larger than the day/night determination value.

[Technical Idea 6]

The irrigation system according to any one of Technical Ideas 1 to 5, wherein the environment value includes a rainfall amount, and the integrated calculation unit determines the wake-up interval based on the power storage amount when the rainfall amount is equal to or smaller than a rainy weather determination value, and determines the wake-up interval based on the power storage amount and the rainfall amount when the rainfall amount is larger than the rainy weather determination value.

[Technical Idea 7]

The irrigation system according to Technical Idea 6, wherein the integrated calculation unit detects a temporal change in each of the power storage amount and the rainfall amount, and determines the wake-up interval based on the power storage amount corrected by being incremented or decremented in accordance with an increasing or decreasing trend of the power storage amount, or based on the power storage amount corrected by being incremented or decremented in accordance with the increasing or decreasing trend of the power storage amount and the rainfall amount corrected being incremented or decremented in accordance with an increasing or decreasing trend of the rainfall amount.

[Technical Idea 8]

The irrigation system according to Technical Idea 6 or 7, wherein the integrated calculation unit sets the wake-up interval to be shorter as the power storage amount increases, and sets the wake-up interval to be longer as the rainfall amount increases, when the rainfall amount is larger than the rainy weather determination value.

[Technical Idea 9]

The irrigation system according to any one of Technical Ideas 1 to 8, wherein the integrated calculation unit determines a processing load of the calculation processing executed by the calculation processing unit under the second mode based on the power storage amount and the environment value.

[Technical Idea 10]

The irrigation system according to any one of Technical Ideas 1 to 8, wherein
  the wake-up unit measures time, and
  the integrated calculation unit determines the wake-up interval based on the power storage amount, the environment value, and time indicated by the wake-up unit.

[Technical Idea 11]

The irrigation system according to Technical Idea 10, wherein the integrated calculation unit determines a processing load of the calculation processing executed by the calculation processing unit under the second mode based on the power storage amount, the environment value, and the time.

[Technical Idea 12]

The irrigation system according to Technical Idea 9 or 11, wherein the integrated calculation unit increases the processing load as the wake-up interval decreases, and reduces the processing load as the wake-up interval increases.

[Technical Idea 13]

The irrigation system according to Technical Ideas 1 to 12, wherein the monitoring units are more separated from ground than apices of the plants fully grown are.

[Technical Idea 14]

A monitoring unit provided to each of a plurality of respective divided areas obtained by diving an open farm field 20) in which a plant 30) grow, the monitoring unit comprising:
  an environment sensor 310) configured to detect an environment value of the divided area;
  a calculation processing unit 330) that has a first mode and a second mode consuming larger electric power than the first mode, and is configured to switch from the first mode to the second mode and perform calculation processing upon receiving a wake-up signal;
  a wake-up unit 350) configured to output the wake-up signal to the calculation processing unit at a wake-up interval; and
  a power generation unit 360) configured to convert light energy into electric energy, store the electric power as electric power, and supplies the stored electric power to the calculation processing unit, wherein
  the calculation processing unit determines the wake-up interval based on a power storage amount in the power generation unit and an environment value detected by an environment sensor.

<Contamination Removal>

[Technical Idea 1]

A monitoring unit that is provided to each of a plurality of divided areas obtained by dividing an open farm field 20 in which a plant 30 grows, together with a water supply device 100 configured to supply irrigation water to each of the plurality of divided areas, the monitoring unit comprising:
  a case 370 including a housing 371 and a translucent lid portion 372 that closes an opening of the housing;
  a solar radiation sensor 312 that is disposed in an internal space of the case to face an inner surface 372b of the lid portion on side of the internal space, and is configured to detect an amount of light entering from a first region of an outer surface 372a on side opposite to the inner surface;
  a solar cell 361 that is disposed in the internal space to face the inner surface, and is configured to convert light energy entering from a second region of the outer surface different from the first region, into electric energy;
  a liquid sensor 313, 318 configured to detect liquid adhering to a third region of the outer surface different from each of the first region and the second region;
  a current sensor 363 configured to detect current output from the solar cell;
  a wiper 373 configured to slide on the outer surface; and
  a calculation processing unit 330 configured to drive the wiper, when a contamination determination value is exceeded by an absolute value of a difference between electric power expected to be generated by the solar cell from the solar radiation amount detected by the solar radiation sensor and electric power generated by the solar cell from an amount of the current detected by the current sensor, and the liquid sensor detects the liquid adhering to the outer surface.

[Technical Idea 2]

The monitoring unit according to Technical Idea 1, wherein at least one of the plurality of monitoring units is provided on an extension line of a discharge direction of the irrigation water discharged from the water supply device to the farm field.

[Technical Idea 3]

An irrigation system comprising:
  a plurality of monitoring units 300 that are provided to a plurality of respective divided areas obtained by dividing an open farm field 20 in which a plant 30 grows, together with a water supply device 100 configured to supply irrigation water to each of the plurality of divided areas; and
  an integrated calculation unit 600 configured to perform wireless communications with each of the plurality of monitoring units, wherein
  the monitoring units each include;
    a case 370 including a housing 371 and a translucent lid portion 372 that closes an opening of the housing;
    a solar radiation sensor 312 that is disposed in an internal space of the case to face an inner surface 372b of the lid portion on side of the internal space, and is configured to detect an amount of light entering from a first region of an outer surface 372a on side opposite to the inner surface;
    a solar cell 361 that is disposed in the internal space to face the inner surface, and is configured to convert light energy entering from a second region of the outer surface different from the first region, into electric energy;

a liquid sensor 313, 318 configured to detect liquid adhering to a third region of the outer surface different from each of the first region and the second region;

a current sensor 363 configured to detect current output from the solar cell;

a wiper 373 configured to slide on the outer surface;

a calculation processing unit 330 configured to acquire and output, to the integrated calculation unit, each of a solar radiation amount detected by a solar radiation sensor, current detected by a current sensor, and a detection result of the liquid sensor; and a communication unit 340 configured to output, as a radio signal, the output from the calculation processing unit to the integrated calculation unit, and the integrated calculation unit outputs, to the monitoring units, an instruction signal including an instruction to drive the wiper, when a contamination determination value is exceeded by an absolute value of a difference between electric power expected to be generated by the solar cell from the solar radiation amount detected by the solar radiation sensor and electric power generated by the solar cell from an amount of the current detected by the current sensor, and the liquid sensor detects the liquid adhering to the outer surface.

<Fog Detection>

[Technical Idea 1]

A monitoring unit comprising:

an upper portion 376 having a first surface 380*b* provided with a reference image 384;

a camera 318 configured to capture the reference image;

a lower portion 375 configured to store the camera with part of the camera provided to a second surface 379*a*;

a support portion 385 that has a communication window 385*c* formed to communicate an opposing space between the first surface and the second surface with an outer atmosphere, and is configured to connect the upper portion and the lower portion to each other with the first surface and the second surface separated from each other;

an eaves portion 386 that has a communication hole 386*a* having a smaller opening area than the communication window and communicating the communication window with the outer atmosphere, and is connected to the support portion to cover the communication hole; and a calculation processing unit 330 configured to determine whether there is a water droplet on the first surface based on defocusing of the reference image captured by the camera.

[Technical Idea 2]

The monitoring unit according to Technical Idea 1, wherein the upper portion is translucent, the camera not only captures the reference image, but also captures an image of an outer surface 381*a* that is on side of the upper portion opposite to the first surface and is exposed to the outer atmosphere, and the calculation processing unit determines whether water droplets are adhering to the outer surface, based on the image of the outer surface captured by the camera.

[Technical Idea 3]

The monitoring unit according to Technical Idea 2, wherein the upper portion is provided with an upper wiper 382 configured to wipe the outer surface, and the calculation processing unit drives the upper wiper to wipe the outer surface, upon determining that water droplets are adhering to the outer surface.

[Technical Idea 4]

The monitoring unit according to Technical Idea 2 or 3, wherein the upper portion is provided with at least one of a solar cell 361 configured to convert light energy entering from the outer surface into electric energy and a solar radiation sensor 312 configured to detect an amount of the light entering from the outer surface.

[Technical Idea 5]

The monitoring unit according to any one of Technical Ideas 1 to 4, wherein the upper portion is provided with a lower wiper 383 configured to wipe the first surface, and the calculation processing unit drives the lower wiper to wipe the first surface upon determining that dew condensation is occurring on the first surface.

[Technical Idea 6]

The monitoring unit according to any one of Technical Ideas 1 to 5, wherein the second surface protrudes toward the upper portion with a location provided with the camera being an apex.

[Technical Idea 7]

The monitoring unit according to any one of Technical Ideas 1 to 6, wherein a portion of the camera provided on side of the second surface has higher water repellency than the second surface.

[Technical Idea 8]

The monitoring unit according to any one of Technical Ideas 1 to 7 provided in an open farm field 20 in which a plant 30 grows.

What is claimed is:

1. A control device configured to control a water supply device, which is configured to supply irrigation water to an open farm field in which a plant grows, to control a supply time and an amount of the irrigation water supplied to the open farm field, the control device comprising:

a storage unit configured to store
an environment value, which is input from an environment sensor provided to each of a plurality of divided areas obtained by dividing the open farm field, wherein the environment value includes a soil moisture content in a soil layer of the plurality of divided areas, and
a weather forecast for the open farm field, which is input from an external information source;

a calculation unit configured to calculate, based on the environment value and the weather forecast, an irrigation schedule in which the supply time and the amount of the irrigation water individually supplied to each of the plurality of divided areas during an irrigation period are determined; and an output unit configured to output to the water supply device, a control signal to control supply and no supply of the irrigation water to each of the plurality of divided areas based on the irrigation schedule, wherein the storage unit is configured to store, in addition to the weather forecast and the environment value, a growth inhibition moisture point and a permanent wilting point of the plant, and the calculation unit is configured to
set, as target values between the growth inhibition moisture point and the permanent wilting point, a first target value closer to the growth inhibition moisture point and a second target value closer to the permanent wilting point, and determine the irrigation schedule to maintain the soil moisture content in each of the plurality of divided areas between the first target value and the second target value.

2. The control device according to claim 1, wherein the environment value includes, in addition to the soil moisture content, an evaporation amount of water per unit time in the soil layer of the plurality of divided areas, the storage unit is configured to store, in addition to the weather forecast, the environment value, the growth inhibition moisture point, and the permanent wilting point, a water absorption amount, which is an amount of water absorbed by the plant per unit time and a water retention capacity of the soil layer, and the calculation unit is configured to estimate a decrease amount of the soil moisture content per unit time during the irrigation period based on the environment value, the water absorption amount, and the water retention capacity.

3. The control device according to claim 2, wherein the calculation unit is configured to determine the supply time and the amount of the irrigation water supplied during the irrigation period based on the soil moisture content at beginning of the irrigation period, the decrease amount of the soil moisture content per unit time during the irrigation period, and the weather forecast.

4. The control device according to claim 2, wherein a physical quantity related to the evaporation amount includes at least one of a solar radiation amount, a temperature, a humidity, and an air volume.

5. The control device according to claim 2, wherein the calculation unit is configured to set a difference between the second target value and the permanent wilting point based on a recovery time, which is required for recovery of the water supply device that has failed, and the decrease amount of the soil moisture content per unit time.

6. The control device according to claim 2, wherein the calculation unit is configured to set, as the supply time of the irrigation water, a time point, at which the soil moisture content is expected to reach the second target value during the irrigation period.

7. The control device according to claim 1, wherein the calculation unit is configured to set a difference between the growth inhibition moisture point and the first target value based on climate of the open farm field.

8. The control device according to claim 7, wherein the climate of the open farm field includes at least one of an expected value of an average rainfall amount of the open farm field during the irrigation period and a total rainfall amount predicted by the weather forecast during the irrigation period.

9. The control device according to claim 1, wherein the calculation unit is configured to determine the irrigation schedule and determine a total water supply amount of the irrigation water before a forecasted rainfall time, which is predicted by the weather forecast, to prevent the soil moisture content from exceeding the first target value at the forecasted rainfall time, due to rainfall at the forecasted rainfall time.

10. The control device according to claim 1, wherein the calculation unit is configured to perform weather prediction for each of the plurality of divided areas based on the environment value of each of the plurality of divided areas and calculate the irrigation schedule based on the weather prediction, which is based on the environment value, and the weather forecast.

11. A non-transitory computer readable medium storing instructions to, when executed by a processor, cause the processor to acquire an environment value, which is input from an environment sensor provided to each of a plurality of divided areas obtained by dividing an open farm field in which a plant grows, and a weather forecast, which is input from an external information source, wherein the environment value includes a soil moisture content in a soil layer of the plurality of divided areas, calculate, based on the environment value and the weather forecast, an irrigation schedule in which a supply time and an amount of irrigation water individually supplied to each of the plurality of divided areas during an irrigation period are determined, output a control signal to control supply and no supply of the irrigation water to the plurality of divided areas based on the irrigation schedule, store, in addition to the weather forecast and the environment value, a growth inhibition moisture point and a permanent wilting point of the plant, set, as target values between the growth inhibition moisture point and the permanent wilting point, a first target value closer to the growth inhibition moisture point and a second target value closer to the permanent wilting point, and determine the irrigation schedule to maintain the soil moisture content in each of the plurality of divided areas between the first target value and the second target value.

12. A control device configured to control a water supply device, which is configured to supply irrigation water to an open farm field in which a plant grows, to control a supply time and an amount of the irrigation water supplied to the open farm field, the control device comprising:

a storage device configured to store an environment value, which is input from an environment sensor provided to each of a plurality of divided areas obtained by dividing the open farm field, wherein the environment value includes a soil moisture content in a soil layer of the plurality of divided areas, and a weather forecast for the open farm field, which is input from an external information source;

a processor configured to calculate, based on the environment value and the weather forecast, an irrigation schedule in which the supply time and the amount of the irrigation water individually supplied to each of the plurality of divided areas during an irrigation period are determined;

output to the water supply device, a control signal to control supply and no supply of the irrigation water to each of the plurality of divided areas based on the irrigation schedule;

store, in addition to the weather forecast and the environment value, a growth inhibition moisture point and a permanent wilting point of the plant;

set, as target values between the growth inhibition moisture point and the permanent wilting point, a first target value closer to the growth inhibition moisture point and a second target value closer to the permanent wilting point; and determine the irrigation schedule to maintain the soil moisture content in each of the plurality of divided areas between the first target value and the second target value.

13. The non-transitory computer readable medium according to claim 11, wherein the environment value includes, in addition to the soil moisture content, an evaporation amount of water per unit time in the soil layer of the plurality of divided areas, wherein the instructions, when executed by the processor, further cause the processor to store, in addition to the weather forecast, the environment value, the growth inhibition moisture point, and the permanent wilting point, a water absorption amount, which is an amount of water absorbed by the plant per unit time and a water retention capacity of the soil layer, and estimate a decrease amount of the soil moisture content per unit time during the irrigation period based on the environment value, the water absorption amount, and the water retention capacity.

14. The non-transitory computer readable medium according to claim 13, wherein the instructions, when executed by the processor, further cause the processor to determine the supply time and the amount of the irrigation water supplied during the irrigation period based on the soil moisture content at beginning of the irrigation period, the decrease amount of the soil moisture content per unit time during the irrigation period, and the weather forecast.

15. The non-transitory computer readable medium according to claim 13, wherein a physical quantity related to the evaporation amount includes at least one of a solar radiation amount, a temperature, a humidity, and an air volume.

16. The non-transitory computer readable medium according to claim 13, wherein the instructions, when executed by the processor, further cause the processor to set a difference between the second target value and the permanent wilting point based on a recovery time, which is required for recovery of a water supply device which supplies irrigation water to an open farm field in which a plant grows wherein the water supply device has failed, and the decrease amount of the soil moisture content per unit time.

17. The control device according to claim 12, wherein the environment value includes, in addition to the soil moisture content, an evaporation amount of water per unit time in the soil layer of the plurality of divided areas, wherein the processor is further configured to store, in addition to the weather forecast, the environment value, the growth inhibition moisture point, and the permanent wilting point, a water absorption amount, which is an amount of water absorbed by the plant per unit time and a water retention capacity of the soil layer, and estimate a decrease amount of the soil moisture content per unit time during the irrigation period based on the environment value, the water absorption amount, and the water retention capacity.

18. The control device according to claim 17, wherein the processor is further configured to determine the supply time and the amount of the irrigation water supplied during the irrigation period based on the soil moisture content at beginning of the irrigation period, the decrease amount of the soil moisture content per unit time during the irrigation period, and the weather forecast.

19. The control device according to claim 17, wherein a physical quantity related to the evaporation amount includes at least one of a solar radiation amount, a temperature, a humidity, and an air volume.

20. The control device according to claim 17, wherein the processor is further configured to set a difference between the second target value and the permanent wilting point based on a recovery time, which is required for recovery of the water supply device that has failed, and the decrease amount of the soil moisture content per unit time.

\* \* \* \* \*